United States Patent [19]
Haruda et al.

[11] Patent Number: 5,343,610
[45] Date of Patent: Sep. 6, 1994

[54] METHOD OF MAKING AN ANTI-SKID APPARATUS FOR AN AUTOMOBILE TIRE

[75] Inventors: Osamu Haruda, Chiba; Shin Imamura; Suguru Hanzawa, both of Fukushima; Nobuo Amada, Gunma; Kazuo Kunii, Fukushima; Hidetaka Kobayashi, Fukushima; Shinichi Yano, Fukushima; Muneo Nishiyama, Fukushima, all of Japan

[73] Assignee: Okamoto Industries, Inc., Tokyo, Japan

[21] Appl. No.: 66,252

[22] Filed: May 14, 1993

Related U.S. Application Data

[60] Division of Ser. No. 506,563, Apr. 5, 1990, Pat. No. 5,247,980, which is a continuation of Ser. No. 945,659, Dec. 9, 1986, abandoned.

[30] Foreign Application Priority Data

| Date | | Country | Number |
|---|---|---|---|
| Aug. 19, 1985 | [JP] | Japan | 60-182495 |
| Nov. 22, 1985 | [JP] | Japan | 60-181265 |
| Feb. 25, 1986 | [JP] | Japan | 61-41132 |
| Feb. 26, 1986 | [JP] | Japan | 61-28001 |
| Feb. 27, 1986 | [JP] | Japan | 61-28441 |
| Feb. 27, 1986 | [JP] | Japan | 61-28442 |
| Apr. 14, 1986 | [JP] | Japan | 61-55931 |
| Apr. 17, 1986 | [JP] | Japan | 61-58658 |
| May 24, 1986 | [JP] | Japan | 61-119779 |
| Jun. 12, 1986 | [JP] | Japan | 61-90265 |
| Jun. 30, 1986 | [JP] | Japan | 61-100562 |
| Jun. 30, 1986 | [JP] | Japan | 61-100563 |
| Jun. 30, 1986 | [JP] | Japan | 61-100564 |
| Jul. 4, 1986 | [JP] | Japan | 61-103408 |
| Jul. 4, 1986 | [JP] | Japan | 61-158339 |
| Jul. 5, 1986 | [JP] | Japan | 61-103868 |

[51] Int. Cl.$^5$ .................. B23P 11/02; B29C 35/02
[52] U.S. Cl. .................. 29/525.1; 264/174; 264/210.2; 264/210.8; 264/296; 264/325; 264/326; 264/DIG. 81; 156/228; 156/296

[58] Field of Search ............. 264/103, 319, 325, 326, 264/134, 135, 136, 174, 210.2, 210.8, 236, 294, 263, 296, DIG. 81; 152/167, 170, 185, 187, 213 R, 221; 156/244.15, 296, 228

[56] References Cited

U.S. PATENT DOCUMENTS

| | | | |
|---|---|---|---|
| 1,449,456 | 3/1923 | Stewart | 152/221 |
| 1,578,803 | 3/1926 | Comey | 152/221 |
| 2,341,316 | 2/1944 | Ederer . | |
| 2,346,477 | 4/1944 | Ederer | 152/221 |
| 3,464,475 | 9/1969 | Freed | 152/167 |
| 3,934,633 | 1/1976 | Bula . | |
| 4,266,593 | 5/1981 | Hayashi . | |
| 4,295,918 | 10/1981 | Benson et al. . | |
| 4,308,906 | 1/1982 | Bula et al. . | |

FOREIGN PATENT DOCUMENTS

35-26502 10/1960 Japan .
48-9281 3/1973 Japan .
(List continued on next page.)

*Primary Examiner*—Mathieu Vargot
*Attorney, Agent, or Firm*—Sandler Greenblum & Bernstein

[57] ABSTRACT

A method for making an anti-skid apparatus for an automobile tire includes coating a plurality of core materials with rubber to form a plurality of cords; placing the cords in grooves of a preliminary molding plate and knitting the cords to form a net body; molding the cord into a non-vulcanized net body which inherently possesses crossing sections-where one of the plurality of cords lies on top of another of the plurality of cords; pressing the crossing sections so as to cause the core materials at the crossing sections to become linearly aligned; and vulcanizing the pressed non-vulcanized anti-skid net bodies to form a vulcanized net body. The step of pressing the crossing sections temporarily fixes the respective cords to each other at respective crossing sections. Also, affixing elements are attached to the vulcanized net body to detachably secure the vulcanized net body to an automobile tire.

3 Claims, 49 Drawing Sheets

FOREIGN PATENT DOCUMENTS

| | | | |
|---|---|---|---|
| 49-112305 | 10/1974 | Japan . | |
| 53-41844 | 10/1978 | Japan . | |
| 54-114201 | 8/1979 | Japan . | |
| 54-124406 | 9/1979 | Japan . | |
| 57-11040 | 1/1982 | Japan . | |
| 57-29406 | 2/1982 | Japan . | |
| 57-161504 | 10/1982 | Japan . | |
| 57-51123 | 11/1982 | Japan . | |
| 58-13337 | 3/1983 | Japan . | |
| 58-39210 | 9/1983 | Japan . | |
| 58-49366 | 11/1983 | Japan . | |
| 59-13126 | 4/1984 | Japan . | |
| 59-14247 | 4/1984 | Japan . | |
| 59-118813 | 8/1984 | Japan . | |
| 60-127207 | 8/1985 | Japan . | |
| 60-180609 | 11/1985 | Japan . | |
| 60-188608 | 12/1985 | Japan . | |
| 61-41309 | 3/1986 | Japan . | |
| 61-57219 | 4/1986 | Japan . | |
| 61-84215 | 4/1986 | Japan . | |
| 61-67203 | 5/1986 | Japan . | |
| 62-43307 | 2/1987 | Japan | 152/221 |
| 62-299413 | 12/1987 | Japan | 152/221 |
| 2-48203 | 2/1990 | Japan | 152/221 |
| 2-212205 | 8/1990 | Japan | 152/221 |
| 2-216306 | 8/1990 | Japan | 152/187 |
| 1388649 | 3/1975 | United Kingdom . | |

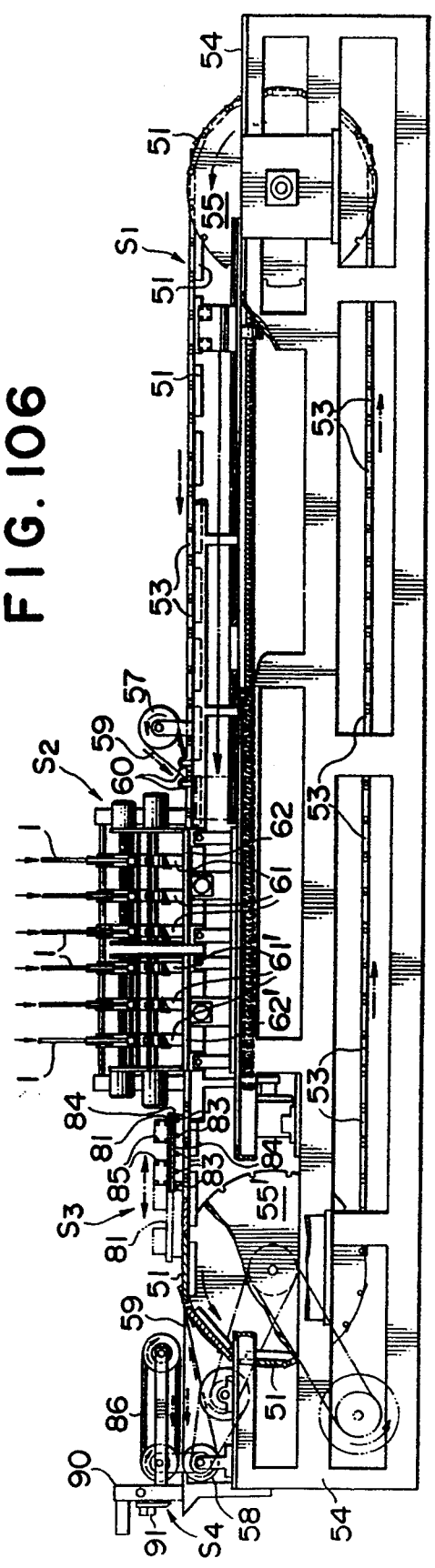
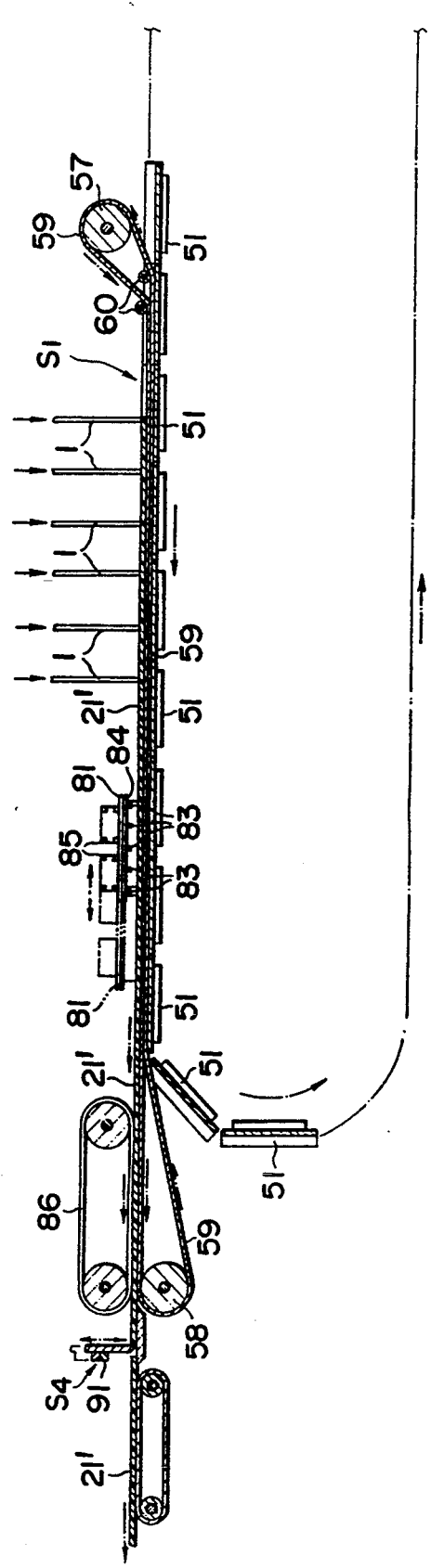

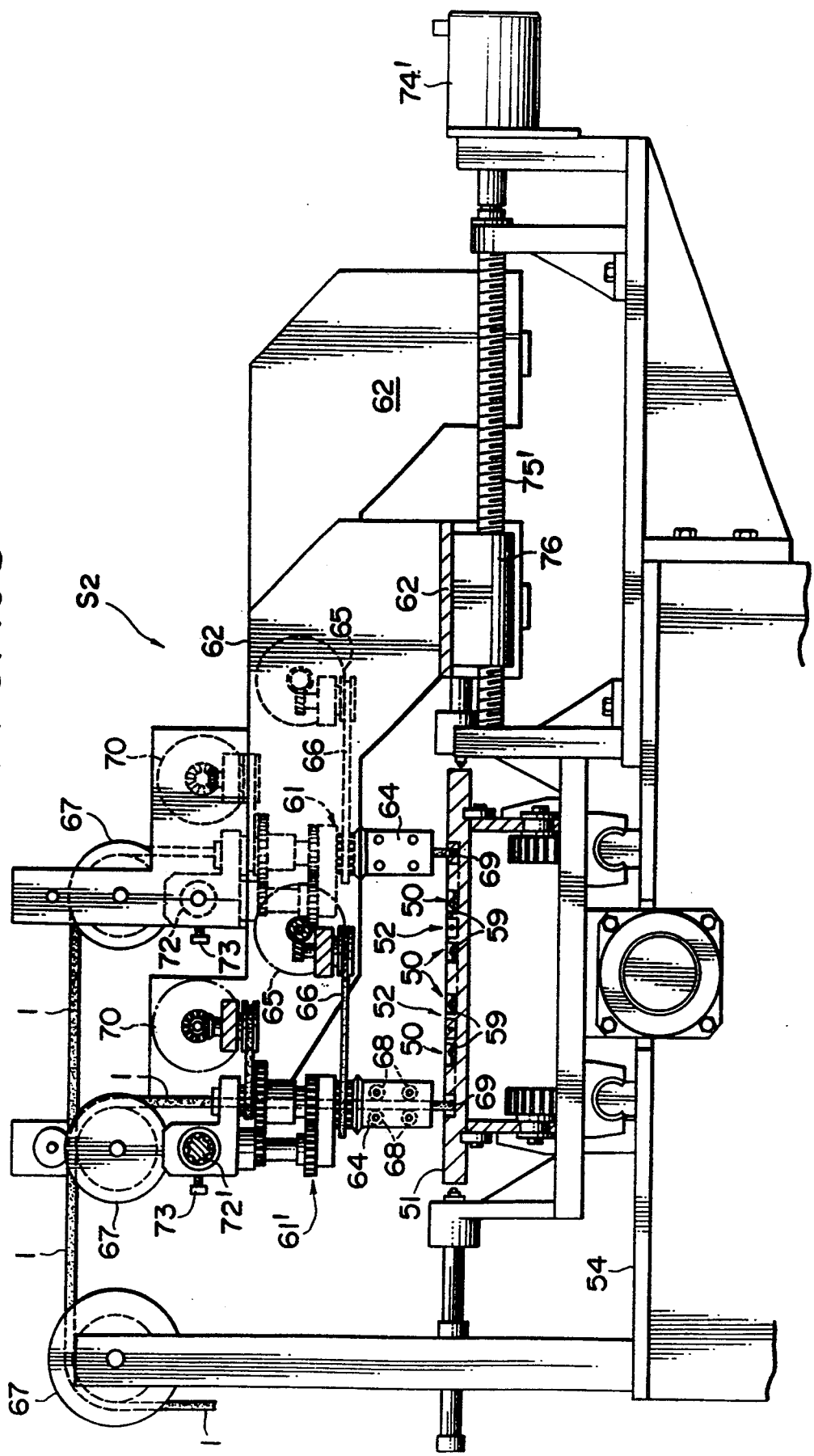

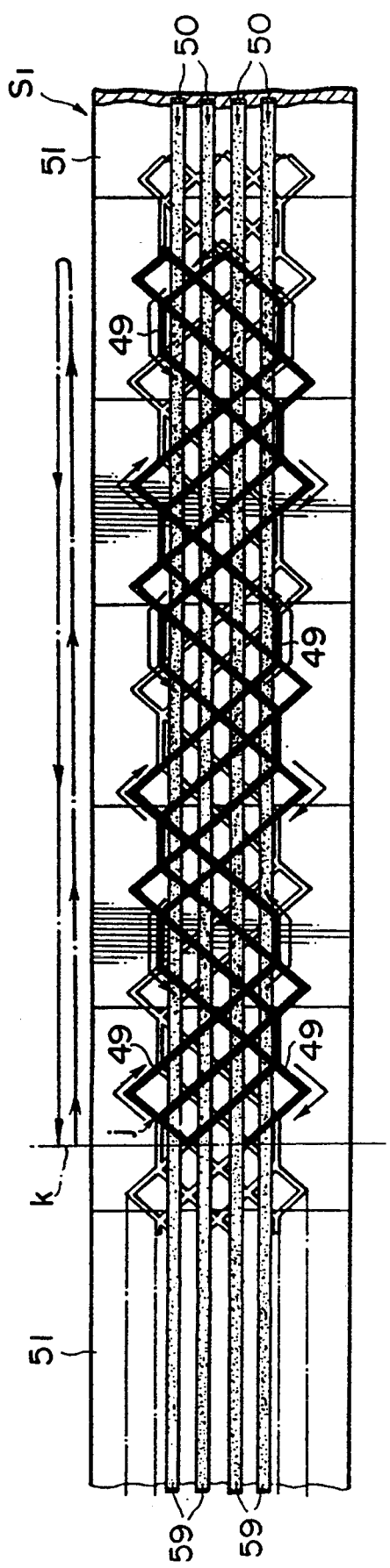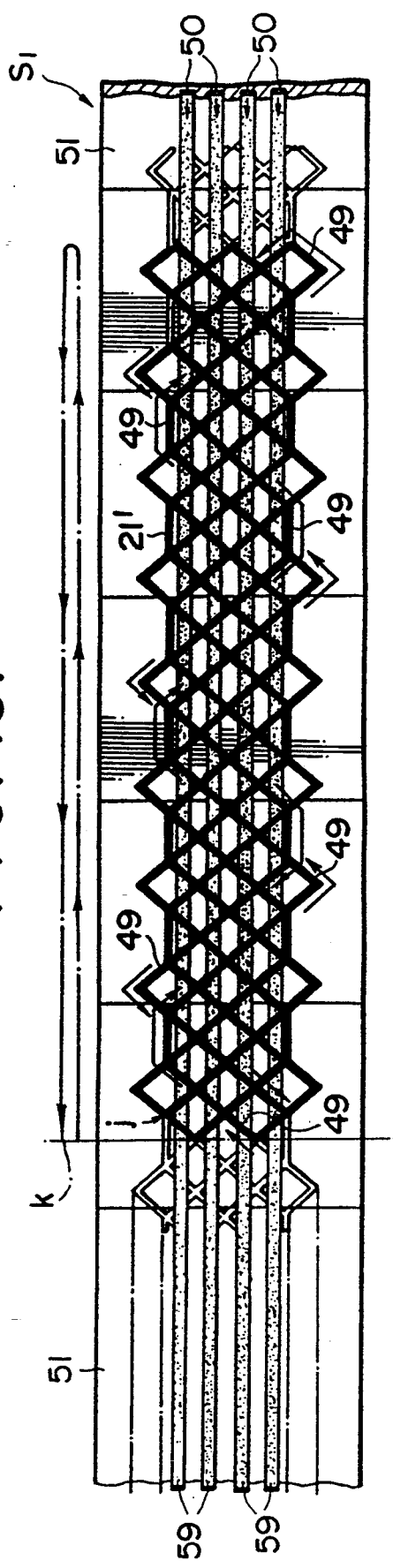

METHOD OF MAKING AN ANTI-SKID APPARATUS FOR AN AUTOMOBILE TIRE

This application is a division of application Ser. No. 07/506,563, filed Apr. 5, 1990, now U.S. Pat. No. 5,247,980, which is a continuation of application Ser. No. 06/945,659, filed Dec. 9, 1986, now abandoned.

BACKGROUND OF THE INVENTION

1. Field of the Invention

This invention relates to anti-skid attachments for automobile tires.

2. Description of the Prior Art

The inventor of the present invention has previously developed anti-skid attachments having a net shape. Examples of these attachments may be seen in Japanese Patent Publication No. SHO 58-13337 and Japanese Patent Publication No. SHO 58-49366. Although these previously developed attachments function favorably with respect to conventional metal snow chains, they suffer certain defects that make them less than ideal.

One such problem is that the net section tends to fall off the tire. Another such problem is that wires that fixed the net to the tires tend to be cut by rapid loosening and shrinking of the net section that occurs when a car having tires on which the nets are mounted is driven at high speed. Both of these problems seem to be exacerbated by snow having a sherbet-like consistency. Failing off and cutting of support wires also tend to occur when certain changes in vehicle operation are effected (e.g., when the brakes are slammed on). Still yet another problem with prior art net-shape anti-skid attachments is that they do not lend themselves to easy manufacture, i.e., mass production manufacture.

SUMMARY OF THE INVENTION

A first object of the present invention is to provide an improved all-purpose net-shaped anti-skid attachment for an automobile tire.

A second object of the present invention is to provide a manufacturing method for the anti-skid attachment of the present invention.

A third object of the present invention is to provide a machine ideally suited for manufacture of the anti-skid attachment of the present invention.

A fourth object of the present invention relates to providing an improved operating anti-skid attachment, that is, one that does not have the problems and shortcomings associated with difficulty of attachment and retention suffered by prior art attachments. These prior art attachments are fixed around the tire in a ring shape, with band materials used for an inner tire connection, and a setting band used for an outer tire connection. Generally, setting bands are not made strong. One reasons for this is because if they are made strong, women would experience difficulty in attaching the attachments. A second reason for this is because use of a strong setting band tends to spoil use of the aforementioned band materials. Accordingly, during vehicle operation with prior art attachments attached, with centrifugal force acting upon the attachments, the setting bands tend to expand and/or the attachments loosen and/or the attachments shrink. As any one or a number of these things occurred, because of constant repetition, a skid phenomena develops between the tire and attachment so that dislocation or removal of the attachments sometimes occurs.

A fifth object of the present invention is to provide an attachment that visibly notifies a user of lost material due to abrasion, so that total loss of the attachment due to abrasion and so that abrasion into the core material of the cored can be prevented.

Additional objects of the present invention include providing an attachment that can be manufactured at a satisfactory cost and providing an attachment that can be separated into sectional parts that are assemblable so that the attachment possesses an interchangeability as knock-down parts.

It is another object of the present invention to fix both ends of the long side direction of the attachments so as to form a ring shape. Yet another object of the present invention is to provide an attachment with improved durability.

Still yet another object to the present invention is to provide an anti-skid attachment with improved strength when used in combination with a spiked tire. This object recognizes that metallic spike tires are frequently used to improve traction in snow.

The present invention is comprised of thickly covered cords with cores, i.e., several wire materials thickly coated with rubber. The cords are formed into a non-vulcanized net body which inherently has cord crossing portions. The crossing portions are mechanically pressed flat and vulcanized to form a net body. Setting wire ropes are fixed to the net body with clasp sections provided on the inside of the net body. Then, the net body can be fixed to a tire by means of fixing the clasp of an attachment to the detachable class of a setting band. Because the rubber material is made in a net shape, attachments according to the present invention have the advantages of being able to fit using tires without any injury to the road and, additionally, those materials having suitable functions are adopted for use in each part of the attachments, so that the attachments possess a beneficial affect of resisting skidding in snow.

Certain embodiments of the present invention (designatable as a No. 2 sectional invention) comprise wire materials coated by rubber material, which is formed into net bodies of non-vulcanized anti-skid attachments. Inherently, these non-vulcanized net bodies have crossing parts formed by overlaying wire materials coated by rubber material. Accordingly to the teachings of the present invention, the non-vulcanized net bodies are pressed mechanically so that the crossing sections of the net bodies are flattened. This flattening process ideally causes core materials to fall into at least one line. After pressing, the non-vulcanized net bodies are vulcanized to form anti-skid attachments. Inherently, the vulcanized attachments have inside tire portions, and outside tire portions. An inside clasp section is affixed to the inside tire portion and an outside clasp is attached to the outside tire portion. A setting wire rope with an inside fixing clasp cooperates with the inside clasp section to fix the attachment to the tire. A setting band with a detachable clasp cooperates with the outside clasp to a detachably affix the attachment to the tire. An important aspect of the present invention is that, at the crossing sections where the net body is mechanically pressed, the core materials form lines. It is especially important when the core materials are so constructed that they come to be situated parallel in both the up and down directions (i.e., when two by two core materials situated one on top of the other are mechanically pressed in order to form two by four finished pressed crossing areas). In general, this action operates to control the thickness of the necessary rubber materials between the up and down sides of the core materials. By means of this technology, the core material might be kept in a position to most beneficially resist abrasion of rubber material, so that the present invention has enhanced durability.

In other embodiments of the present invention (designated a No. 3 sectional invention), four pieces of wire-material are coated with rubber to form thickly coated cords with cores. These cords are used to form a non-vulcanized anti-skid attachment. This non-vulcanized anti-skid attachment is mechanically pressed flat and is vulcanized to form a net body of the anti-skid attachment. Inherently, the anti-skid net body has an inside and an outside. Fixing wire ropes are fixed to the inside of the anti-skid net body through a fixing clasp of wire ropes. Both ends of the wire ropes are formed into a loop shape and a clasp of the wiring rope is fixed to the end of the loop shaped wire ropes. The fixing clasp fixes the net connection to the other end of the wire ropes. Additionally, a detachable clasp is fixed to the outside, and arrangements are made for a fixing clasp of a setting band for connecting the net body at the end of the outside, and the fixing clasp of the setting band is fixed between the clasp of the net body and the opposite side so as to be detachable. These attachment aspects of this embodiment of the present invention can be combined favorably with basic aspects of the primary invention.

Other embodiments of the present invention (designated a No. 4 sectional invention) involve arranging connecting arms along the outside circumference of the circle of each ring section as a center with an actional band for fixing the primary embodiment of the invention. The actional band is arranged with an actional ring in the outside edge of connecting arms. Accordingly, the anti-skid attachment is affixed to the car via the actional band portion of the actional ring which is positioned on the outside of the tire in a detachable manner. When such a band is used to attach the anti-skid attachment to a car, and when the tire and anti-skid attachment are tightly stuck together, the band facilitates attachment of the apparatus, even for people of not great strength.

Other embodiment of the present invention (designated a No. 5 sectional invention), which embodiments include an actional band, have ring sections arranged at the position of responding to a center of the tire. Several pieces of the connecting arms project radially in at suitable intervals, and the actional ring is positioned so as to connect with the outside end of each connecting arm. This arrangement of the fixing apparatus of the anti-skid attachment of the present invention offers good balanced strength against the actional band under use. It is like a spider net shape, so that it does not drop off of the tire even if the whole of the anti-skid attachment is shifting against the tire. Thus, danger is prevented.

Other embodiments of the present invention (designated a No. 6 sectional invention) comprise the anti-skid attachment as described in the primary invention, and also include a suitable number of the setting band through the apparatus located on the outside of the tire. Additionally, a suitable number of the actional band are arranged detachably one upon another of the aforesaid apparatus. By action of both the setting band and the actional band, use of the invention is even more facilitated so that it may be easily used by even a weak person.

Still yet other embodiments of the present invention (designated a No. 7 sectional invention) include an internal arrangement of high tensile type core material having a string shape and coating of a colored layer consisting of a color synthetic rubber or the like with a different color for the cord body in the circumferences of the core material. Because of the arrangement of the colored rubber around the core material, it is possible to foresee the limitations of the use of the anti-skid attachment before the core material is disclosed so as to prevent danger of the core material being broke.

Other embodiments of the present invention (designated a No. 8 sectional invention) involve separating the body of the anti-skid attachment for a car tire at a predetermined interval for a long side direction in the primary embodiment of the invention and, further, arranging a connecting means with both ends of each sectional material of the anti-skid body separated. These embodiments involve the anti-skid attachment for a car tire comprising each sectional material to be freely connected with each other, and also involving some member of the sectional material separately of the anti-skid attachment for a car tire. In these embodiments, it is possible to make the press-mold small when forming each sectional materials of the anti-skid attachment body.

From the foregoing, it should be clear that the present invention allows reduction in manufacturing costs of the press-mold in certain embodiments and, accordingly, reduction in total cost. Thus, it will be possible to reduce the manufacturing cost of the total anti-skid attachment for a car tire of the present invention.

Furthermore, when a part of the anti-skid attachment is cut off in use, it is still usable with a replacement of the part, so that this type of anti-skid attachment can reduce widely the maintenance compared to the conventional type of anti-skid attachment in which it was necessary to replace the whole attachment when a single part was ruined.

Furthermore, by means of connecting the separated sectional material with the anti-skid attachment of a car tire which is held already by a user, it is possible to use it for one size larger type of tire.

Describing still further embodiments of the present invention (designated a No. 9 sectional invention), these embodiments involve the anti-skid attachment for a car tire formed into a ring shape connected at both ends of a long side thereof.

In these embodiments of the present invention, it is possible that the attachment may be formed into a jointless ring shape, and the strength and elasticity of the anti-skid attachment is averaged upon the whole circumference of the anti-skid attachment. Therefore, these types of embodiments can avoid all of the problems relating to strength, to abrasion which occurs at the point of connecting sections of conventional anti-skid attachments, and to vibrations that occur during the running of the car.

It should be further noted that when a car is running, centrifugal force affects the anti-skid attachment for a car tire. This force causes expansion of the anti-skid attachment toward the outside circumference. It should be further noted that an endless shape, such a ring shape, of an anti-skid attachment will not be very much effected by such stretch or aberration as would be a conventional type of anti-skid attachment for a car tire. Thus, expansion due to centrifugal force toward the outside will be extremely small in this type of attachment; thus, reduction of aberration between the car tire and the anti-skid attachment during the running of the car can be minimized. Accordingly, cars will be able to run at higher speeds with the improved apparatus than they would be with conventional apparatus.

With regard to still further embodiments of the present invention (designated a No. 10 sectional invention), these embodiments of the present invention include features fixingly adopting an ultra-high-hardened metal in the crossing section of the net body. Better effects of anti-skid attachments can be shown when this type of hardened metal is employed rather than ordinary metal in the crossing point.

With regard to still further embodiments of the present invention (designated a No. 11 sectional invention), an anti-skid attachment for a car tire may be made by coating core materials with non-vulcanized rubber, inserting these string-based materials into and along net-shaped grooves for netting the bodies of the anti-skid attachment wherein a carved a sub-molding die, setting up the net bodies of the anti-skid attachment under the non-vulcanized treatment upon the net-shaped grooves, and mechanically pressing each section of the crossing section of the non-vulcanized anti-skid attachment bodies. This process is effectively a sub-molding process for fixing the crossing section temporarily. After the above temporary process, the invention further includes the steps of removing the non-vulcanized anti-skid attachment bodies from the above sub-molding die into another net-shaped groove of a molding press machine with vulcanizing treatment, whereupon it will then be molded in a hot-press machining with the vulcanizer. Thus, the apparatus of the present invention can be manufactured by the novel, non-obvious manufacturing method described generally above.

As mentioned above, therefore, the manufacturing method shows the following effects:

(1) the sub-molding die will be good with a simple structure having carved grooves of the net-shaped grooves in order to only knit the core materials with the net-shape of the anti-skid attachment, so that it can ready a lot of the sub-molding die with a lower cost without using a conventional type of vulcanizing mold press machine at a high cost; accordingly, the anti-skid attachment of this invention can be produced by mass-production;

(2) the sub-molding die will be able to take a structure for only use of knitting the anti-skid attachment, so that it will be possible to perform knitting efficiently;

(3) the sub-molded net bodies of the anti-skid attachment itself will be able to handle keeping the form intact so that each section is not dismembered because each section is fixed to the crossing section temporarily; therefore, it will be possible to remove or heap up for storing and it will also be possible to move from the process of the sub-molding to the finishing process of the vulcanizing molding press smoothly; and (4) the sub-molded net bodies themselves are kept in the form mentioned above; therefore, it is easy to set up the above material into the net-shaped grooves for molding of the vulcanizing molding press machine.

Based on showing the four effects set forth above, the No. 11 sectional invention can be manufactured productively and, particularly because of effect number one, no expensive type of vulcanizing molding press machine would be necessary, so that manufacturing costs would be reduced.

Discussing still further embodiments of the present invention (designated a No. 12 sectional invention), these embodiments relate particularly to the sub-molding die apparatus for molding the non-vulcanized net bodies of the anti-skid attachment. Specifically, these embodiments involve connecting a great number of sub-molding dies wherein carved are net-shaped grooves for knitting the net bodies of the anti-skid attachment on the surface thereof flexibly and endlessly; a belt-conveyor type of sub-molding die system comprising a freely actional rotation in correct or reversible direction; providing a piece or a plural number of sending-out-heads moving with a reciprocating motion toward a right angle of the moving direction of the belt-conveyor type of sub-molding die system and sending out thickly coated cords with cores consisting of coating the non-vulcanized rubber around core materials on the surface of the above belt-conveyor of the sub-molding die system; synchronizing the movement of the reciprocating motion of the sending-out-head of the movement of the belt-conveyor type sub-molding die system; and sending out the molded net bodies from the sending-out-head.

Accordingly, this sub-molding die system comprises a sending out section that functions to insert wire rope material into and along net shaped grooved of a sub-molding die; a temporary stopping section having a pressing sectional part to press each of the crossing sections of the non-vulcanized anti-skid net bodies being knitted into net shaped grooves of the sub-molding die system; and a straw cutter to cut off the non-vulcanized anti-skid bodies at a predetermined length which is left out from the end of the sub-molding die system.

As mentioned above, therefore, the sub-molding die system will be able to perform the process of the sub-molding automatically so that the net shaped pattern of the anti-skid net bodies being manufactured in the net grooves of each molding die will be produced as initially standardized, and by means of arranging the relationship in a synchronized manner of those conditions and movements between the number of the sending-out heads to send out the thickly coated cords with cores, the movement of the belt-type sub-molding die system and the movement of the reciprocating motion of the above sending out heads being arranged in accordance with the net shape pattern of the above anti-skid net body. Therefore, the preferably knit pattern of the anti-skid net bodies will be knitted and the crossing sections of the net bodies fixed temporarily, and the bodies will be cut off at a predetermined length.

Furthermore, in order to insert the cords into and along the net shaped grooves of the sub-molding die, the movements and the reciprocating motion of sending out the cords is synchronized with the movement of the belt-conveyor type sub-molding system, and a means is adopted for moving the above sending-out-heads right over the net-shaped grooves head, so that the actional course of the sending out heads will be a simple and straight movement with the reciprocating motion, and the structure of the apparatus will be simplified.

BRIEF DESCRIPTION OF THE DRAWINGS

Other objects, advantages, and new features of the invention will become apparent from the following detailed description of the invention when considered in conjunction with the accompanying drawings wherein:

FIG. 106 is a front view, in partial section, for also showing the sub-molding apparatus;

FIG. 107 is an enlarged longitudinal section for showing the apparatus between the sending out section and the straw cutter shown in FIG. 106;

FIG. 108 is a longitudinal side view of the sending out section;

FIGS. 134–137 are top plan views for showing the belt conveyor type molding die and a single netting type net shape grooves channels.

DETAILED DESCRIPTION OF THE INVENTION

Figure 1:
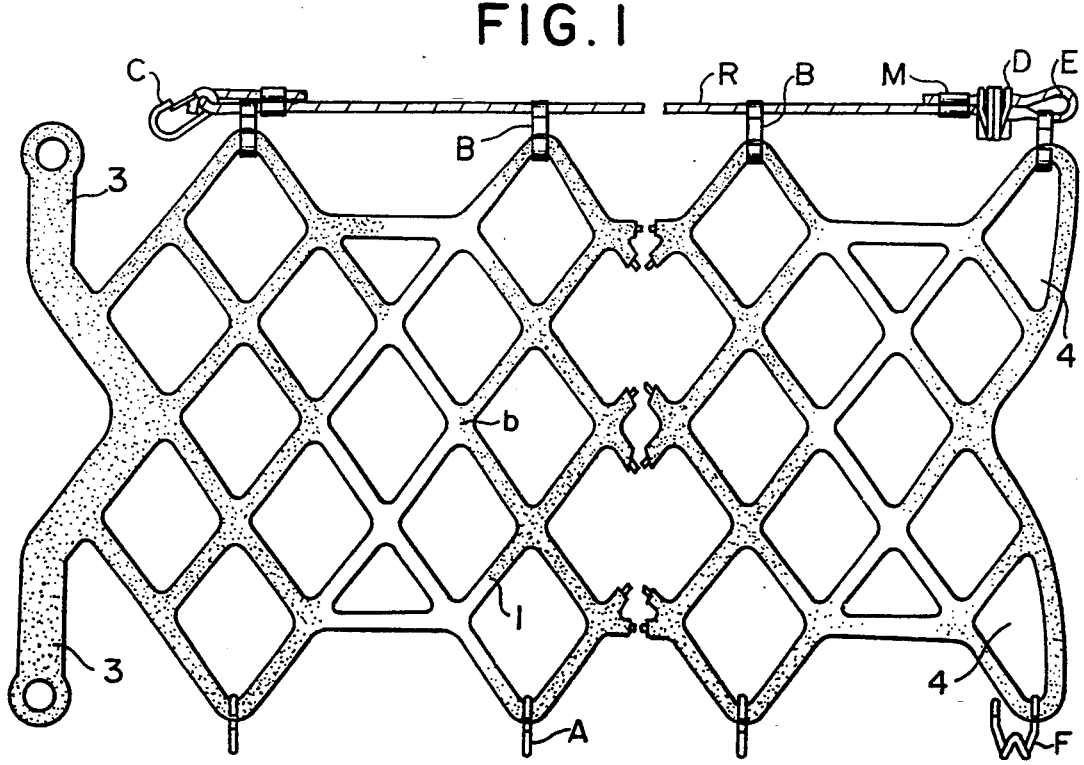
FIG. 1 is a top plan view, in partial section, of an anti-skid attachment for a car tire according to the present invention.
Figure 2:
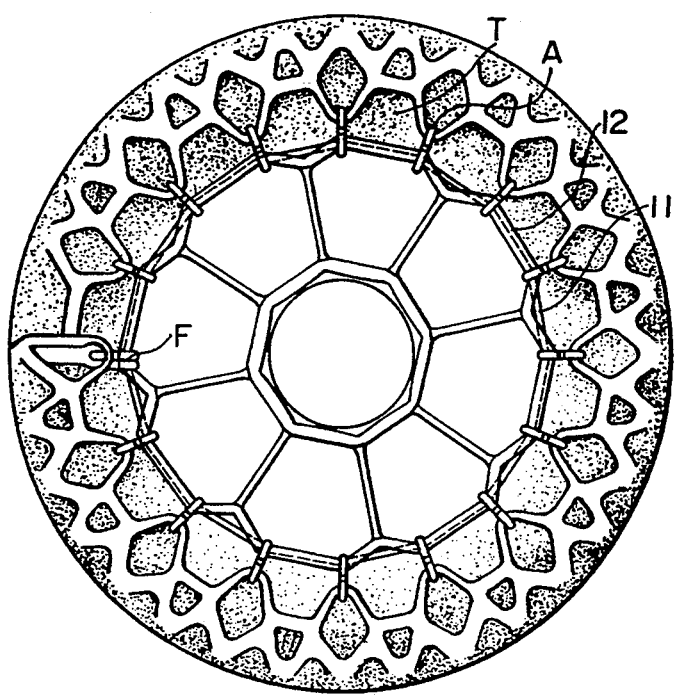
FIG. 2 is a side view for showing a practical example of the anti-skid attachment for a car tire of this invention in the state of fixing the actional bands.

The anti-skid attachment of the present invention is, FIGS. 1–9, composed of netted cords 1 having diameters of about pitch number of the net is about 15 pitches on both sides length of about 1,900 mm, and a total width of about 251 mm. The cords 1 consist of core materials 1a and non-vulcanized rubber 1b.

It is desirable to have more than one core material 1a. Further, the core material should be strong. An example of a suitable material is two pieces of 1200 denier strings of 6—6 nylon twisted into a string, three of which strings are twisted into a main string. With regard to the non-vulcanized rubber 1b, by way of example, the combination set forth below could be adopted:

| | |
|---|---|
| Oil degree SBR | 96.25 |
| BR | 30.00 |
| Oxide zinc #3 | 30.0 |
| Stearic acid | 2.00 |
| HAF pluck | 80.00 |
| Process oil | 15.00 |
| Antioxidant (1 PPD) | 1.00 |
| Vulcanizing | 1.50 |

| | |
|---|---|
| -continued | |
| accelerate (OBS) | |
| Sulfur | 1.50 |

An ideal sectional shape for the cords 1 would be about 10 mm for both horizontal widths and about 7.55 mm vertically thick. It is also desirable to use a number of the core materials at the same time, for example, to use four pieces of string (core materials), 6—6 nylon 1200 denier 2 strings × 3 pieces could be adopted. In such a case, an ideal state of the crossing section b would be those dimensions of around 22 mm of one side width and around 16 mm of another side width horizontally, and around 7.5 mm thick. Against the core materials 1a is coated more than 2 mm of non-vulcanized rubber 1b. If the thickness of the non-vulcanized rubber 1b is one-sided partially, such a defect of not becoming an ideal anti-skid attachment for car tire will occur. According to the broad teachings of the present invention, the cords may be formed into a net shape by any suitable means, however, a preferred automatic mechanical method is disclosed in further detail below.

With regard to alignment of core materials 1a in crossing sections b, an ideal result can be obtained if those materials 1a of an upper stair core materials 1a and a lower stair core materials 1a, wherein are included in an upper side cord 1 and a lower side core 1, are molded and formed in a parallel-line.

With regard to the prevention of abrasion and danger that can result therefrom, a non-vulcanized rubber coat 1c material can be adopted from the following (which is offered in way of example only):

| | |
|---|---|
| Natural rubber | 100 |
| Flowers of zinc | 5 |
| Stearic acid | 2 |
| Accelerate CZ | 1 |
| Sulfur | 2.5 |
| Soft cray | 30 |
| Silica | 15 |
| Titanium white | 5 |
| Coloring pigment | 2 |
| Polyethylene glycol | 1.5 |
| Antioxidant | 2 |

In the above table, the colorational pigment to be adopted should have a different color from the color of the anti-skid attachment bodies 21. Normally, the color of the anti-skid attachment bodies 21 is black, so that some color other than black should be adopted for the non-vulcanized rubber coat 1c to prevent abrasive danger. Ideally, yellow or white could be adopted because they would become very conspicuous when they become exposed at the surface.

Figure 13:
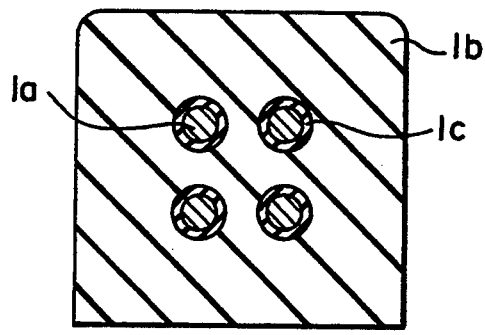
FIG. 13 is a sectional view for showing the wire rope materials including the coating of the non-vulcanized rubber for preventing danger.
Figure 14:
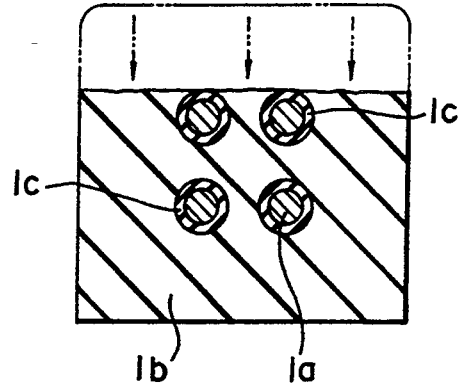
FIG. 14 is a sectional view for showing the state of an abrasive surface of the non-vulcanized rubber coated wire rope materials for preventing danger.

As shown in FIG. 13, those cords 1 which comprise the anti-skid attachment bodies 21 will be coated by non-vulcanized rubber 1c colored with a different color for preventing abrasive danger.

The above-mentioned non-vulcanized attachment bodies 21 form non-vulcanized attachment net bodies 21. The cords 1, in a non-vulcanized state, are put into a net shape and molded by a press die for unification while being treated for vulcanization. Thus, the non-vulcanized rubber 1b of the cords 1 and the non-vulcanized rubber coat 1c for preventing the abrasive danger are made together by non-vulcanized rubber in an initial stage of manufacture.

Figure 12:
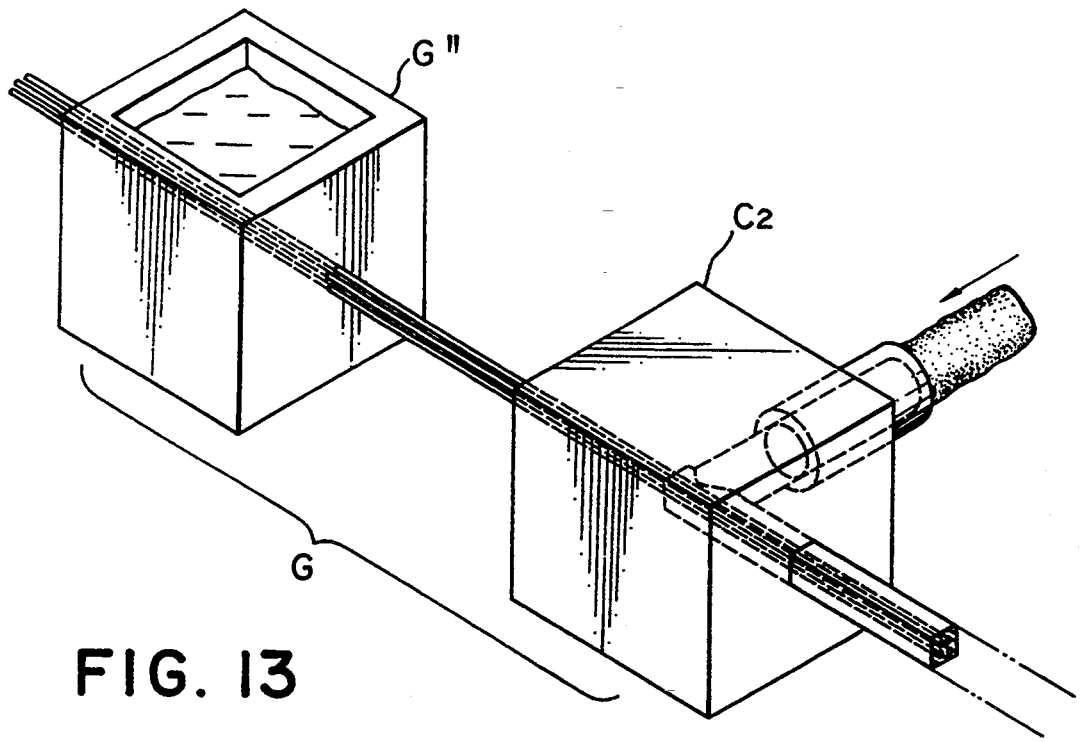
FIG. 12 is a perspective view for showing the molding apparatus to extrude with a coating of the non-vulcanized rubber around the core materials for preventing danger.

The cords 1 of the non-vulcanized state will be, as in FIG. 12, molded in an extrusive molding apparatus G'. This apparatus mixes the non-vulcanized rubber coating materials 1c for preventing the abrasive danger with a solvent in a tank G" to make a paste, puts four pieces of the core materials 1a into the tank G", makes the core materials 1a pass through the tank G", and coats the colored rubber around each of the core materials 1a.

Additionally, apparatus G' drys the colored rubber coated around the core materials 1a, and feeds the core materials 1a into the inlet port of an extrusive apparatus CHD with tension on the core materials 1a. The sectional shape of inlet port of the extrusive apparatus CHD is almost a regular square. The aforesaid core materials 1a generally pass through a center section of the extrusive apparatus. Furthermore, the non-vulcanized rubber 1b which forms the cords pressingly feeds into the inlet port of the extrusive apparatus CHD, and the cords extrude from an exit of the extrusive apparatus CHD. Accordingly, the cords 1 of the non-vulcanized state including the core materials 1a to be coated by the non-vulcanized rubber coat 1 for preventing the abrasive danger are formed.

Figure 15:
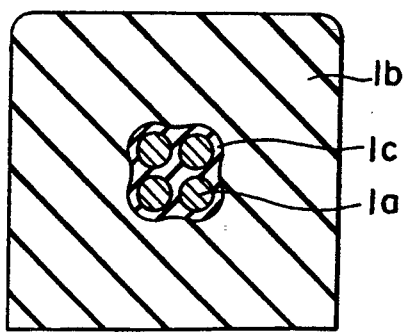
FIG. 15 is a sectional view for showing the non-vulcanized rubber coated with wire rope materials upon a bundled state of the wire rope materials.

FIG. 15 is the sectional view showing a cord 1 of the anti-skid attachment net bodies 21 in another practical example. This cord 1 has four bundled pieces of core material coated with non-vulcanized rubber 1c for preventing abrasive danger.

Figure 16:
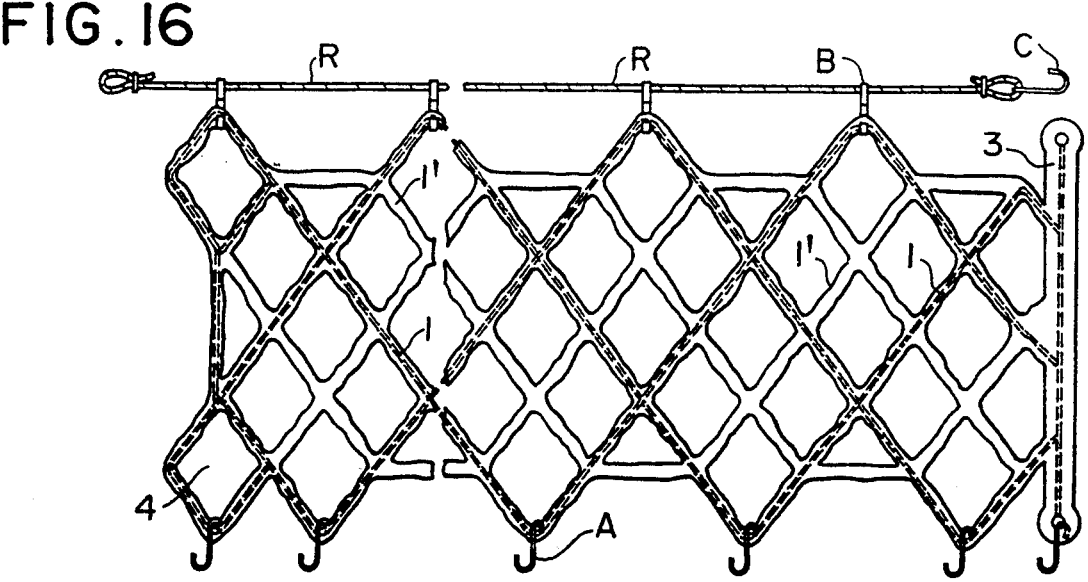
FIG. 16 is a top plan view, in partial section, for showing a practical example of goods of this invention, and the anti-skid attachment of the car tire in which uses the cords without the core materials partially.
Figure 17:
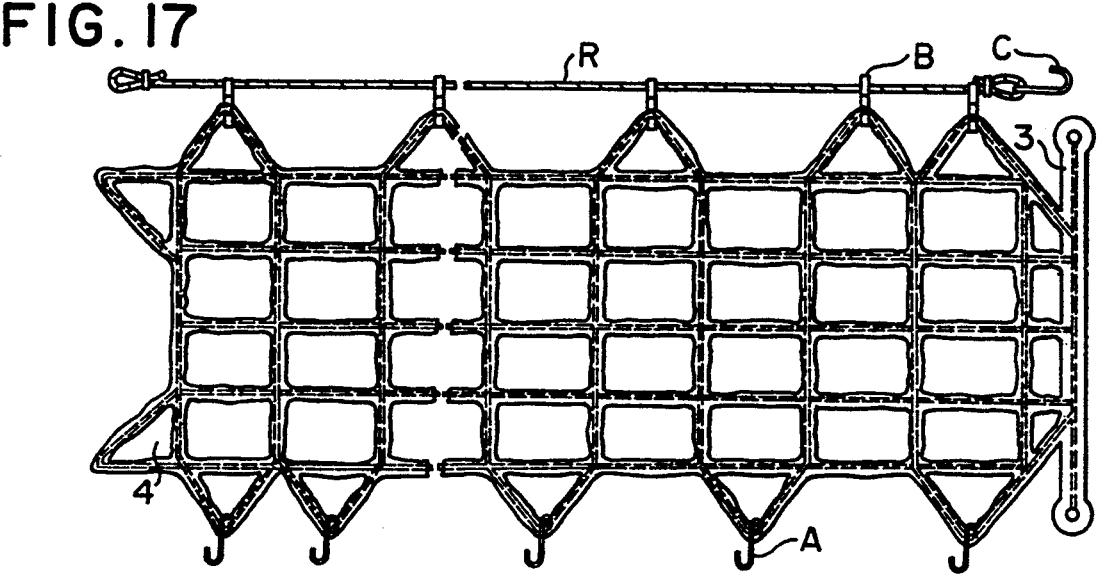
FIG. 17 is a top plan view, in partial section, for showing a practical example of this invention, and the anti-skid attachment of the car tire in which is formed as a grating shape by the cords.
Figure 18:
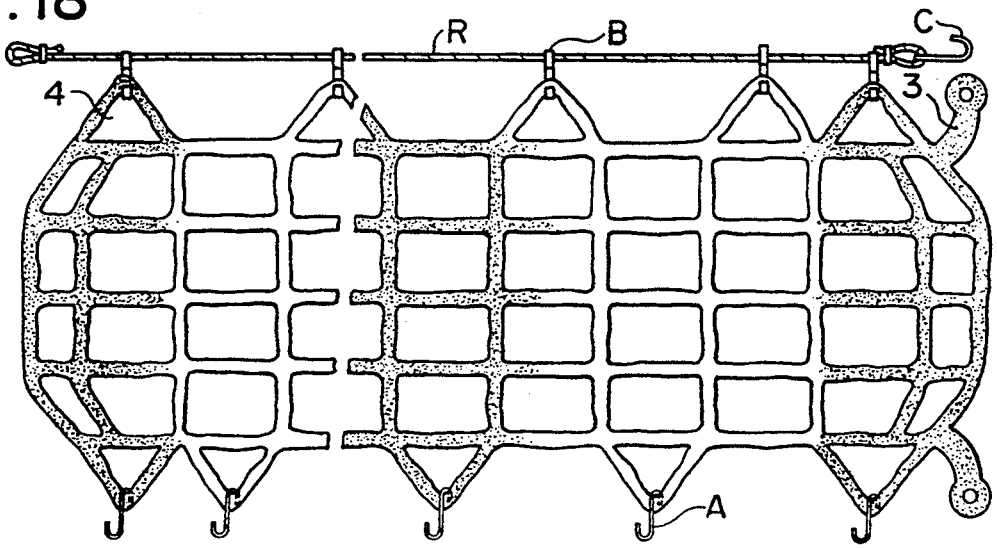
FIG. 18 is a top plan view, in partial section, for showing a practical example of this invention, and the anti-skid attachment of the car tire in which the covering section of covering the tread section of the tire is designed longer suitably than the covering section of covering the side wall of the tire.
Figure 19:
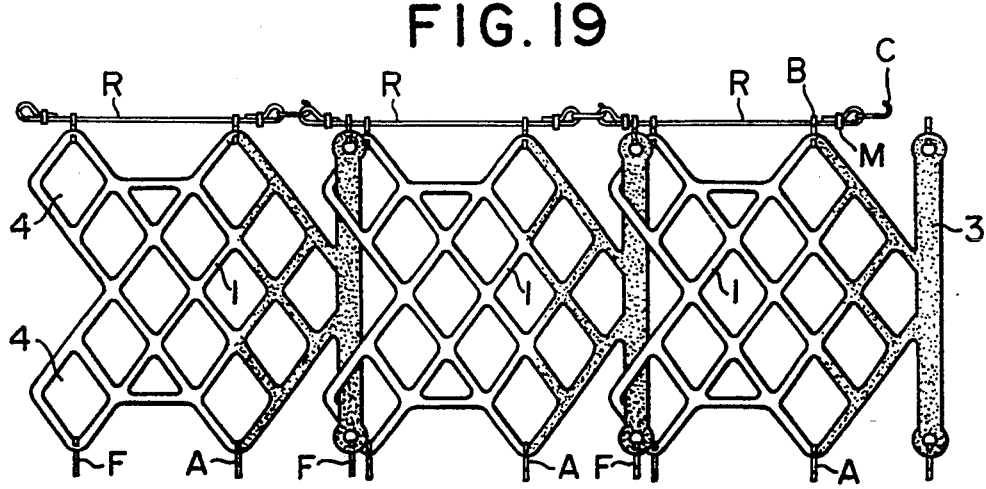
FIG. 19 is a top plan view for showing a practical example of the No. 6 section invention, and an independently separated unit system of the anti-skid attachment of the car tire.
Figure 20:
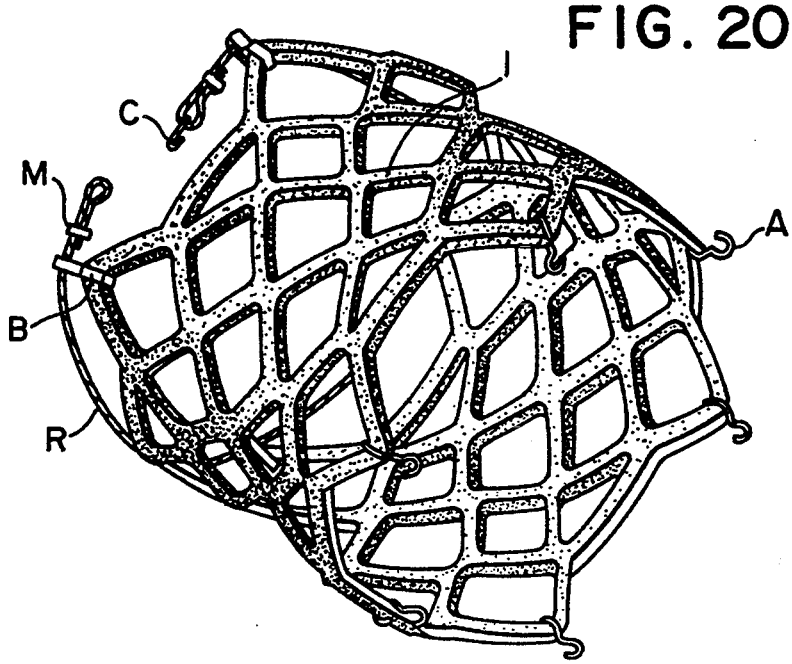
FIG. 20 is a perspective view for showing the anti-skid attachment of the car tire in which is practiced in the No. 7 sectional invention.
Figure 21:
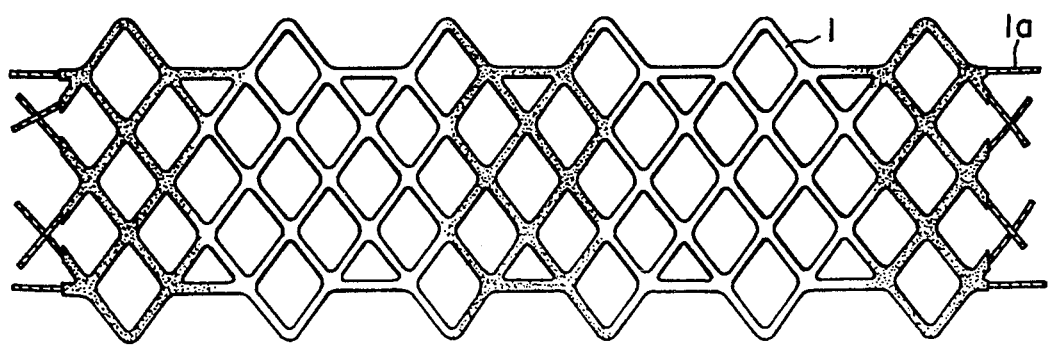
FIG. 21 is a top plan view for showing the practiced commodity of the No. 7 sectional invention in which is formed with a belt shape.
Figure 22:
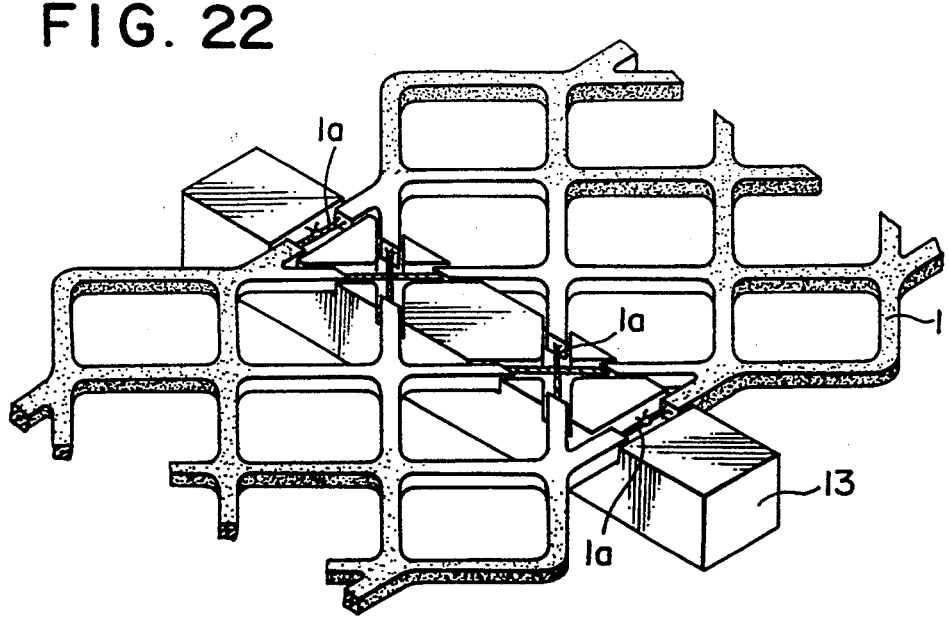
FIG. 22 is a perspective view for showing the state of connecting the core material of the anti-skid attachment of the car tire to each other in the No. 7 sectional invention.
Figure 23:
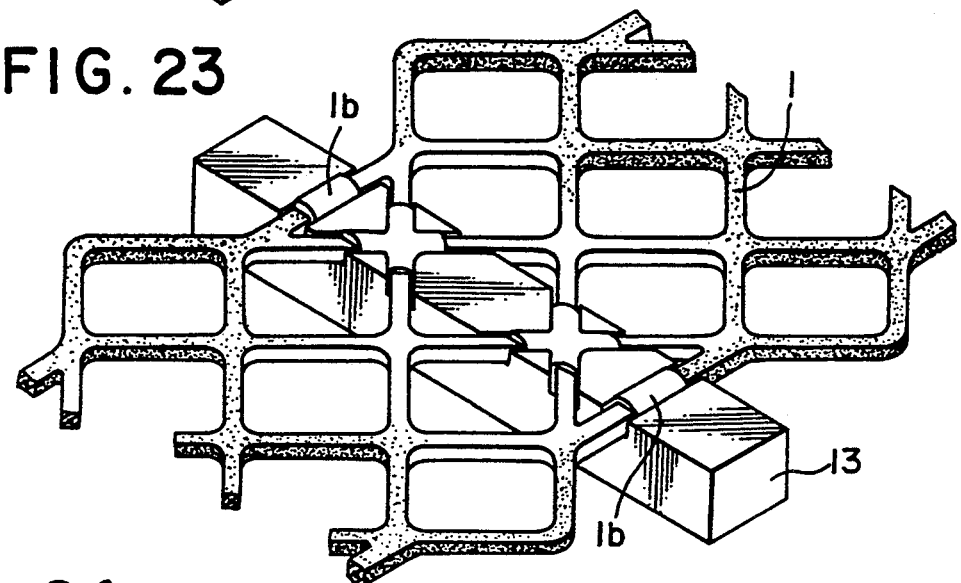
FIG. 23 is a perspective view for showing the state of putting the non-vulcanized rubber on the connecting section of the core materials in FIG. 22.
Figure 24:
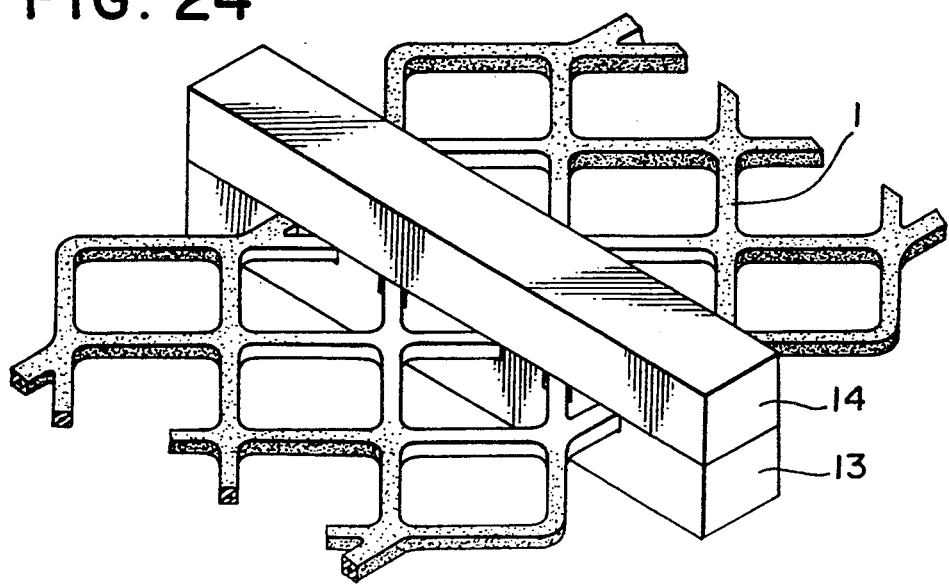
FIG. 24 is a perspective view for showing the pressing process with a vulcanizing against the non-vulcanized rubber in FIG. 23.

As shown in FIG. 16, it is good to use cords 1 with the core materials 1a and also materials 11 without the core materials 1a in a mixed combination and, further, it is good to use them with a lattice shape as shown in FIG. 17. Still further as shown in FIG. 18, it is good to design calculatingly to separate a coverable section for covering the tread section of a tire and a covering section for covering the sidewall section of the tire. As shown in FIG. 19, such a design could consist of three units of the unit sectional materials 21a, 21b, and 21c. The outside of such a body could have detachable metallic parts A fixed in the middle position to hook the setting bands 11 into the hooking-parts of the outside and, at its ends, such a body could fixedly have multiple use metallic parts for connecting to and detaching from the net bodies. In the inside, such a body consists of fixed inside wire ropes R which are separable into three pieces along the hook section of the inside 2. As shown in FIGS. 20-26, when the anti-skid attachment of the car tire is rolled into a ring shape, a predetermined length of projected core materials 1a are taken out from both ends of the cords 1 of the anti-skid attachment bodies 21 which are formed in a belt shape and fastened together with both core materials 1a (shown in FIG. 22) and, furthermore, as shown in FIG. 23, set up with the above-fastened section into the net shaped grooves of the molding press die 13 for fastening the above connecting section, and inserted with non-vulcanized rubber 1b into the net shaped grooves and filled up with the necessary materials into a void in the connecting section. Further, in the above state, a heated up hot-press is pressed down on the surface of the above molding press die 13 for fastening the connecting section, and the non-vulcanized rubber 1b which is loaded within the net shaped grooves is vulcanized and fastened together to form a unit with the connection section. This forms the anti-skid attachment net bodies 21 with a seamless ring shape.

The above-mentioned molding method involves fastening the ends of the ring-shaped anti-skid attachment net bodies 21; however, there are other different molding methods for molding ring shaped anti-skid attachment net bodies 21. A "one time stroke" method will now be explained with reference to FIGS. 25 and 26.

Figure 25:
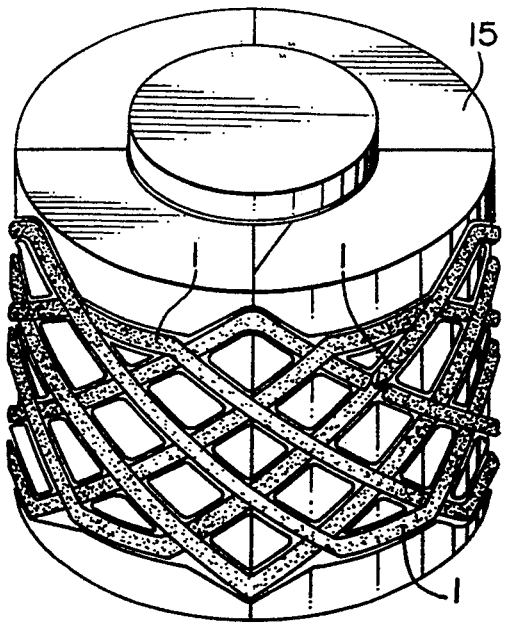
FIG. 25 is a perspective view for showing the state of netting the practiced materials of the No. 7 sectional invention within a cylindrical molding die for a press machine.
Figure 26:
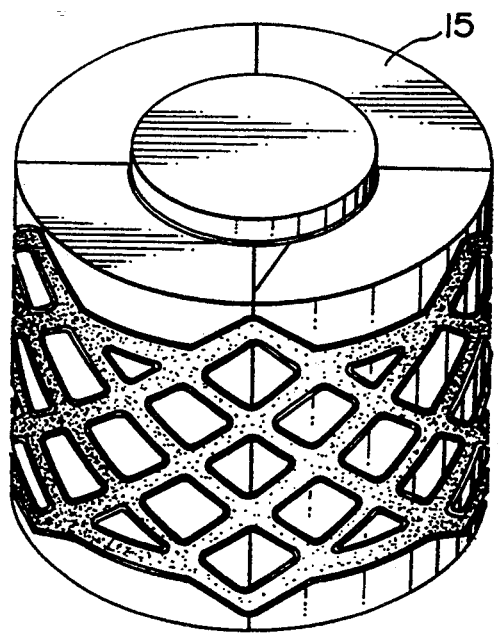
FIG. 26 is a perspective view for showing the molding die of the press machine after finish of pressing treatment in FIG. 25.
Figure 27:
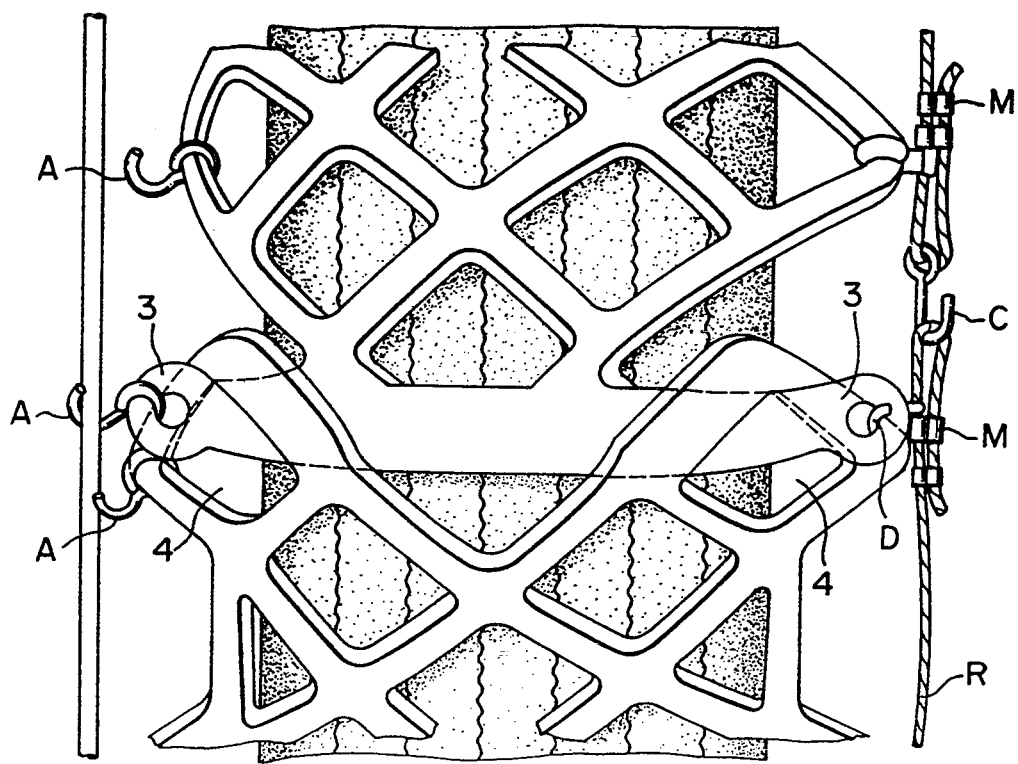
FIG. 27 is an enlarged front view for showing the another type of structure of the connecting section in which is practiced in this invention.
Figure 28:
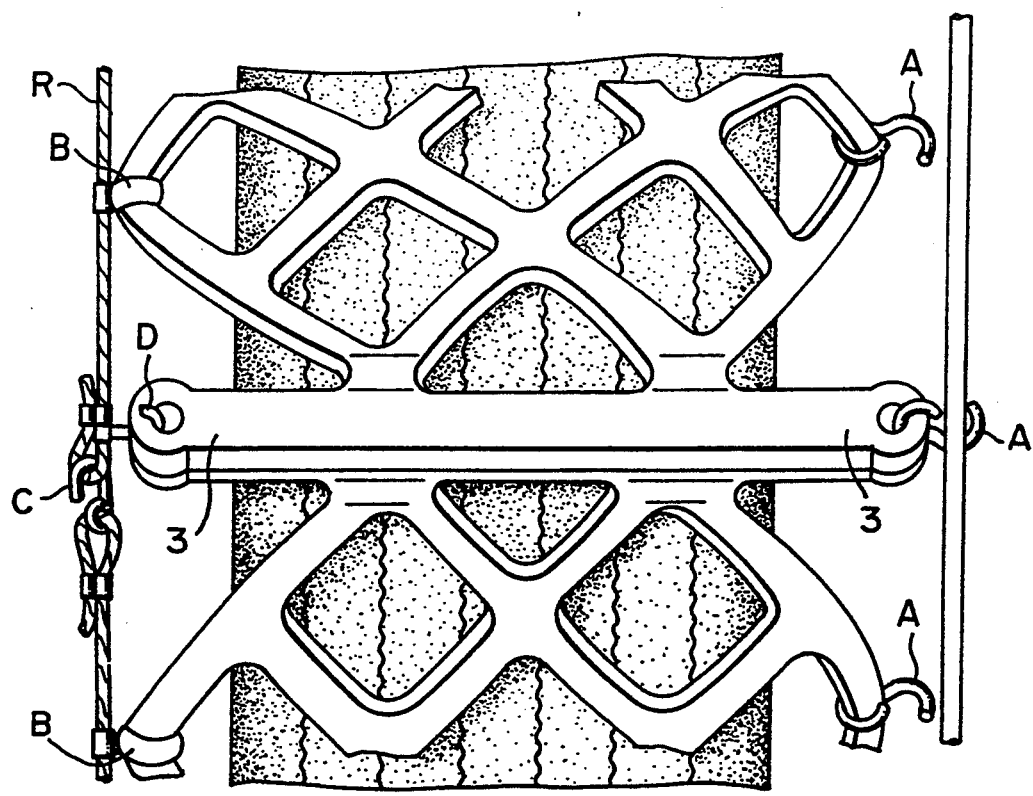
FIG. 28 is an enlarged front view for showing the example of using with the piled up connecting bands of the practiced goods in this invention.
Figure 29:
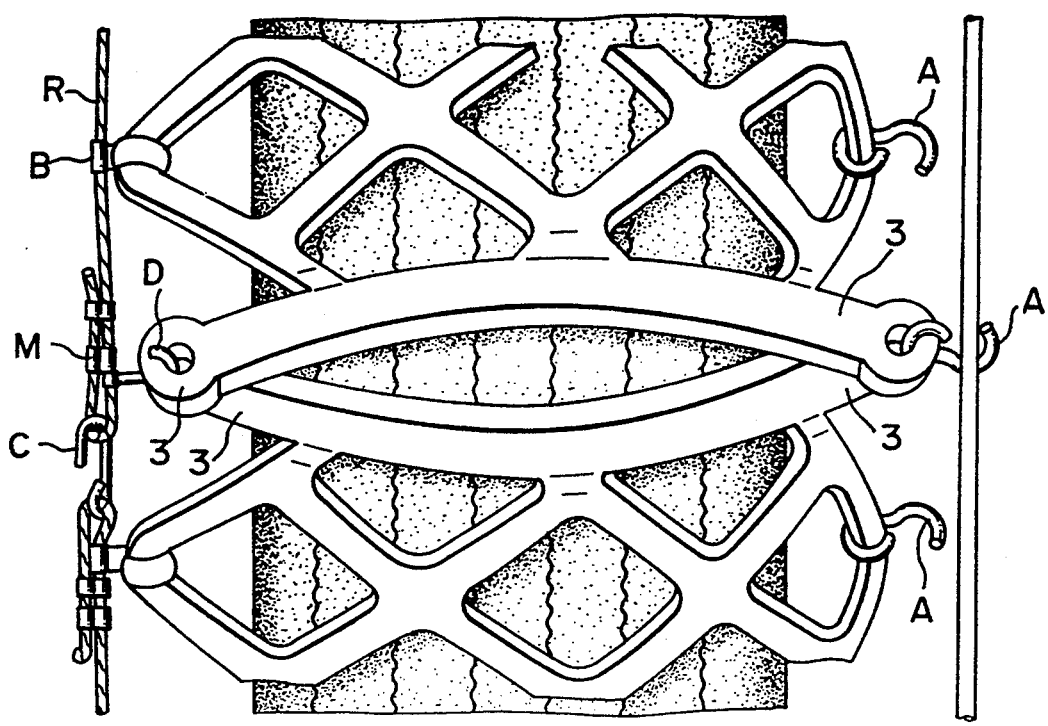
FIG. 29 is an enlarged front view for showing the practical example of this invention with the connecting bands formed by a circular arc shape.
Figure 30:
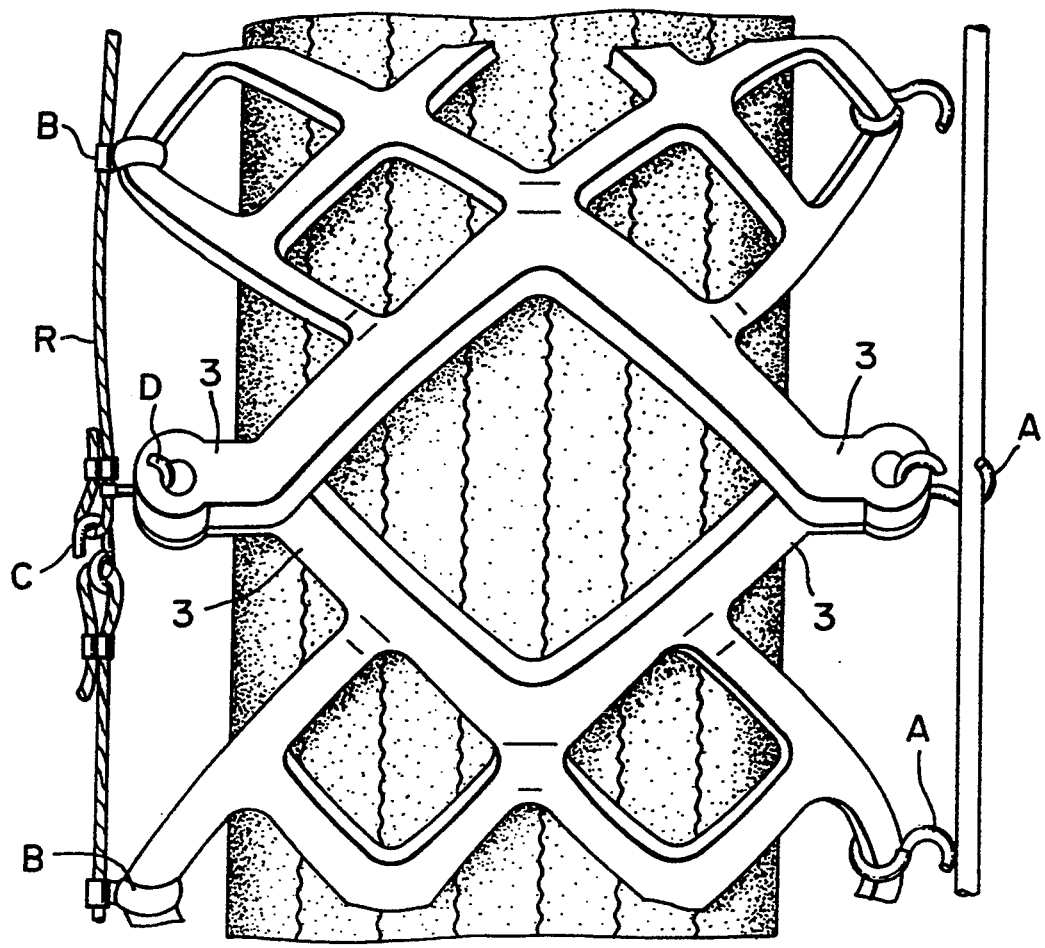
FIG. 30 is an enlarged front view for showing dogleg shaped connecting bands for practice of this invention.
Figure 31:
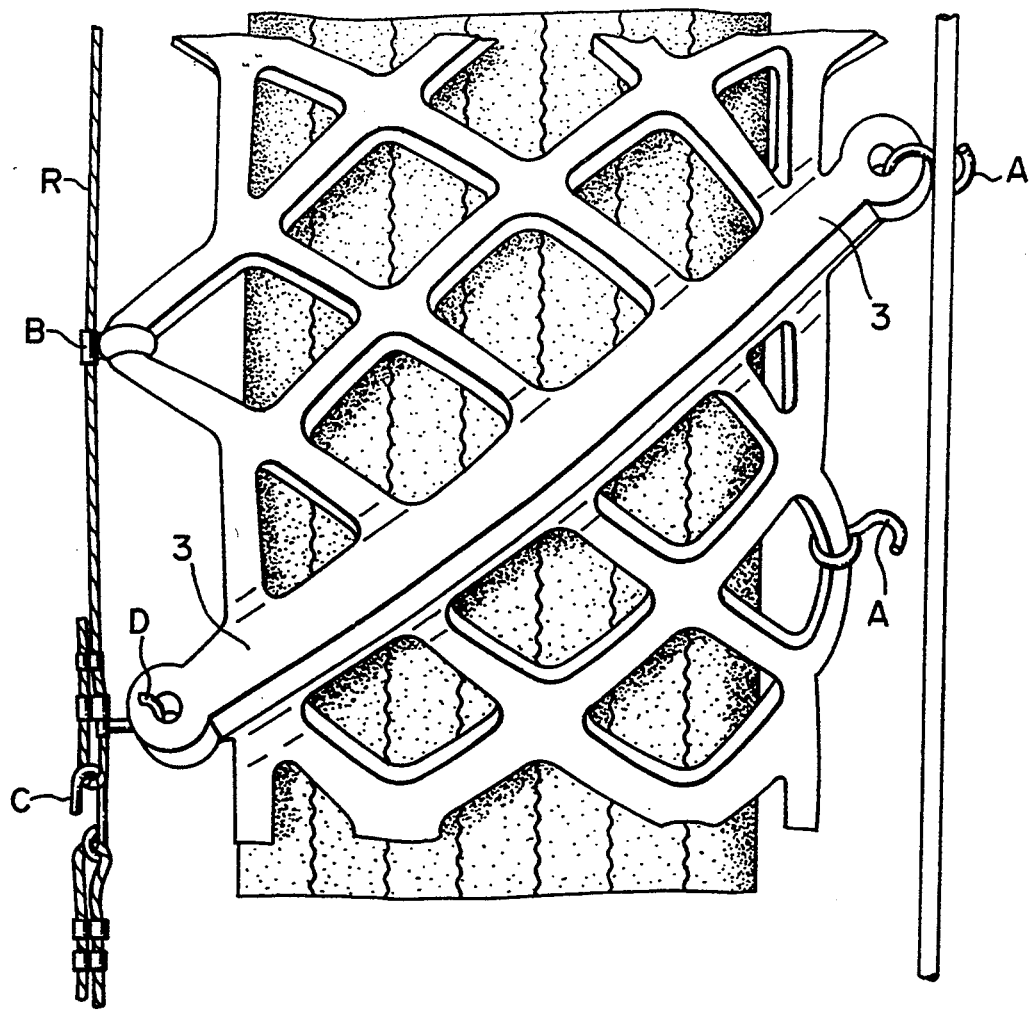
FIG. 31 is an enlarged front view for showing the practical example of a skew shaped connecting bands in this invention.
Figure 32:
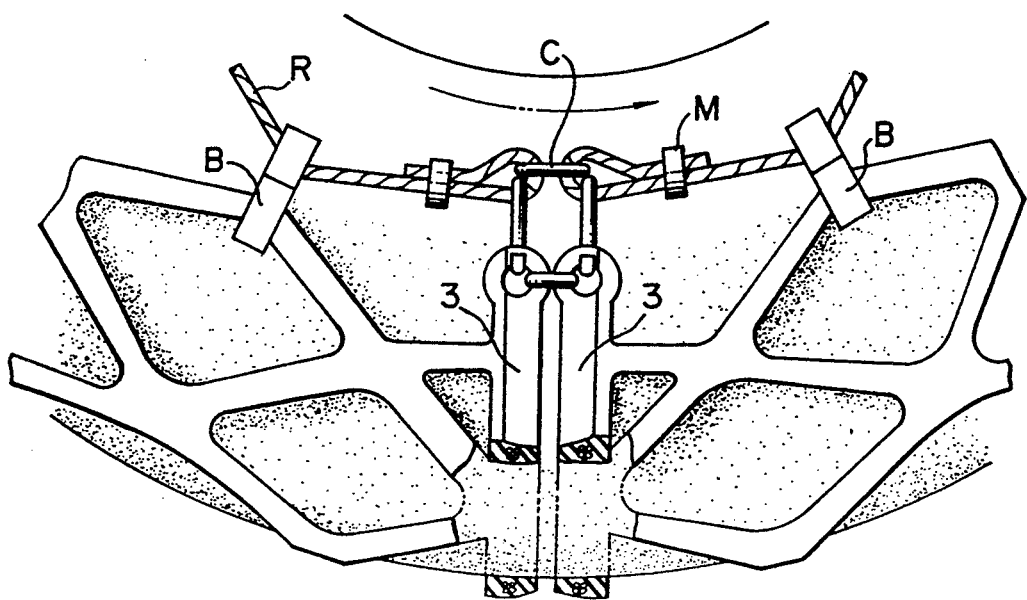
FIG. 32 is an enlarged view, in partial section, for showing the connecting section in the state of fixing the anti-skid attachment in which is practiced in this convention.

With respect to the knitting mold, as shown in FIG. 25, the cords 1 are inserted in order into and along net shaped rows of the cylindrical shaped molding press die 15, knitted to form the non-vulcanized anti-skid attachment net bodies within the molding die 15, and then vulcanization molded.

Figure 6:
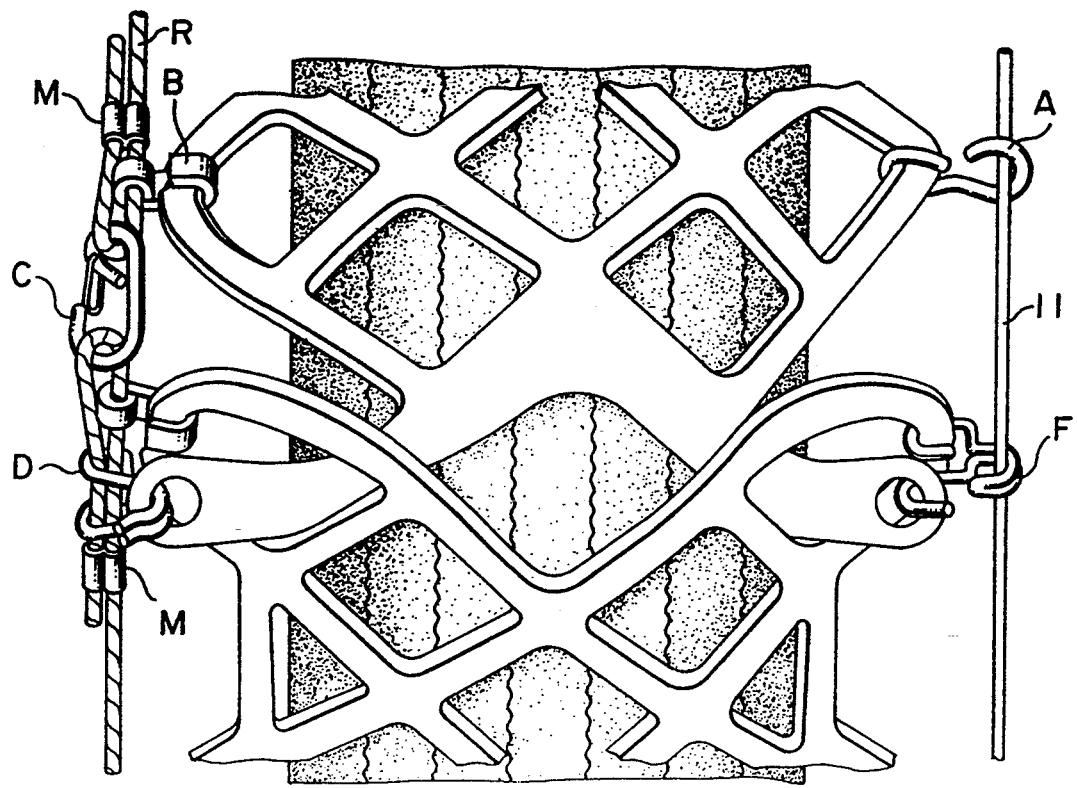
FIG. 6 is an enlarged front view for showing the jointing section of those metallic parts for use of the anti-skid attachment of this invention.

The connecting means of the anti-skid attachment net bodies 21 will be, as shown in FIG. 6, fastened unifiably to the connecting bands 3, which are projected to both inside and outside directions with an end of the anti-skid net bodies 21. At the other end of the anti-skid net bodies 21, the inside and outside sections of the bands are inserted into the other end to form a connecting section 4 for hooking. Along both side edges of the inside and outside of the above anti-skid net bodies 21, at predetermined intervals, are formed inside hook sections 2 and outside hook sections 2'. Non-expandable inside wire-ropes R are fixedly set up along each of the inside hook sections 2 through inside wire ropes fixing metallic parts B.

The connecting sections 4 are formed in one side end of both side sections of the anti-skid net bodies 21, and they are formed in a ring shape so that both side sections of the inside and outside of the connecting band 3 can be inserted. Any shape of the inside and outside connecting sections will be good if they form ring shapes, however, the connecting bands 3 of the anti-skid net bodies 21 are generally formed as isosceles triangles with the base section situated at an opposite side of the anti-skid net bodies 21.

Referring now to FIGS. 27–32, another connecting means is shown therein. This connecting means provides for the connecting band 3 to project in the width direction with an end of the anti-skid net bodies 21 unifiably and, further, connecting sections 4 having similar net shapes are formed in both side sections of other end of the bodies 21. Detachable metallic parts A or the like are fixed with an inside hook section 2 which is arranged in parallel. An outside hook section 2' in both edges of the anti-skid net bodies 21 is also fixed in conjunction with a fixing wire rope R.

The aforesaid connecting band 4 may be fixed insertingly by the connecting band 3 with both ends from the inside. In such a case, the width of an overlapped section in the outside of the connecting bands 3 in the above connecting sections 4, 4 will be formed within a range of between 11 mm and 19 mm. The width of this section should be wider than the width 10 mm of the section to form another net shape, e.g., around 15 mm width would be suitable.

Furthermore, as another connecting means, anti-skid net bodies 21 and the connecting bands 3, which are arranged along the whole length of the width direction of the bodies 21 in both ends of the bodies 21, and the connecting bands 3, 3 which are disposed unifiably with both end sections of the above anti-skid net bodies 21, will internally contain core materials similar to the core materials 1a of the cords 1 and, further, having a width larger than the width of the cords 1 which comprise the anti-skid net bodies 21.

For example, it would be suitable to have 18 mm of width as opposed to a cord 1 width of 9 mm.

Connecting bands 3, 3 may be suitably bent into a dogleg shape and, further, both ends of the connecting bands 3, 3 may have holes inserted by metallic parts F for connecting and detaching the net bodies 21 multiply and also for disposition of the net connecting metallic parts D.

These connecting bands 3 are not, however, limited to having a dog leg shape. A linear shape or a circular arc shape are also possible. It would also be good to use the metallic parts F face to face with the connecting bands 3 for connecting and detaching the net bodies 21 multiply instead of the net connecting metallic parts D.

The thickness of the connecting bands 3 of the anti-skid net bodies 2 should be made to have the same thickness as the cords 1. When the width is enlarged, however, it will be good to increase the thickness of the connecting bands 3, and by means of this increase, the strength of the connecting bands 3 will be improved.

The connecting bands 3 and the connecting sections 4, 4 will be formed to make inclined surfaces along most end-edges by means of making an incline around most end-edges of the surfaces of the anti-skid net bodies 21.

Figure 33:
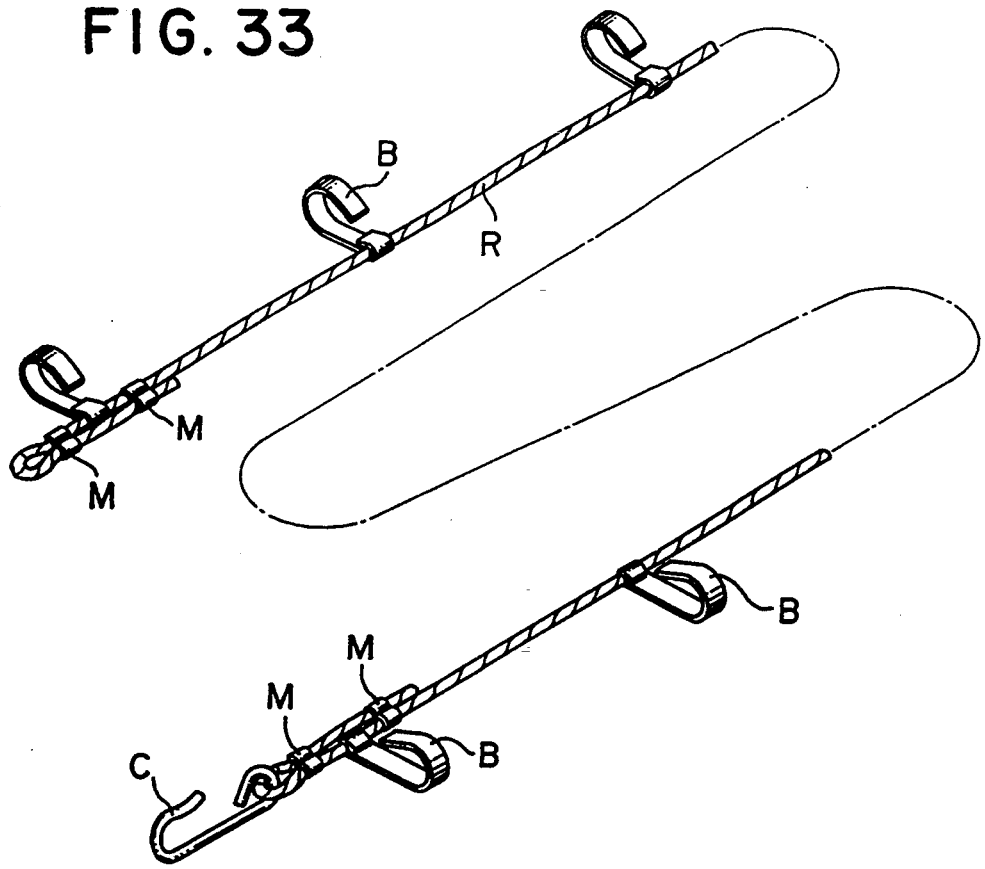
FIG. 33 is a perspective view, in partial section, wire rope for using the practiced goods of this invention.
Figure 34:
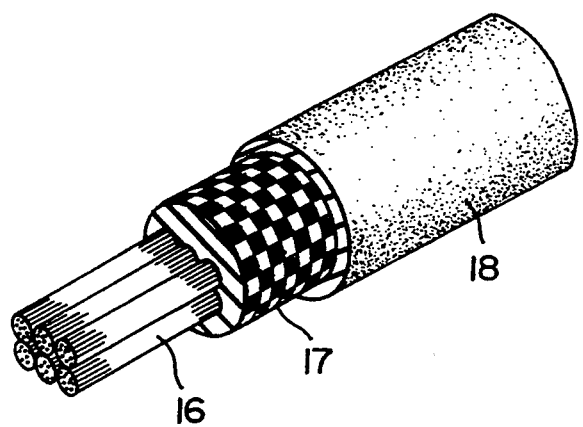
FIG. 34 is an enlarged perspective view of the wire rope.

As shown in FIG. 33 and FIG. 34, the inside wire ropes R and the outside wire ropes R' of the anti-skid net bodies 21 in the anti-skid attachment for a car tire will be made to coat a textile material consisting of a high-tension fibers around the core materials of the wire ropes 16 and, further, to coat a thin film of a rubber around the surface of the core materials 16.

The core materials of the wire ropes 16 are made of a bundle of synthetic fiber, such as a nylon fiber, having a high tension. In the case of the core materials of the wire rope 16, it is desirable to bundle a suitable number of fibers. As to the above fiber used for making the core materials 16, any type of the fiber will be acceptable if it has a high tensibility. For example, a glass fiber or the like would be acceptable.

Around the core materials of the wire ropes 16, a synthetic rubber, a natural rubber or some coating material consisting of a sort of plastic having a good anti-abrasion ability is disposed.

In the above composition, the inside wire rope R is cut into suitable lengths for the diameter of a tire and both ends of the rope are bent. Metallic parts forming a loop M are caulked fixingly to form a loop E, and the connecting sections E, E are each composed so as to be connectable or detachable by hooking metallic parts C. Along a whole length of the inside wire rope R at predetermined intervals a number from between 13 and 16 pieces of a fixing metallic parts of the inside wire rope B are fixedly set up.

Figure 35:
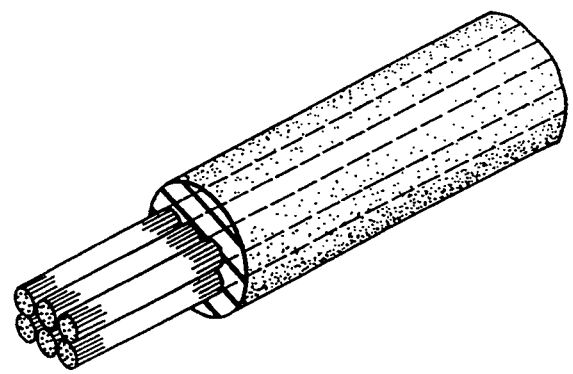
FIG. 35 is an enlarged perspective view of a conventional rope.
Figure 36:
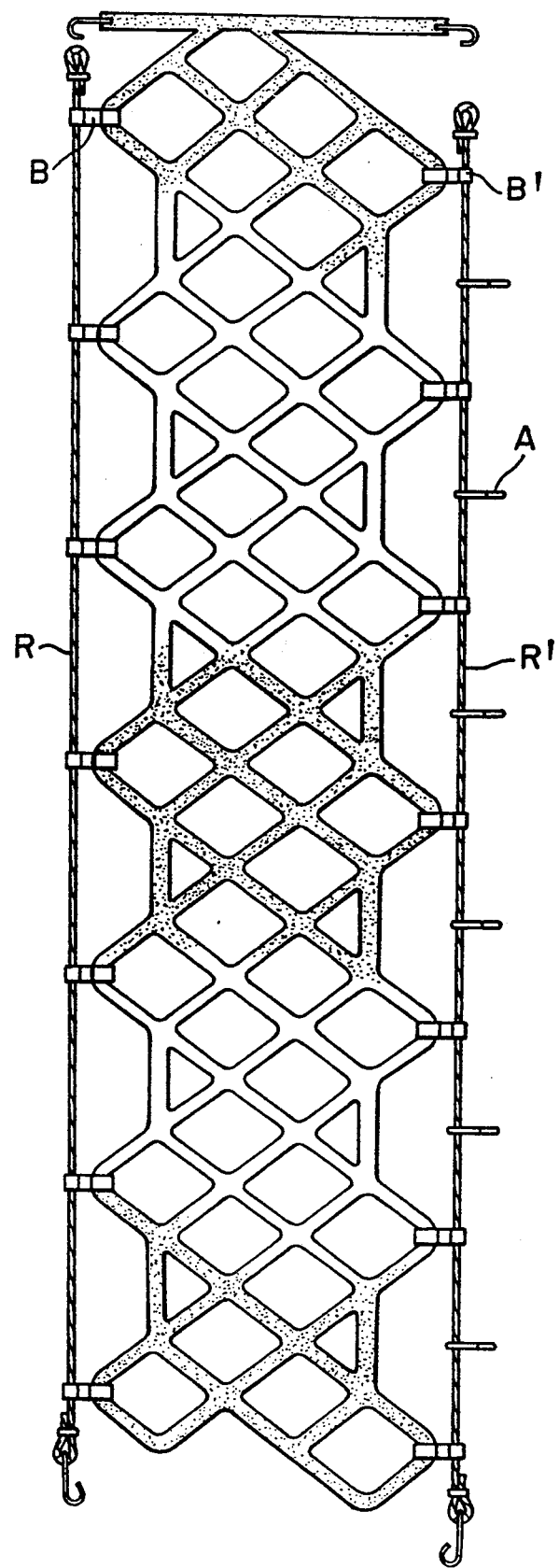
FIG. 36 is a front view for showing the anti-skid attachment of the car tire in which is a practical example of this invention.
Figure 37:
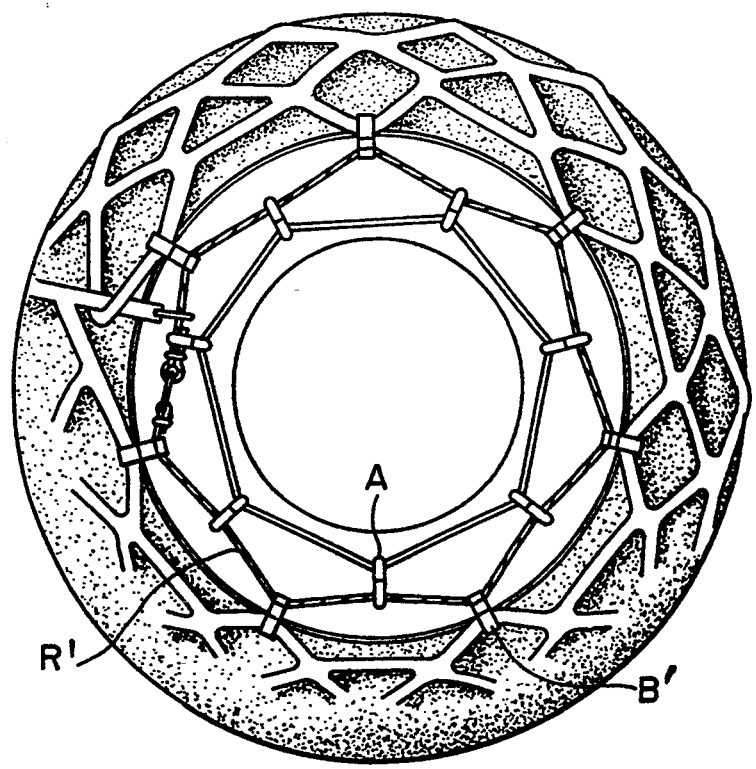
FIG. 37 is a side view for showing the state of fixing the anti-skid attachment with the tire.
Figure 38:
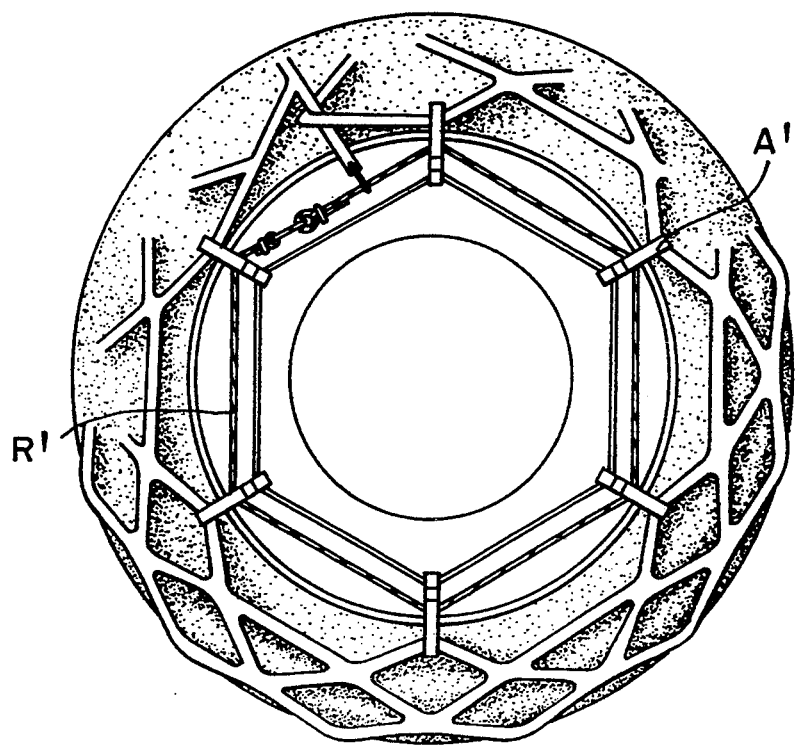
FIG. 38 is a side view for showing the state of fixing the anti-skid attachment with another method.
Figure 39:
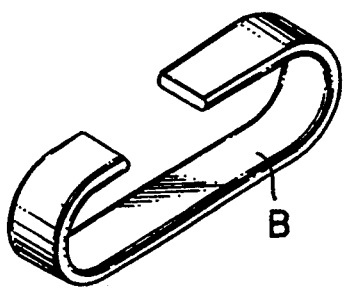
FIG. 39 is a perspective view for showing the fixing metallic parts of the inside wire ropes for using the practical goods of this invention.
Figure 40:
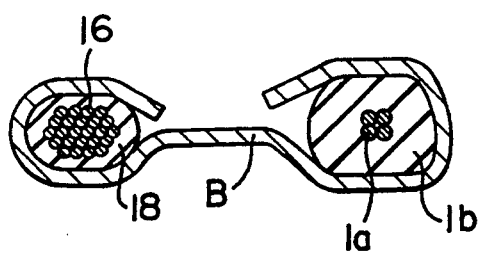
FIG. 40 is a sectional view for showing the state of using the fixing metallic parts in FIG. 39.

FIG. 35 shows a conventional example. Further, FIG. 36, FIG. 37 and FIG. 38 show an example of use of the outside wire rope R'. In the outside edges of the anti-skid net bodies outside hooking sections 2' with a predetermined interval are formed, and along the outside hooking section 2' the outside wire rope R' is fixed with each outside hooking section 2' through the fixing metallic parts of the outside wire rope B' so that it does not slip off the outside wire rope R' against each outside hooking sections 2'.

The outside wire ropes R' can be bent at both ends and caulked fixingly to form a loop E by the metallic parts for forming the loop M of the wire rope, and the loops E, E are designed to connect with or detach from each other by the hooking metallic parts C.

In the center of each hooking section of the outside wire rope R', an end of S-shape formed detachable metallic parts A is fixed so as to be able to hook the ring shaped setting bands 11 into another end side of the detachable metallic parts A. In addition, this fixes the detachable metallic parts A between each outside hooking section 2' of the anti-skid net bodies 21. It is desirable to draw the outside wire rope R' toward a center direction of the tire by the setting bands 11.

Figure 41:
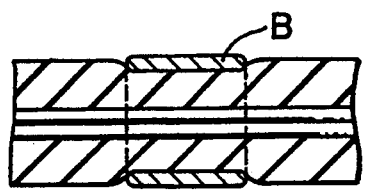
FIG. 41 is a sectional view for showing the metallic parts viewed from another angle than the one used in FIG. 40.
Figure 42:
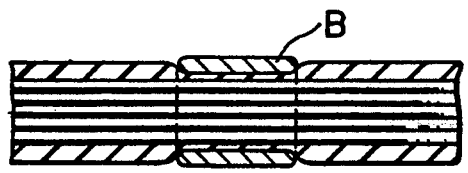
FIG. 42 is a sectional view for showing the metallic parts viewed from yet another angle than the one used in FIG. 40.

Explaining those types of metallic parts in the anti-skid attachment of the car tire, first explaining details regarding the fixing metallic parts of the inside wire rope B and the improved types with the drawings, shown in FIGS. 39-42, a belt-shape steel plate is bent into a mostly C shape. An end of the steel plate is hooked to an inside hooking section of the anti-skid net bodies to form a caulkingly fixed hooking section, and the inside wire rope R is hooked into the other end side so as to form a caulkingly fixed hooking section of the wire rope. As shown in FIG. 41, the circle edges of the both side sections of the metallic parts B will be formed so as to become a half circle shape upon the slice section. This forms the inside fixing metallic parts of the wire rope B.

Figure 43:
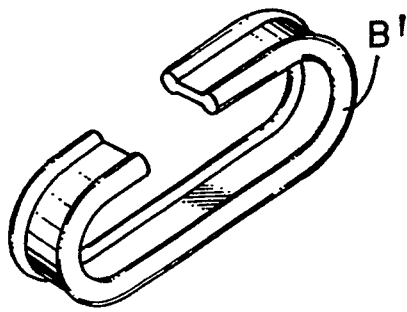
FIG. 43 is a perspective view for showing the fixing metallic parts of the inside wire ropes in another practical example.
Figure 44:
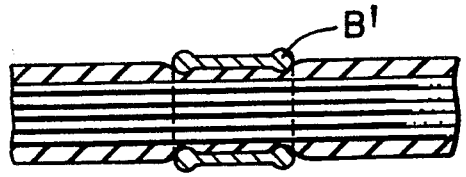
FIG. 44 is a longitudinal section for showing the hook-fixing section of the wire ropes in the fixed state of metallic parts in FIG. 43.
Figure 45:
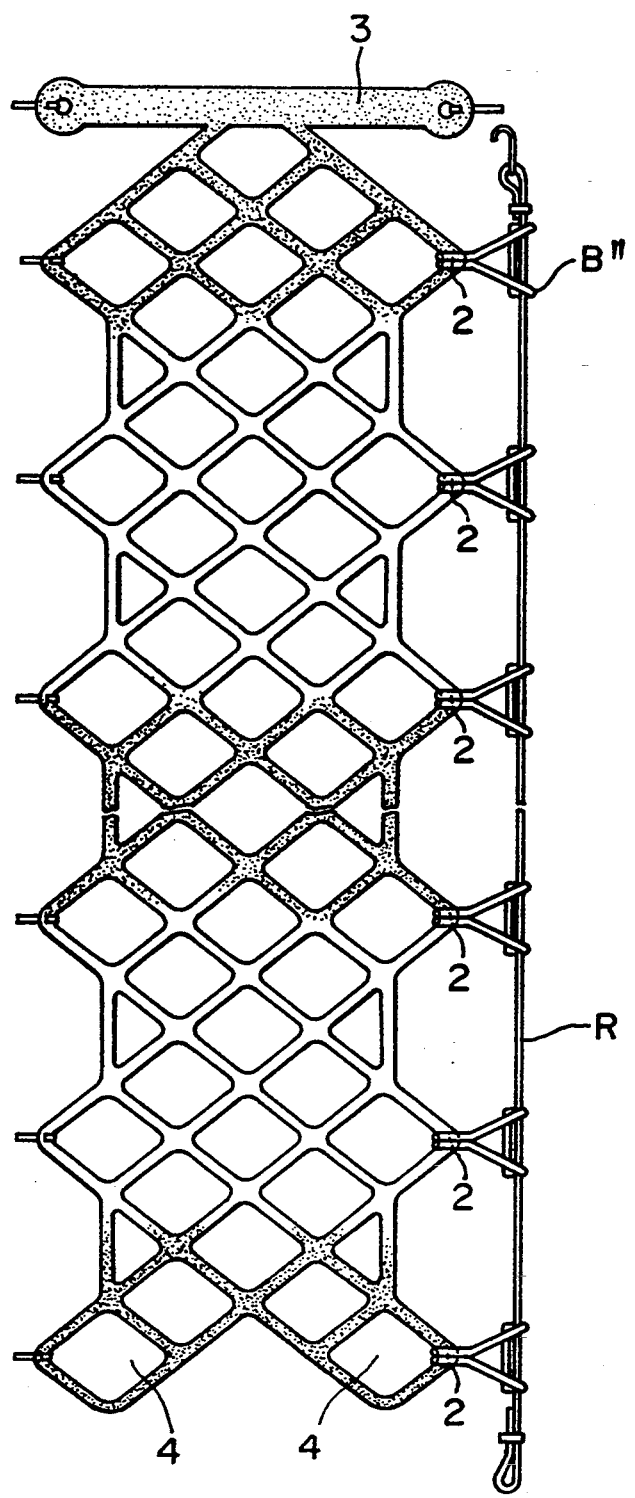
FIG. 45 is a top plan view for showing the anti-skid attachment of the car tire in which is fixed the fixing metallic parts of the inside wire ropes for using the practiced goods of this invention.
Figure 46:
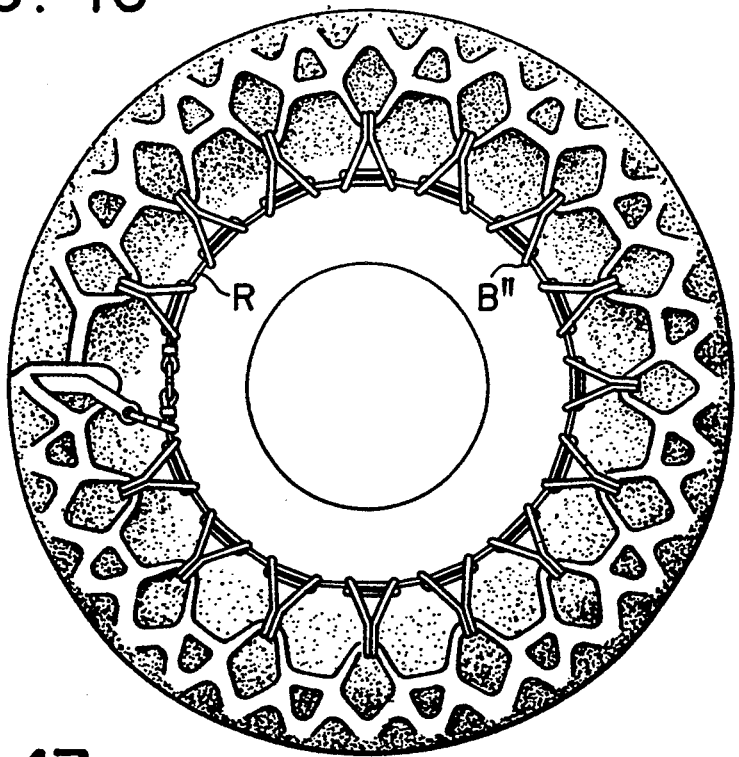
FIG. 46 is a side view for showing the tire of which is fixed by the anti-skid attachment.

As shown in FIG. 43 and FIG. 44, both side circle edges of the fixing metallic parts of the inside wire rope are projected with a cylindrical shape, and formed into a hand dumbbell shape in the slice section, and made into a No. 1 improved type of the fixing metallic parts B' of the inside wire rope, so that it will be able to enlarged the radius of the circle edges more than the fixing metallic part of the aforesaid inside wire rope B, and be further able to increase the contact area between the inside hooking section 2 of the circle edges and the inside wire rope R.

Figure 47:
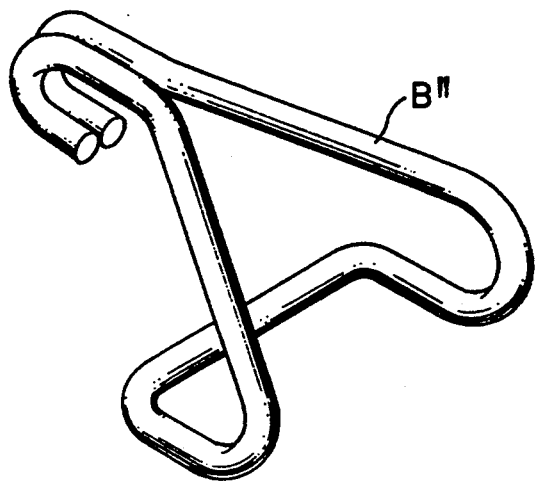
FIG. 47 is a perspective view for showing the fixing metallic parts of the inside wire ropes for using another practical goods of this invention.
Figure 48:
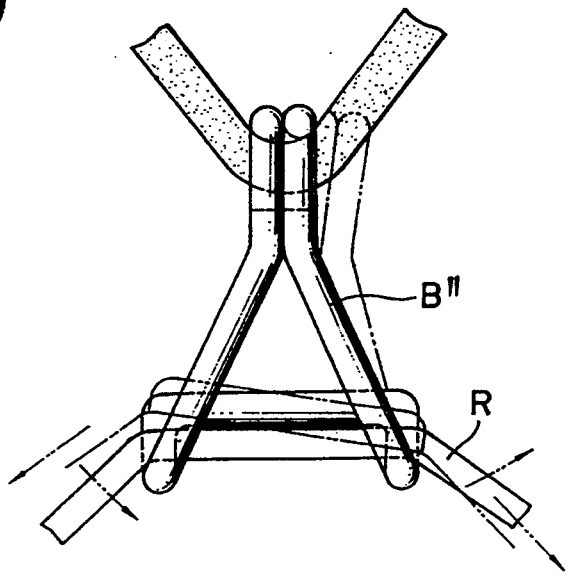
FIG. 48 is a front view, in partial section, for showing the fixing metallic parts in the state of fixing.

As shown in FIGS. 45-48, a No. 2 or second improved type of the fixing metallic parts of the inside wire rope B" is, as shown in FIG. 47, formed with a piece of bent steel wire having a predetermined diameter. The piece of bent steel is fixed by a caulking the inside hooking section 2 of the anti-skid net bodies 21 into an end of the parts B" so as to form a hooking section having a hook shape. In the other end side of said fixing metallic parts B", the hooking section having a hook shape will be fixed by a caulking with the inside wire rope R so as to form a whole length direction part with a predetermined interval in parallel.

A third improved type of the fixing metallic parts of the inside wire rope B'" can be formed bendingly so as to cause both ends of the steel wire to face in the direction of the inside hooking section 2.

Figure 49:
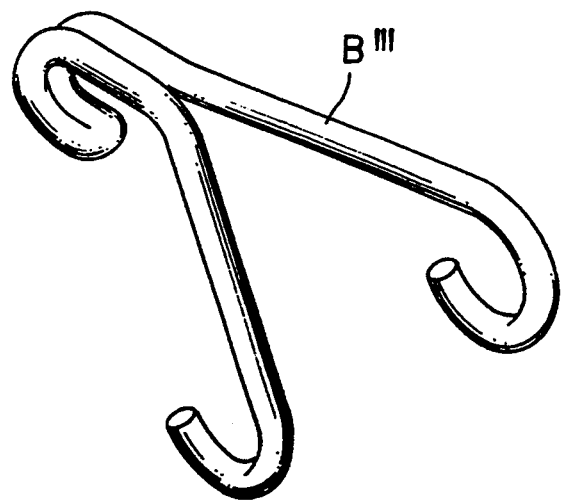
FIG. 49 is a perspective view for showing the fixing metallic parts which are constructed by setting both ends of steel wire into the side of the hook fixing section of the wire ropes.

Further, with regard to this third improved type, the fixing metallic parts B" of the inside wire rope are formed bendingly to face both ends of the steel wire toward the inside hooking section 2. However, as shown in FIG. 49, it would be good to form the parts to bendingly face the hooking section sides of both ropes.

Figure 50:
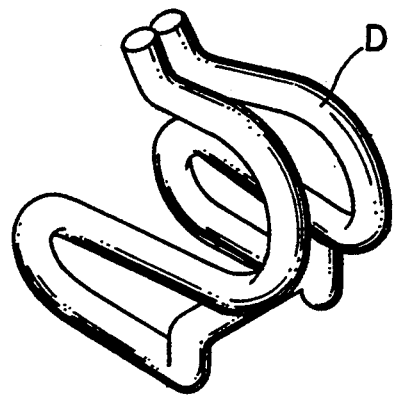
FIG. 50 is a perspective view for showing the connecting metallic parts of the net bodies for using the practical goods of this invention.

Next, the connecting metallic part D of the net is formed bendingly by a piece of a steel wire with around 3 mm diameter (which is offered, by way of example, as a required diameter in FIG. 50). The wire forms a hook section at one end, and further turns up at the other end of the metallic parts D to form a fixing section in order to fix caulkingly the above metallic parts D with the loop section E of the inside wire rope R. This effectively enlarges the width to length direction of the inside wire rope R a predetermined length. After setting up the anti-skid net bodies 21 around the tire T, one may connect insertingly both side sections of the inside and outside of the connecting bands 3, into the inside of the both connecting sections 4 from the reverse side, as shown in FIG. 6, and fixingly hook the hooking hole of the inside section with the hook section of the connecting metallic materials D of the net, by means of hooking the hooking metallic parts C of which is arranged in an end of the inside wire rope R with the loop section E of which is arranged in another end-of the wire rope R, connect the inside wire rope R fasteningly, and fasten the inside edges of the anti-skid bodies 21 toward the center of the tire.

The width of the fixing section of the hooking metallic parts will be taken larger than a diameter of the steel wire composed for the hooking metallic part, and by means of enlarging the width, an effect of fixing the hooking metallic parts stably with a fastening rope will be increased. However, the width has a suitable range of around 16 mm, for example.

Figure 51:
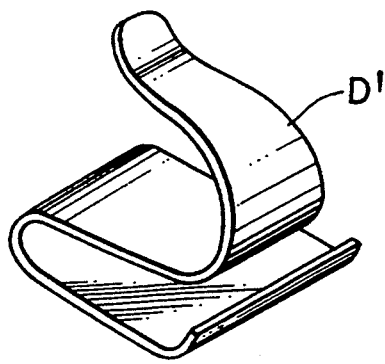
FIG. 51 is a perspective view for showing the connecting metallic parts of the net bodies constituted by a steel plate.
Figure 52:
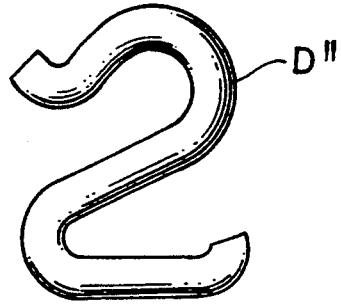
FIG. 52 is a front view for showing a conventional type of the connecting metallic parts of the net bodies.

It will be acceptable to compose the hooking metallic parts in use of a steel plate, and the connecting metallic parts D' of the net which are shown in FIG. 51 will be formed to bend up the hook section and the fixing section, and punch the steel plate with a predetermined shape.

Figure 53:
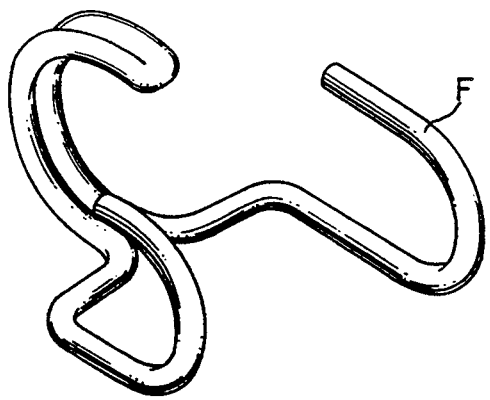
FIG. 53 is a perspective view for showing the connecting and detachable metallic parts of the net bodies for using the practical goods of this invention.

As shown in FIG. 53, the detachable metallic parts of the net F will be formed by turning up a piece of steel wire with around 4 mm diameter as a required diameter., for example, forming a hook section for the band into the end section of the setting band 11, forming the connecting hood section for hooking the outside section of the connecting band 3 into the end section of the anti-skid net bodies 21, and forming a fixing section for fixing caulkingly the outside hooking section of the connection section 3 into the length direction of the anti-skid net bodies 21 with a predetermined interval in parallel. In the fixing state shown in FIG. 6, the above fixing section is formed so as to connect to one of the ends of the anti-skid net bodies 21. In the position of a bent section for hooking the outside connecting section, it is formed to shift slightly from the hooking section of the setting band, and by means of fixing caulkedly the fixing section to a predetermined position of the outside end of the outside connection section 4, the connecting band 3 and the connecting section 4 will be held at a predetermined interval in the whole length direction of the anti-skid net bodies 21 so as to be connected in a suitable state.

Figure 54:
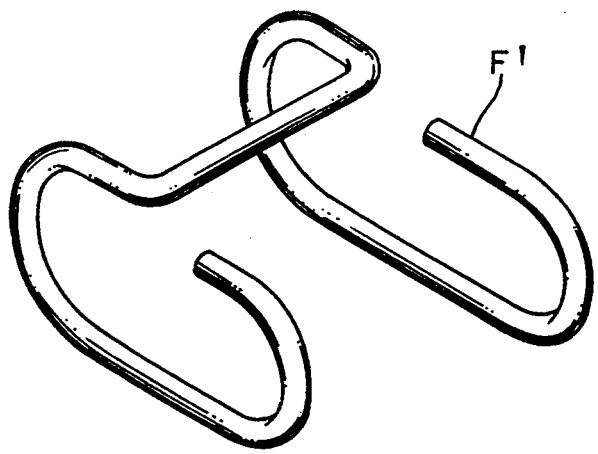
FIG. 54 is a perspective view for showing the connecting and detachable metallic parts of the net bodies in which is enlarged the width of a hook section of the bands.
Figure 55:
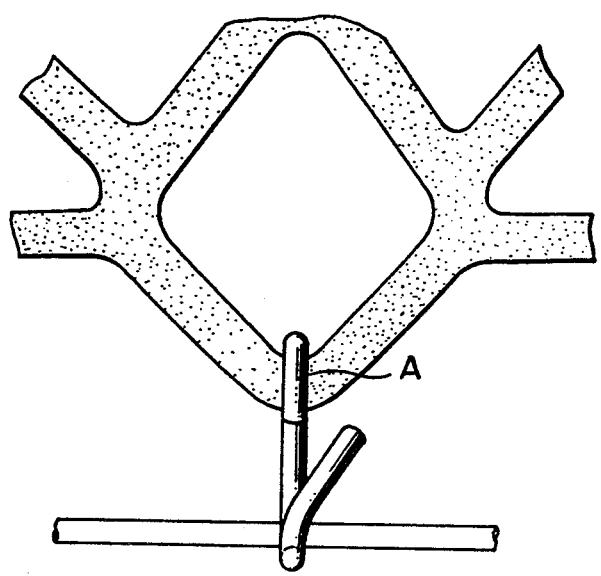
FIG. 55 is a top plan view for showing the state of fixing the detachable metallic parts for using the practical goods of this invention.

In the above-mentioned detachable metallic parts of the net connection F, the hooking section of the setting band is formed in a bar shape, however, as with the hooking metallic parts shown in FIG. 54, a width of between the hooking section of the connecting band and the fixing section will ideally be made similarly.

Figure 56:
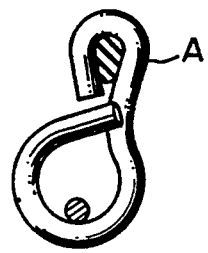
FIG. 56 is a longitudinal section for showing the metallic parts in FIG. 55.

As shown in FIGS. 55-58, the above metallic parts may be formed by bending a steel wire having a required diameter, and by forming the fixing section for caulkedly fixing the aforesaid hooking section by turning up one of the ends of the metallic parts bodies in a U-shape, and further by forming a hooking section in another end of the metallic parts bodies. The hooking section is turned up to form a loop-shape at the other end of the hooking metallic parts as shown in FIG. 56. Then, according to the technique of the present invention, by bending up the loop shaped hooking metallic parts into the direction of the rotational axis so as to open up a hooking port between the end of the above loop shaped parts and the neck section of the loop shape of the hooking metallic parts bodies.

Figure 57:
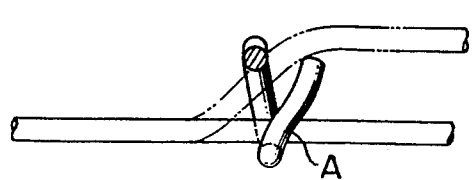
FIG. 57 is a sectional view for showing the metallic parts of FIG. 55 viewed from another angle.
Figure 58:
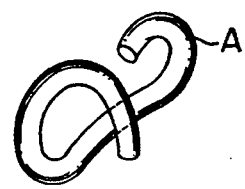
FIG. 58 is a perspective view for showing the detachable metallic parts for using the practical goods of this invention.

As shown in FIG. 56, the above-mentioned "loop" appears closed when viewed from the direction of the rotational axis of the hooking section, otherwise it appears to have a slightly narrow gap less than a diameter of the steel wire of the hooking section between the end of the loop and the neck of the loop. Further, the hooking port secures a clearance for inserting through an inclined setting band with a surplus when it is hooked into the hooking section in which is shown in FIG. 57.

Figure 59:
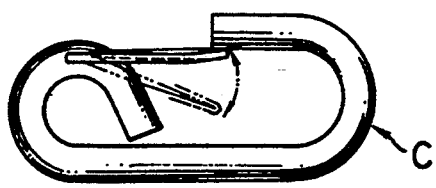
FIG. 59 is a front view for showing the hook metallic parts for using the practical goods of this invention.
Figure 60:
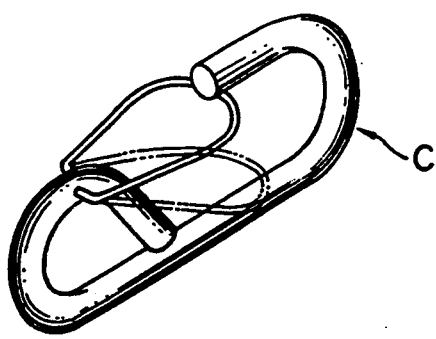
FIG. 60 is a perspective view for showing the hook metallic parts.

As shown in FIGS. 59 and 60, the hooking metallic parts c are formed with a required diameter, for example around 5 mm diameter of a steel wire to be turned up, and one of the ends is turned up in a loop shape, and it is formed in the fixing section by inserting therethrough the loop section of the inside wire rope E.

Another end is turned up to a U-shape so as to form a hook section, and further, to open the hooking port between the end of the hooking section and the fixing section, where is arranged a stopper chip on the hooking port. The stopper chip is made of, for example, a small steel wire. It is used with about a 1.5 mm diameter high tension type steel wire with a U-shape bent as shown in FIG. 60. It connects pressingly the bent section with the inside of the end of the hooking section, and further, turns up both ends of the steel wire toward an inside as shown in FIG. 59, and insertingly fixes the above into an axis hole which is opened upon a top section of the hooking port side in the fixing section. Accordingly, the hooking port is closed by the stopper chip from the inside, and the stopper chip will move rotatingly around the inside of the hooking metallic parts C in the center of the axis fixed section.

Further, each of the axis fixed sections of the above ends of the steel wire are fixed with the axis with a predetermined length to the whole length direction of the hooking metallic parts C. For example, the axis is fixed biasedly with around 2 mm. Accordingly, as shown in FIG. 59, it inserts pushingly the stopper chip into the inside and turns it, and then due to both axis fixed section being biased, an angle difference will occur between the stopper chip and the axis fixed section. Accordingly, the bent section of the end of the stopper chip will be twisted in one direction.

At the same time, an elasticity tending to turn back to a counter direction occurs within the bent section. Therefore, when a strength of pushing the stopper chip into the inside is released, the stopper chip will turn back to an initial position in accordance with the elasticity and the end of the stopper chip will spring to the end of the hooking section and makes a "clink" sound for confirmation.

Further, in order to contact pressingly the end of the stopper chip to the inside of the end of the hooking section, the axis fixed side of the stopper chip is slightly bent toward the outside, and the axis fixed section is inserted into the axis hole fixingly, which causes a potential strength for going to turn around to the outside any time to occur within the stopper chip.

Figure 61:
FIG. 61 is a perspective view for showing the fixing and detachable metallic parts of the wire ropes for using the practical goods of this invention.
Figure 62:
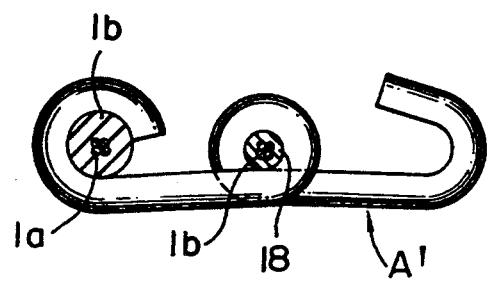
FIG. 62 is a sectional view for showing the using state.

As shown in those FIGS. 38, 61 and 62, the detachable metallic parts for fixing the wire rope A' are fixed into each outside hooking section 2' of the anti-skid net bodies 21, formed by a steel wire with bending, with the fixing section formed for hooking with a mostly loop-shape in an end of the detachable metallic parts for fixing the wire rope A' Further, with the fixing hook as one body formed to hook the setting band in another end and turned up into a loop shape between the fixing hook and the above detachable metallic parts, it is then ready for moving of the fixing section of the outside wire rope to be fixed caulkedly with winding it up to around the outside wire rope R'.

Figure 63:
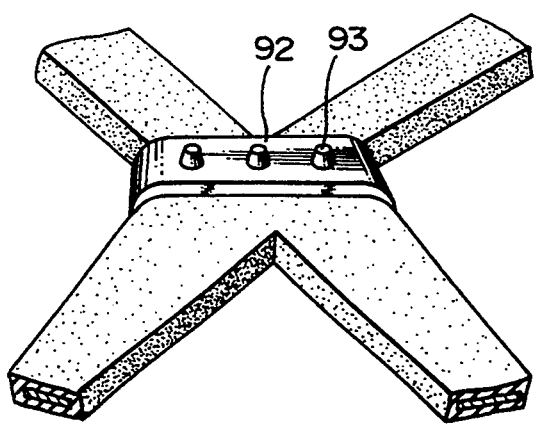
FIG. 63 is an enlarged perspective view for showing the projectingly shaped ultra-high hardened metallic chips in the practical goods of the No. 10 sectional invention.
Figure 82:
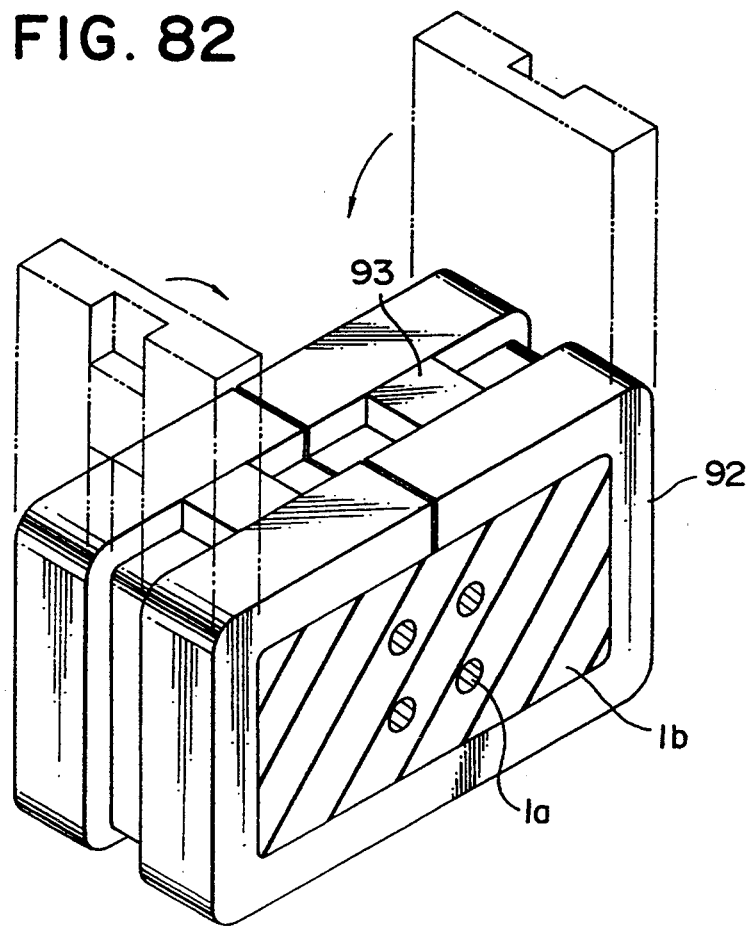
FIG. 82 is a perspective view for showing the fixed state of the spike metallic parts.
Figure 83:
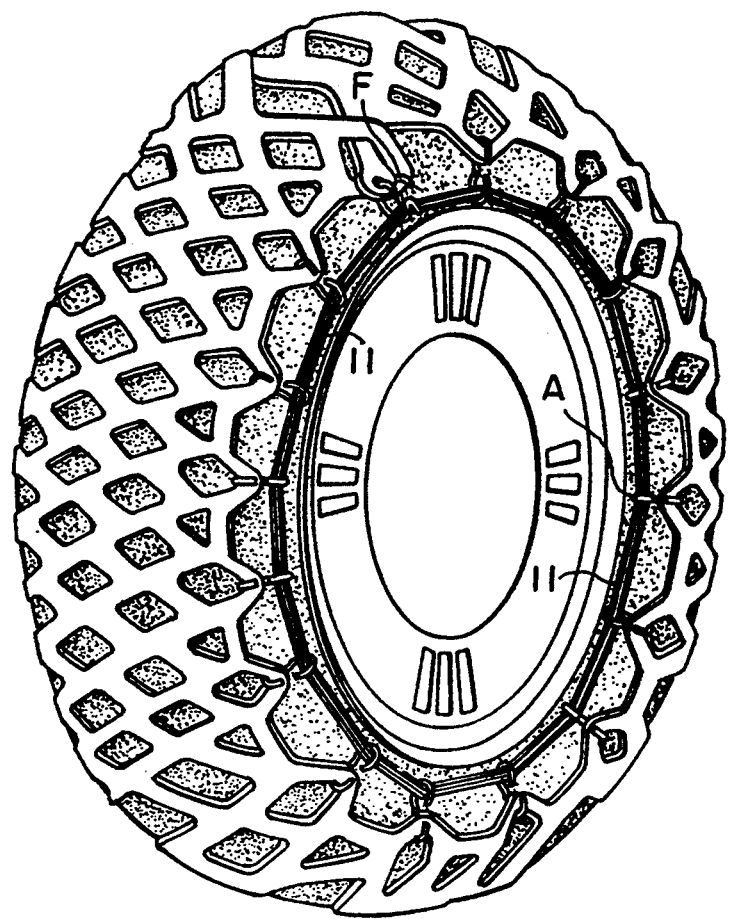
FIG. 83 is a perspective view for showing fixing the anti-skid attachment for a car tire using the setting bands.
Figure 84:
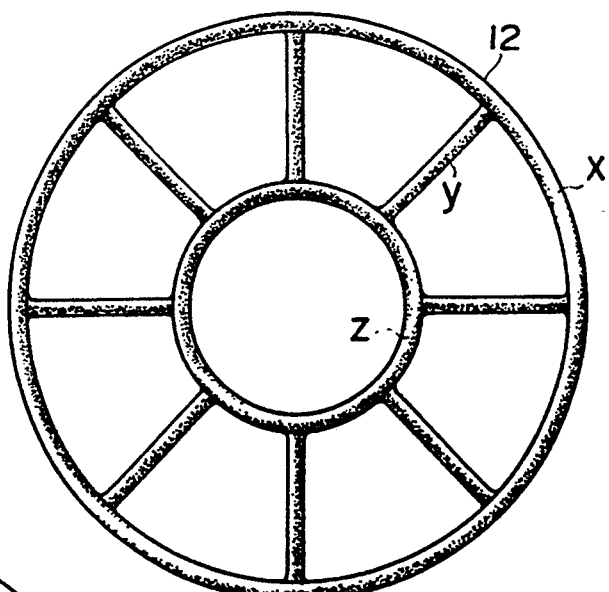
FIG. 84 is a front view for showing an actional band of this invention.
Figure 85:
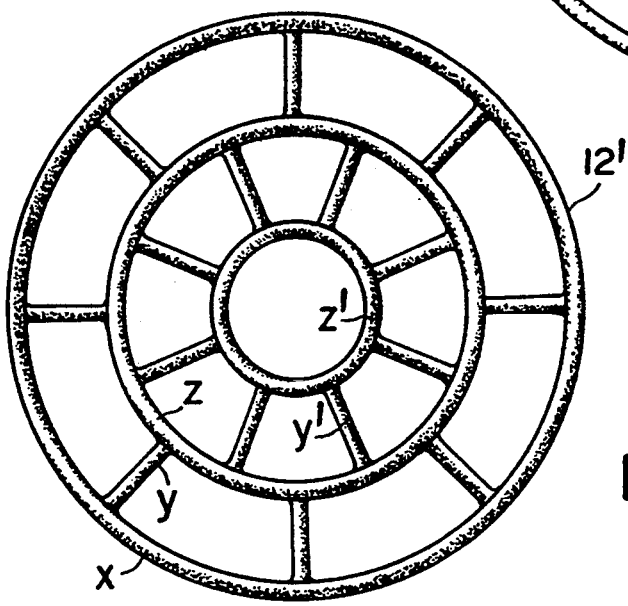
FIG. 85 is a front view for showing the actional bands of another practical example of this invention.
Figure 86:
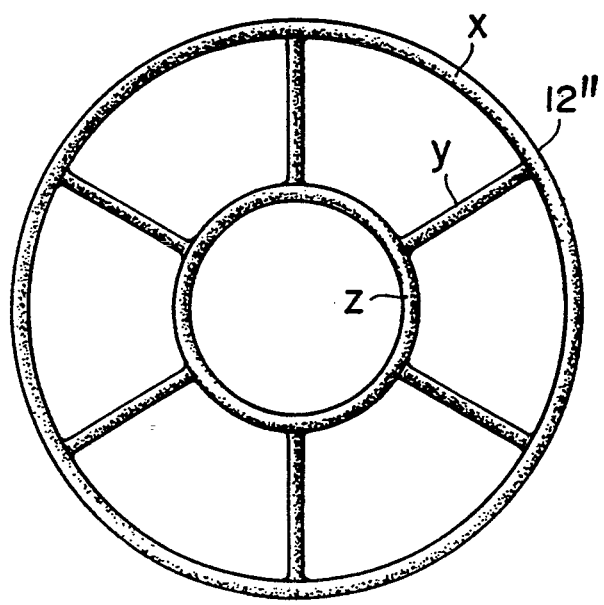
FIG. 86 is a front view of yet another practical example.
Figure 87:
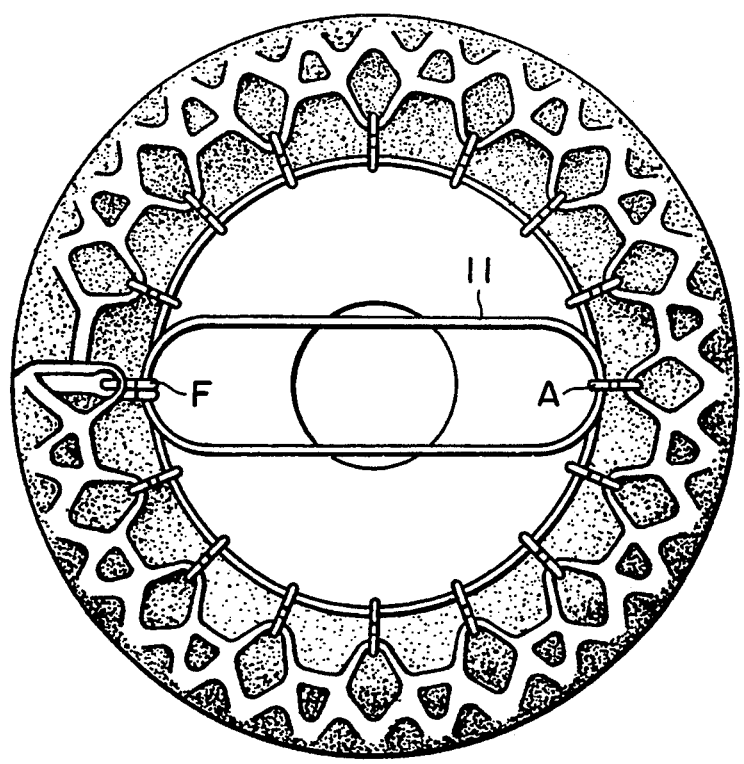
FIGS. 87-91 are front views for showing the processes of hooking the setting bands.
Figure 88:
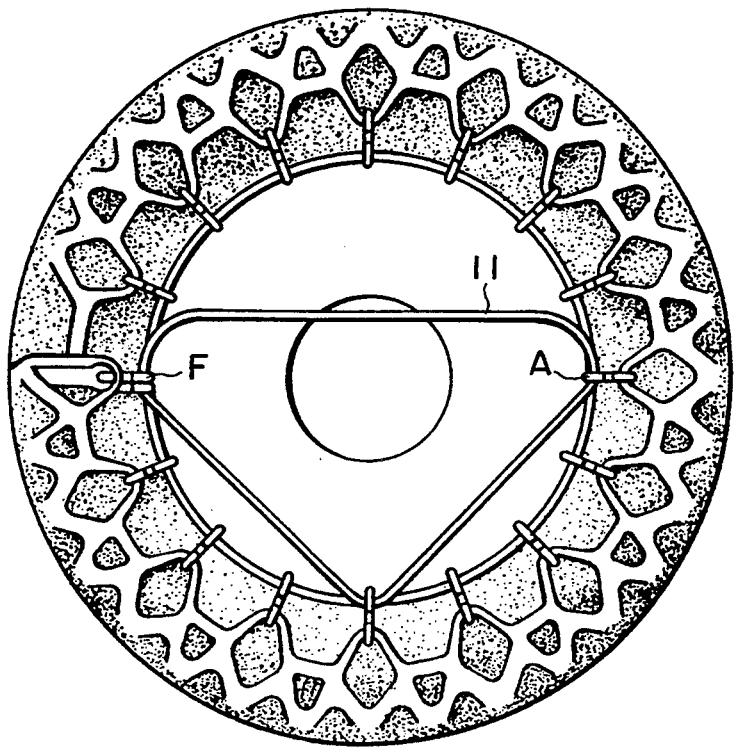
Figure 89:
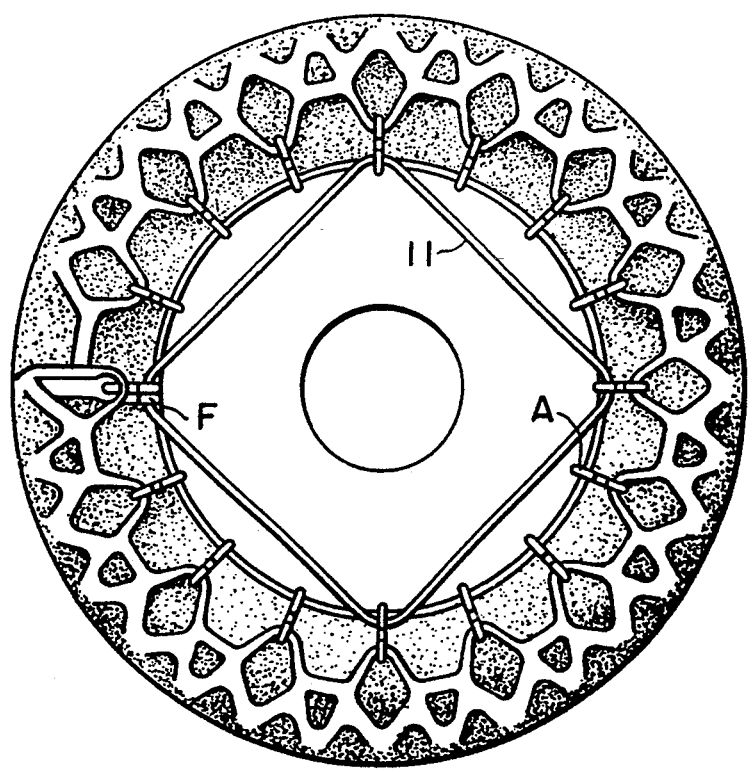
Figure 90:
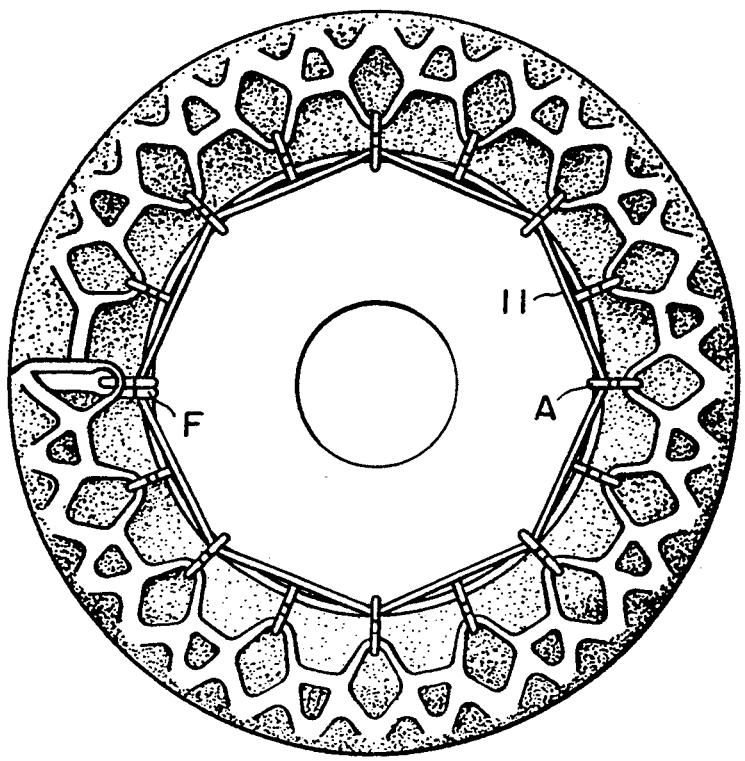
Figure 91:
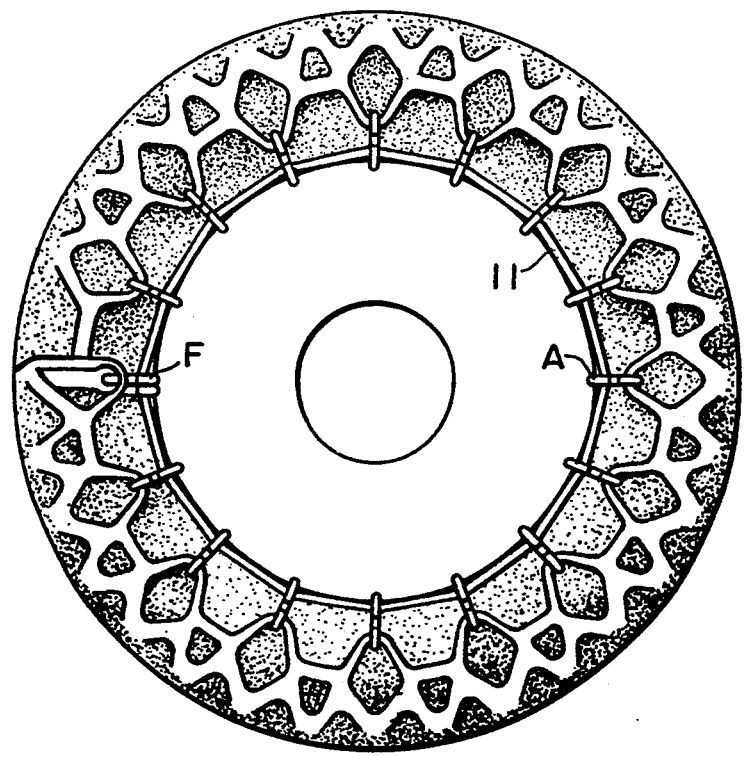
Figure 92:
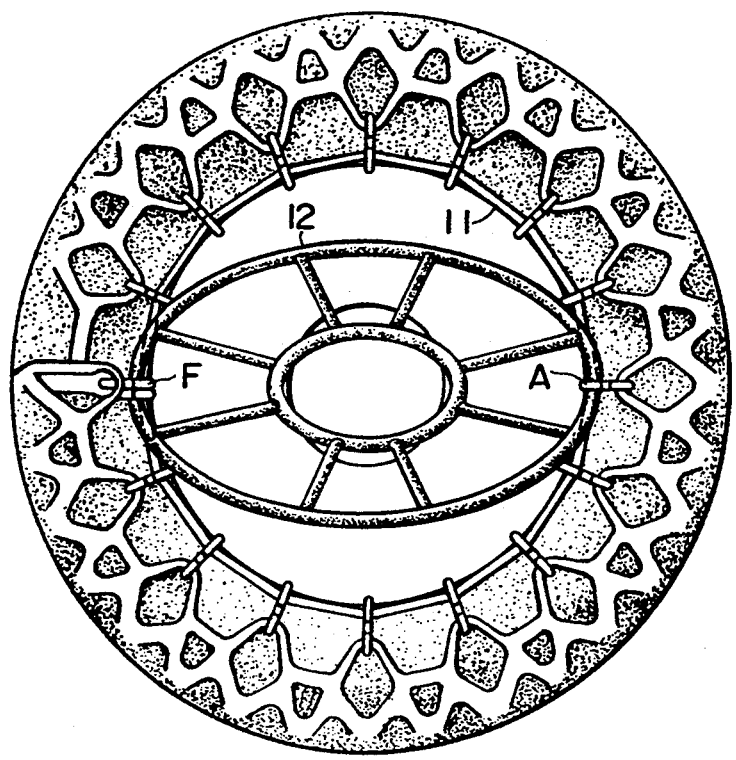
FIGS. 92-95 are front views for showing the processes of hooking the actional bands.
Figure 93:
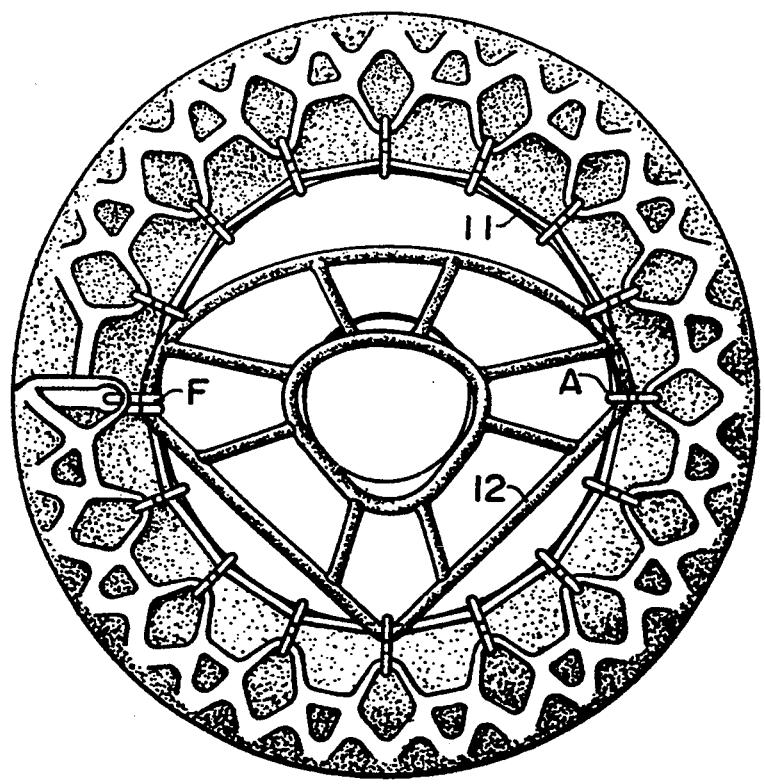
Figure 94:
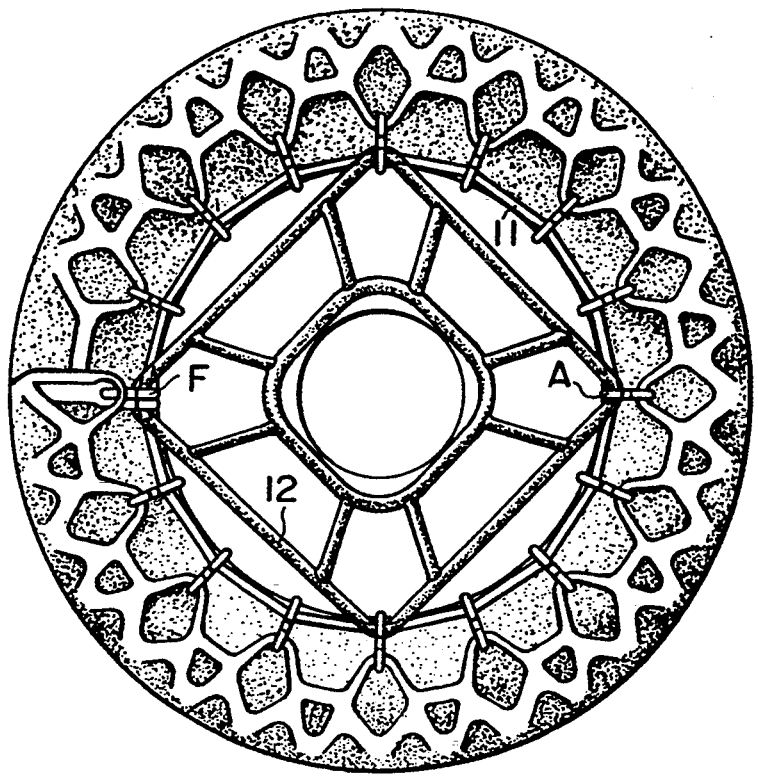
Figure 95:
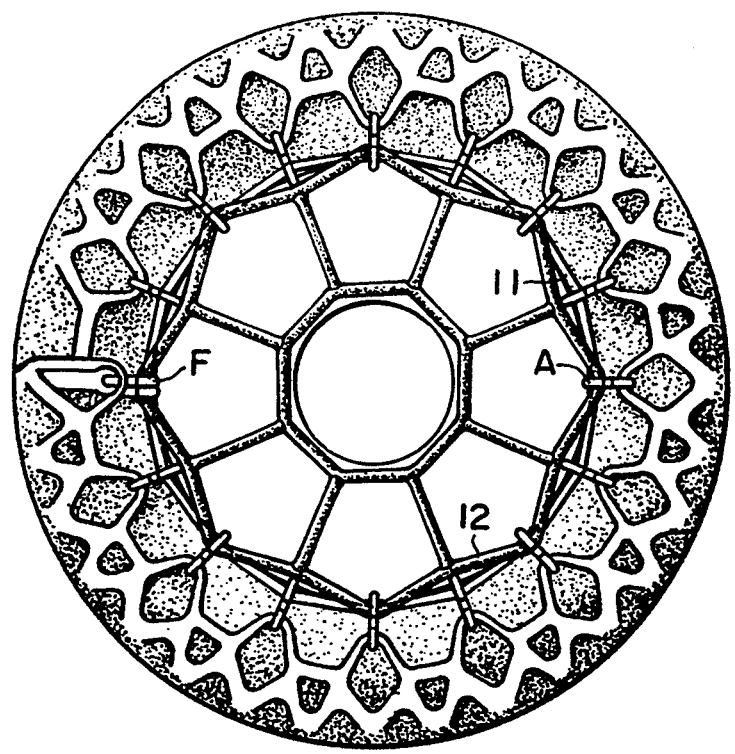

With regard to use of spike metallic parts 92 for anti-skid net bodies 21 in conjunction with the anti-skid attachment for a car tire, referring to FIGS. 63 and 82, the spike metallic parts 92 are formed by bending a belt-shape steel plate with a C-shape with a predetermined thickness, by inserting it into the netting shaped cross section b of the anti-skid net bodies 21 from the reverse side fixingly, by turning up both ends of the metallic parts which are projected to the surface side toward the inside, and by fixing it so as to roll up around the netting shaped cross section.

In the road contacting section of the above spike metallic parts, ultra-hardened metallic chips 93 are plugged up. The ultra-hardened metallic chips 93 are adapted from a steel material having the hardness of around HV 900–1500. For example, an ultra-hardened metallic chip 93 formed from tungsten carbide with a truncated corn shape as shown in the drawings will be driven into the sockets arranged openingly so as to operate as a plug.

Figure 64:
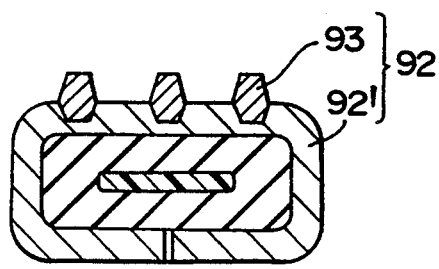
FIG. 64 is a longitudinal section for showing the metallic parts of FIG. 63.
Figure 76:
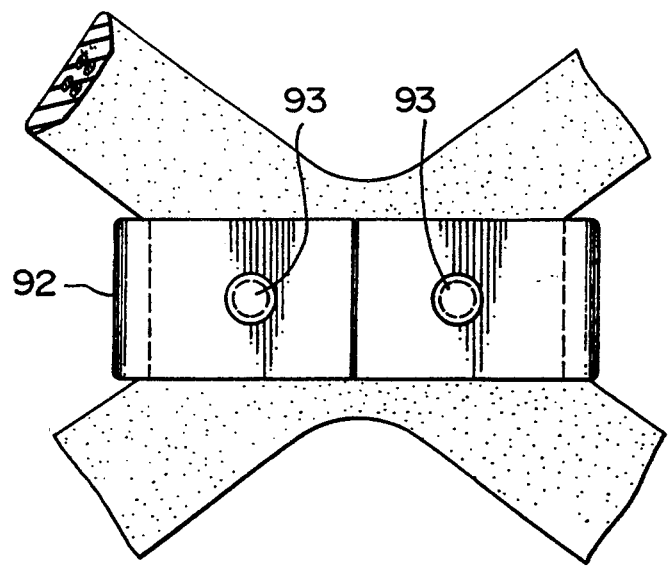
FIG. 76 is a top plan view showing the state of burying the ultra-high hardened metallic chips into the same leveled flat surfaces of both edges of the spike metallic parts in other practical goods according to the No. 10 sectional invention.
Figure 77:
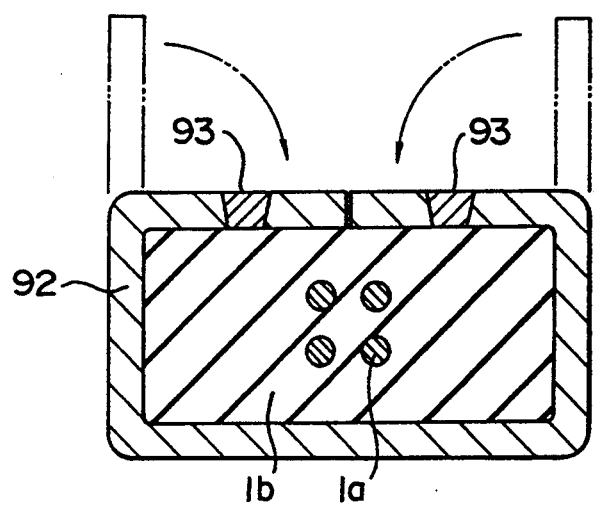
FIG. 77 is a sectional view for showing the metallic parts of FIG. 76.

As shown in FIGS. 63 and 64, with regard to how to drive the plugs in, it would be good to make the chips project from the surface of the spike metallic parts. Alternatively, as shown in FIGS. 76 and 82, it would also be good to make the chips to plug in so as to lay on the same level between the surface and the reverse of the spike metallic parts.

According to the teachings of the present invention, the above-mentioned ultra-hardened metallic chips 92 should be plugged in before bending the C-shaped steel materials which form the spike metallic parts bodies 92′.

Figure 78:
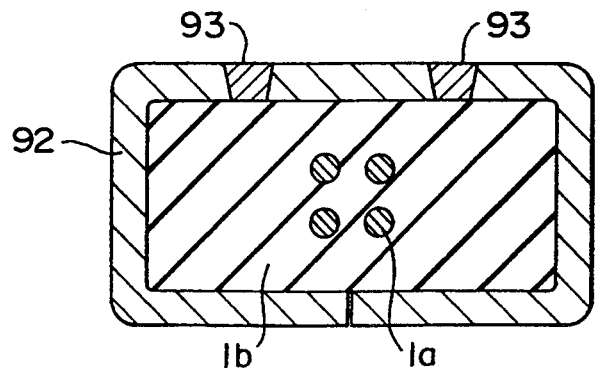
FIG. 78 is a sectional view for showing a state of burying the metallic chips into the spike metallic parts bodies with equally leveled surfaces in the center position.

The above spike metallic parts bodies 92 were inserted into the netting cross section of the anti-skid net bodies 21 from the reverse side, and made both ends of the metallic parts bodies 92′ to be the road contacting face, however, as shown in the spike metallic parts 92 of FIG. 78, it will also be satisfactory to form the ultra hardened metallic chip to plug into a center section of the metallic parts bodies 92′, and insert them into the netting cross section fixingly from the reverse side.

Figure 79:
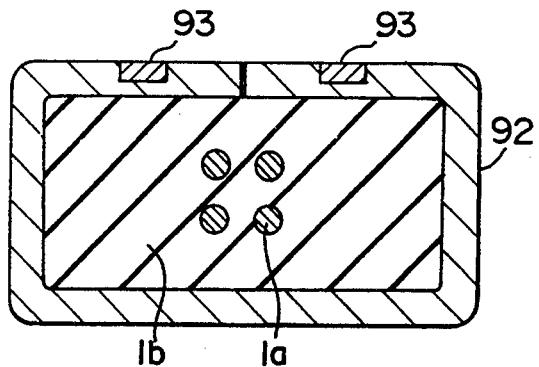
FIG. 79 is a sectional view for showing a state of fixing the spike metallic parts in which the ultra-high hardened metallic chips are struck into the caved in shaped burying holes.
Figure 80:
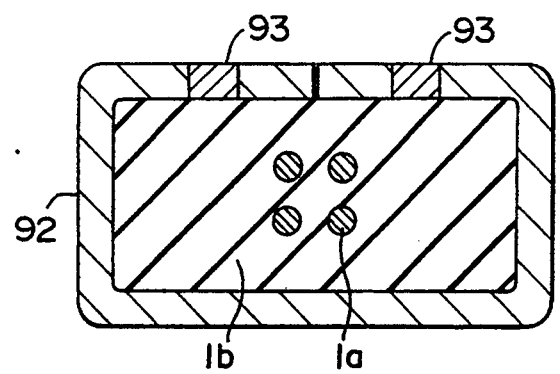
FIG. 80 is a sectional view for showing a state of fixing the spike metallic parts by welding the ultra-high hardened metallic chips.

With respect to how to plug in an ultra-hardened metallic chip 93, it is also possible to use other methods. Certainly, for example, as shown in the spike metallic parts. 92 of FIG. 79, it would be possible to form a plugging hole with a hollow shape upon the road contacting face, and to drive a cylindrically formed ultra-hardened metallic chip 93 into the hole inside. Alternatively, as shown in the spike metallic parts 92 of FIG. 80, a cylindrically formed ultra-hardened metallic chip 93 may be inserted into the plugging hole where it can be fixed by paste-welding.

Figure 81:
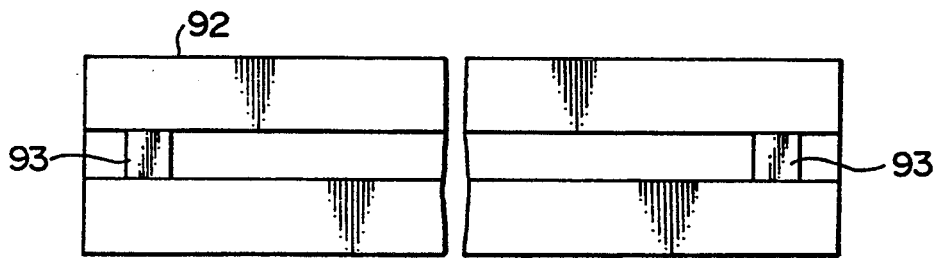
FIG. 81 is a top plan view, in partial section, for showing an unfolding state of the spike metallic parts stricken by the ultra-high hardened metallic chips with carving of the inserting grooves.

In the spike metallic parts 92 shown in FIG. 82, plugging grooves are formed with a hollow shape along the center of the steel material surfaces which comprise the spike metallic parts bodies 92′, shown in FIG. 81, and it is formed bendingly into a C-shape after a squaringly formed ultra-metallic chip 93 is driven into portions near both ends of the plugging grooves.

At the time of fixing it, as shown in FIG. 82, it is inserted from the reverse side into the netting cross section, turned up at the projected both ends on the surface toward the inside, and fixed firmly. Furthermore, the above-mentioned ultra-hardened metallic chip 93 could be formed rectangularly by widening in the length direction of the plugging grooves. In this way, because of enlargement of the ultra-hardened metallic chips 93 against the area of the road contacting surface, anti-abrasive ability for the road contacting surface will be improved.

Figure 65:
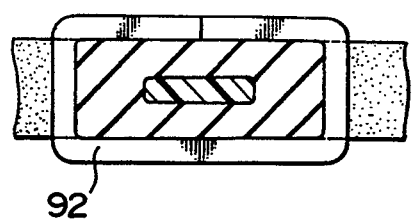
FIG. 65 is a sectional view for showing the state of the ultra-hardened metallic chips in both ends of another practical example.
Figure 67:
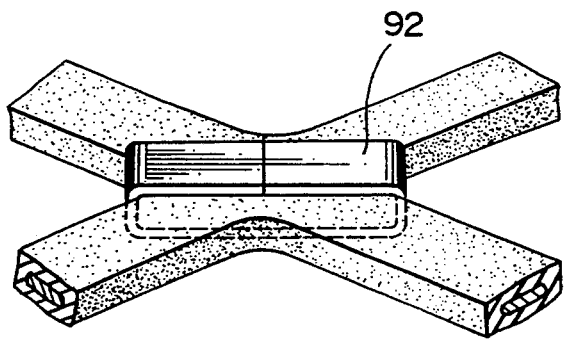
FIG. 67 is a perspective view for showing the fixed state of the spike metallic part in this practice in the crossing section of the anti-skid attachment net bodies.

With regard to another practical example, referring to FIGS. 65 and 67, the spike metallic parts 92 are formed by bending a narrow width steel plate having about 350 HV hardness. These spike metallic parts 92 are fixedly inserted into the crossing section b of the anti-skid net bodies 21 from the reverse side of the anti-skid net bodies 21; then, both ends are turned up together toward the inside, and they are fixed with rolling up around the cross section b.

Therefore, both ends of the spike metallic parts (92) are turned up to the inside mentioned above, they are bent into the surface of the cross section b, and they are made to be the contacting section with the road surface.

The above spike metallic parts 92 are high frequency tempered upon the road contacting surface of the spike metallic parts 92 before the metallic parts 92 are fixed on the anti-skid net bodies 21. The hardness of the section after the high frequency tempering will be improved to more than 450 HV.

The above-specified range to be tempered will be limited within a front side before the bent section, and the hardness of the above bent section is controlled less than 450 HV so that a crack does not occur in the bent section when the bending work is done upon fixing of the metallic parts 92.

Figure 66:
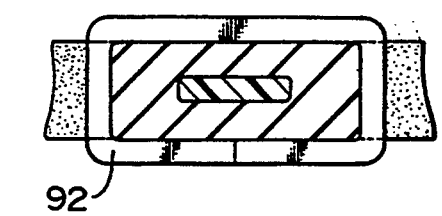
FIG. 66 is a sectional view for showing the fixed state of the spike metallic parts in which is quenched in the center section in another practical example.

The spike metallic parts 92, shown in FIG. 66, are subjected to high frequency tempering in the middle of both bent sections of the metallic parts 92, insertingly fixed so as to show the surface of the section performed by the above high frequency tempering when the cross section b is fixed, and turned at both ends into the reverse side of the cross section b so as to fix it.

A plug-in type spike metallic part, such as the one shown in FIGS. 68–75, comprises a surface metallic part 94 formed bendingly into a C-shape of a belt-shape steel material and a reverse side metallic parts 94′. Both metallic parts comprise a center section, side chips of both sides of the center section, and an opening port section. In the state of both opening port sections being face to face with each other, they are jointed pluggingly.

It should be noted that in the side to be used for contacting the road, ultra-hardened metal is used.

Figure 68:
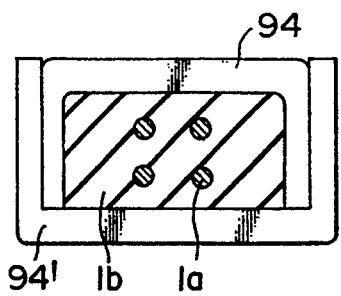
FIG. 68 is a front view, in partial section, for showing the pressure feedingly inserted state of the spike metallic parts in another practice of the No. 10 sectional invention.
Figure 72:
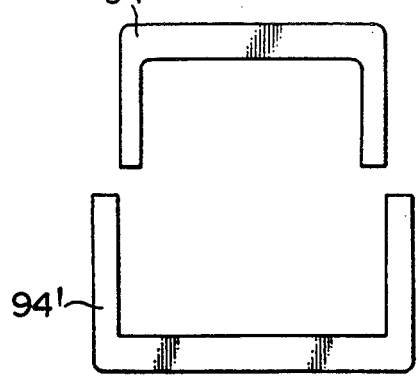
FIG. 72 is a front view for showing a state before fixing of the spike metallic parts shown in FIG. 68.

The above reverse side metallic parts may be taken as an almost same measure of a distances between the inside surfaces with the netting shape crossing section b of the anti-skid net bodies. Further, the length of both side chips is taken slightly smaller than the thickness of the net, and both the above reverse side metallic parts 94′ and the surface metallic parts 94 for plugging into the above will be formed slightly narrower than the distance between both outside surface of the both side chips of the above reverse side metallic parts 94′ against the distance between the inside surface of the both side chips. As shown in FIG. 68, when both metallic parts are fixed with the netting shape crossing section b of the anti-skid net bodies, the surface metallic parts 94 are inserted into the netting shape crossing section b from the surface side of the net, the reverse side metallic part 94′ is plugged fixingly into the above state of the surface metallic part 94 from the reverse side of the net, and both side metallic parts are jointed in a state of fixing the netting shape crossing section b.

Both metallic parts after jointed is fixed in the state of rolling up the both side chips around the netting shape crossing section b meet each other tightly.

Figure 69:
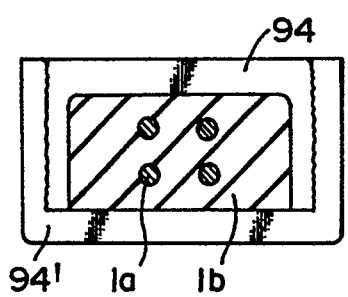
FIG. 69 is a longitudinal front view for showing the fixed state of the spike metallic parts with a gap method.
Figure 73:
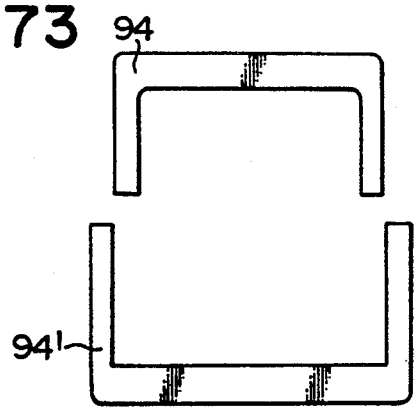
FIG. 73 is a front view for showing a state before fixing of the spike metallic parts shown in FIG. 69.

The spike metallic parts shown in FIG. 73 and FIG. 69 are plugged in together with the surface metallic part 94 and the reverse metallic part 94' in accordance with a same means of plugging in together as with the above plug-in type spike metallic part. After that, they are jointed by means of welding the both side chips of the both metallic part or by means of pasting them. Accordingly, it may be gathered that the purpose is to join the metallic parts more firmly.

Figure 70:
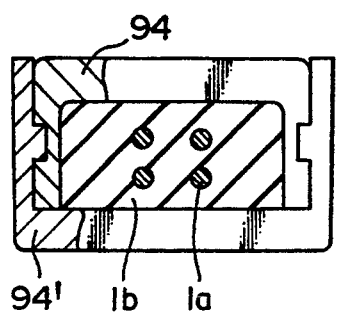
FIG. 70 is a front view, in partial section, for showing the fixed state of the spike metallic parts in which are arranged those of projected section and caved in section for inserting each other.
Figure 74:
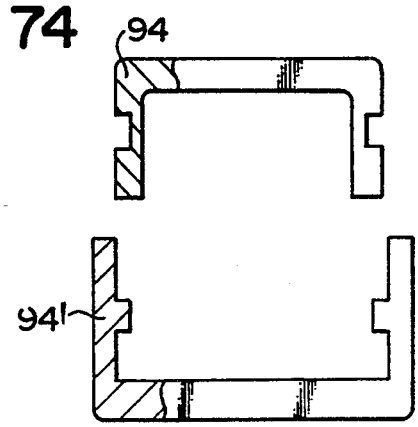
FIG. 74 is a front view, in partial section, for showing a state before fixing the spike metallic parts shown in FIG. 70.

The plug-in type spike metallic parts shown in FIG. 74 and FIG. 70 are formed to project a projected section upon the inside face of both side chips of the reverse side metallic parts 94' and, further, to hollow a hollowed section for plugging into the above projected section of the outside face of both side chips of the surface metallic part 94, to plug the surface metallic parts 94 into the netting shape crossing section b from the net surface, and accordingly to plug the reverse metallic parts 94' into the above state of the surface metallic parts 94 from the net reverse side. Additionally, the above is composed in the state of fixing tightly the netting shape crossing section b of both metallic parts of the surface and the reverse sides so as to joint pluggingly with the projected section and the hollowed section of the both metallic parts.

The above plug-in type spike metallic part will be simple to join with both metallic parts of surface and reverse sides and, moreover, it is firmly realized.

Figure 71:
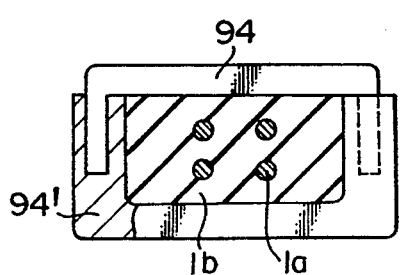
FIG. 71 is a front view, in partial section, for showing the fixed state of the spike metallic parts where holes are opened upon both side edge sections of the reverse metallic parts for inserting the both side chips of the front metallic parts.
Figure 75:
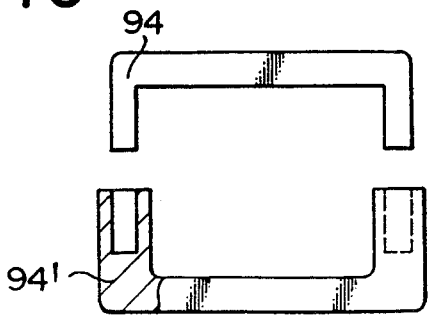
FIG. 75 is a front view, in partial section, for showing a state before fixing the spike metallic parts shown in FIG. 71.

The plug-in type spike metallic parts shown in FIG. 75 and FIG. 71 are made of holes for plugging both sides chips of the surface metallic part 94 into the ends of both sides chips of the reverse side metallic part 94', and to decrease the above plugging holes slightly so they are less than a size of both sides chips of the surface metallic part 94. As shown in FIG. 71, when both metallic parts are fixed with the netting shape crossing section b, both sides chips of the surface metallic part 94 are plugged into the plugging holes of the reverse side metallic part 94' firmly to joint them.

The above plug-in type spike metallic part adopts a composition to plug the both sides chips of the surface metallic part 94 into those holes of plug-in for jointing them, so that those both metallic parts of the surface and the reverse sides will be not shifted relative to each other when they are jointed. Further, the joint is simple and certain.

It would be suitable to use ultra-hardened metallic chips 93 plugged into the road contacting face of the plug in type spike metallic part. Alternatively, plug-in type spike metallic parts with treatment of tempering the road contacting face side could also be used.

As to the actional band 12, the following example details are provided:

| 1) Actional ring section (X): | |
|---|---|
| a) Diameter of the ring: | around 360 mm |
| b) Diameter of a wire: | around 9.5 mm |
| 2) Core ring section (Z): | |
| a) Diameter of the ring: | around 160 mm |
| b) Diameter of the wire: | around 10 mm |
| 3) Connecting arm section (Y): | |
| a) Diameter of the arm: | around 8.5 mm |
| b) Diameter of the arm: | around 8 mm. |

Figure 3:
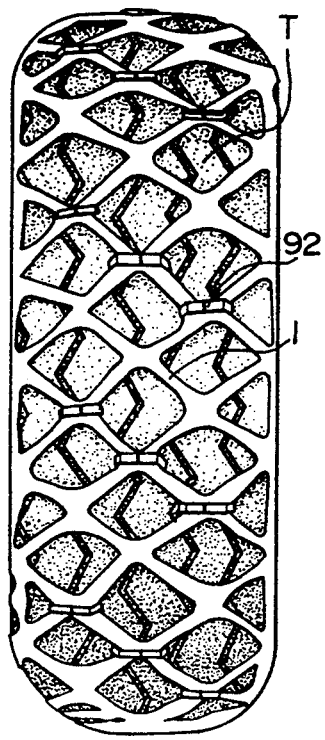
FIG. 3 is a front view of this invention for showing the state of fixing the anti-skid attachment for a car tire with the metallic parts of a spike which are fixed.

Normally, the actional bands 12 will be used by a wire rope having 8.5 Kg of the load in case of 110% load-extension ratio; however, the above is not essential, so that as shown in FIG. 3, it would be satisfactory to adopt double or triple ways of arranging the reinforced core ring section Z' and the reinforced connecting arm section Y'.

The setting band 11 will be formed primarily of rubber, however, it would also be suitable to adopt another material along the lines of rubber. This is shown in FIGS. 87-91 and 83. The following dimensions are offered in way of example:

a) Diameter of the ring: around 308 mm
b) Diameter of the wire: around 7.5 mm.

As load conditions, the material of the load 6.5 Kg f in case of 135% load-extension ratio could be adopted.

Next, with regard to a using state of the above, as shown in FIG. 1, the inside wire rope R is fixed through the inside wire rope fixing metallic parts B or directly with the inside hooking section 2 of the anti-skid net bodies 21, the anti-skid net bodies 21 arc rolled up around the tread section of the tire T in the sate of the above inside wire rope R being fixed, and the setting band 11 is fixed temporarily around the outside through the detachable metallic parts A. Alternatively, the setting band 11 may be fixed around the outside directly in use with the outside wire rope R'.

Number of hooking sections should be based upon necessities of particular applications. Eight or sixteen hooking sections would be ideal for most applications; sixteen hooking sections are shown and described herein. Procedure steps are shown in FIGS. 87-95.

In such a state, as described above, it is set up in hooking of the detachable metallic parts A of the actional ring X of the actional band 12.

Figure 96:
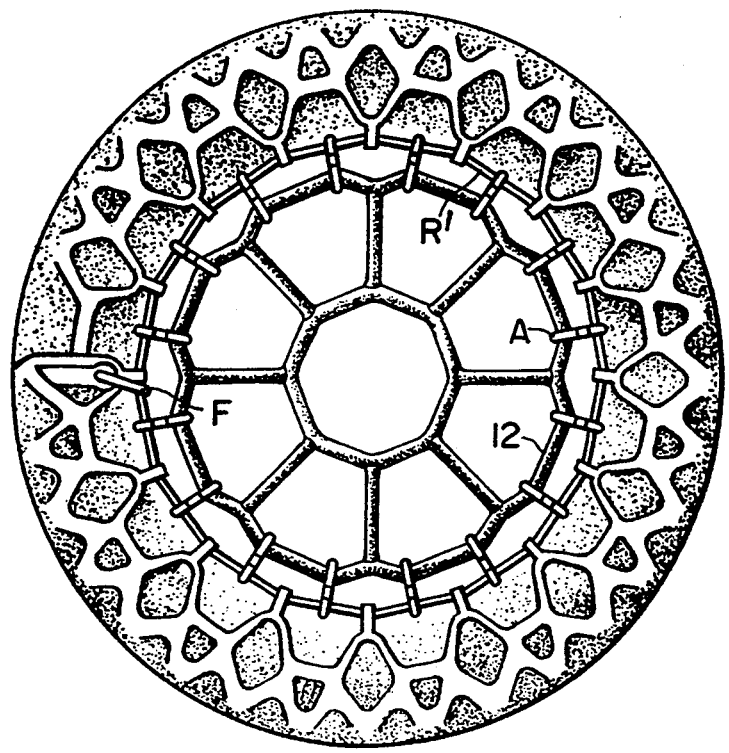
FIG. 96 is a front view for showing another practical example of this invention.
Figure 97:
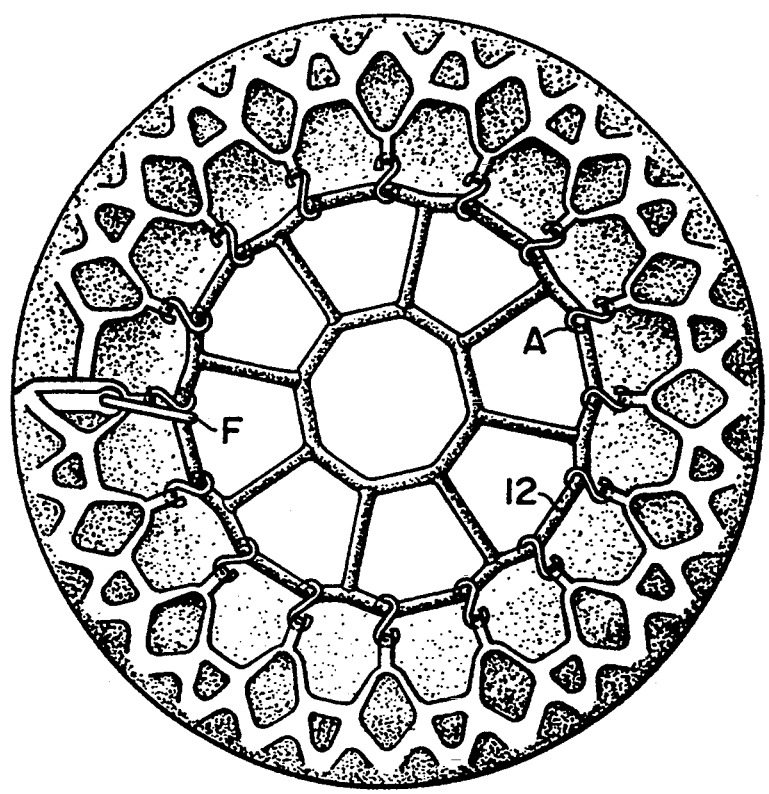
FIG. 97 is a front view for showing yet another practical example.
Figure 98:
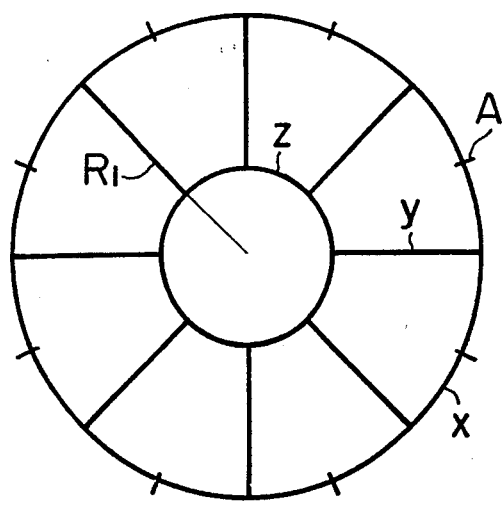
FIGS. 98-104 are graphs for explaining the function and the effect of this invention.
Figure 99:
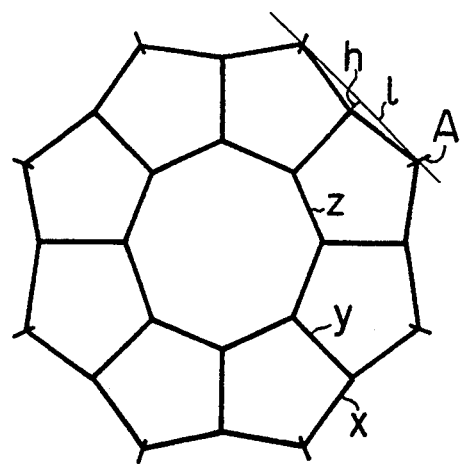
Figure 100:
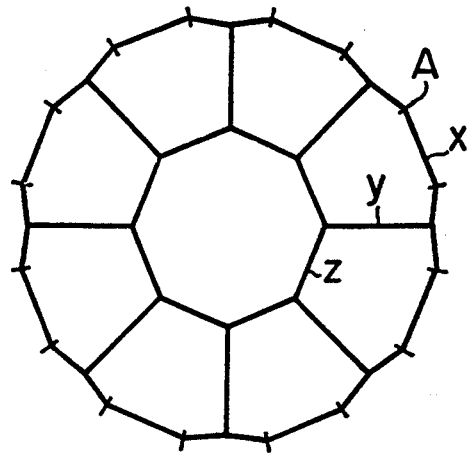

In case of using the outside wire rope R', as shown in FIG. 96, another sub-detachable metallic part A is adaptable to hook.

Additionally, more than two pieces of the setting bands 11 are usable to set up and, further, it is also usable for more than two pieces of the actional band 12. Those practiced materials will be explained with an objective example under an actual figures as follows:

1) In case of the circumferential length of an using tire T being 2,047 mm, 2, 110 mm length of the anti-skid net bodies 21 will be used.
2) The width of the above is 279 mm.
3) The diameter of the actional ring of the setting band 11 will be 308 mm in case of 138.4% loading extension ratio (in hooked time).
4) Sixteen hooking sections: one point load 4 Kg f at 126% load extension (becomes used time).
5) Sixteen hooking sections: one point load 3.20 Kg f.
6) Break load: 50 Kg f to be used.
7) The diameter of the ring X of the actional band 12 is 360 mm in case of 115% load extension ratio (in hooked time).
8) Sixteen hooking sections: one point load 10 Kg f at 105% load extension (becomes used time).
9) Sixteen hooking sections: one point load 4.5 Kg f.
10) Break load: 85 Kg f to be used.

Further, each sectional dimension of the anti-skid net bodies 21 will be explained as follows:
1) Width: around 10 mm
2) Height: around 7.5 mm
3) Sectional dimension between (A)—(A): around 22 mm
4) Sectional dimension between (B)—(B): around 16 mm.

Figure 4:
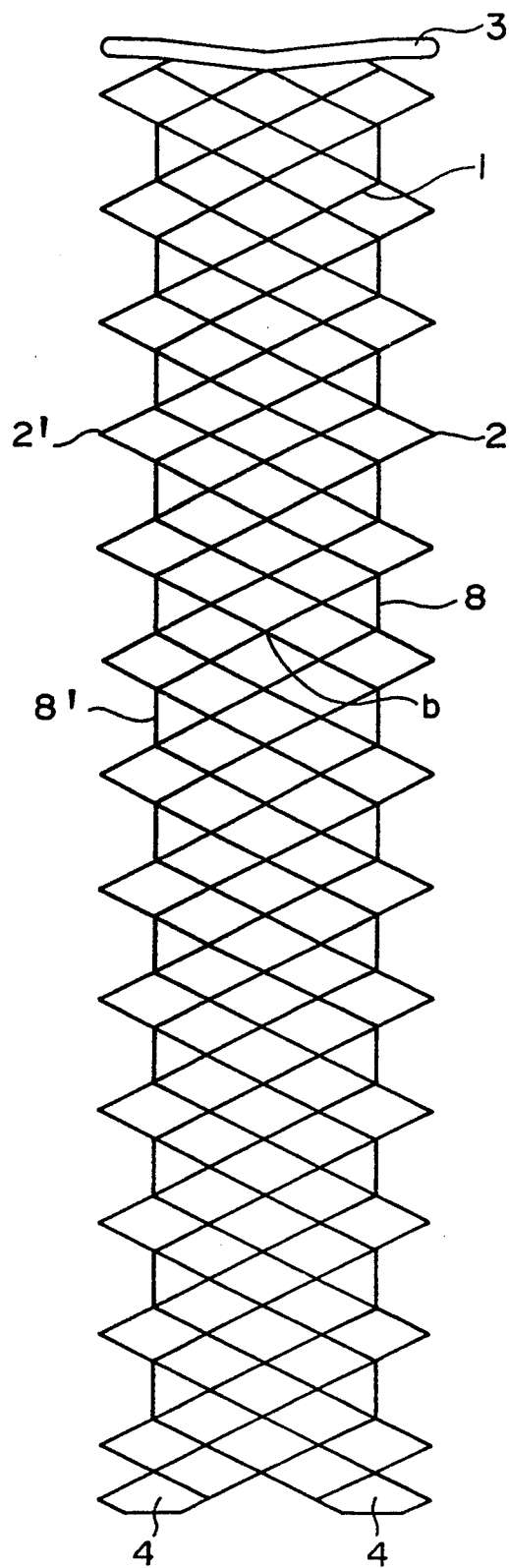
FIG. 4 is a schematic view for showing the net bodies of a typical type of anti-skid attachment.
Figure 5:
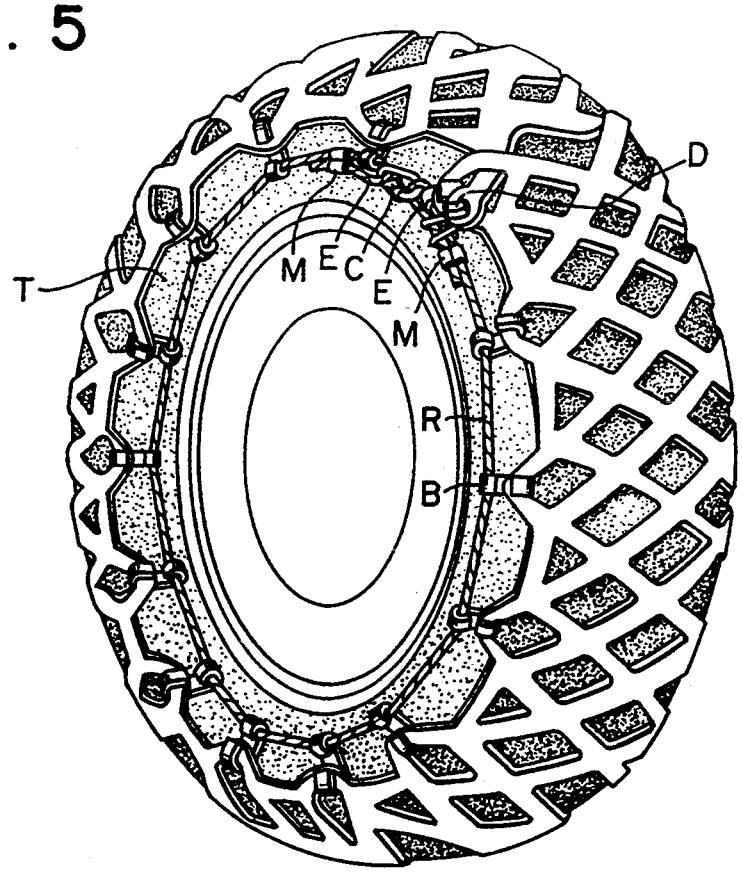
FIG. 5 is a perspective view for showing from the inside of a car tire arranged the anti-skid attachment of the invention.

The above-mentioned materials will be suitable for adoption. According to application requirements, the spike metallic parts 92 will be adoptable in the cross point. FIG. 4 may be referred to for a top plan schematic view of typical anti-skid net bodies 21.

In case of hooking both the setting band 11 and the actional band 12, the load of hooking time will be explained under the following Figure of the marks explanation. The second Figure explains the sequent order of hooking and the List which follows the second Figure explains the load of hooking time. GB shows the setting band 11 and AT shows the actional band 12.

First, with regard to the state of fixing fifteen pieces of detachable metallic parts A to anti-skid net bodies 21 under the Figure of the marks explanations, as a hooking order, first the setting band 11 and the actional band 12 arc fixed with the detachable metallic parts A in order. The loads in each section when the above hooking works are performed will be shown in the Figure to explain the load of hooking time. It may be noticed that it needs greater strength when No. 4 of hooking section is hooked at the time or hooking both the setting band 11 and the actional band 12 commonly.

1) Figure for the marks explanation.
(in case of adopting 15 pieces of hooking sections)

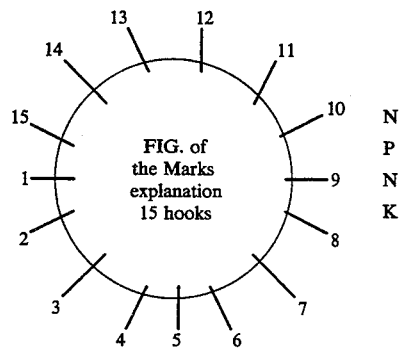

2) Figure for explaining the sequent order or hooking.
(in case of adopting 15 pieces of hooking sections)

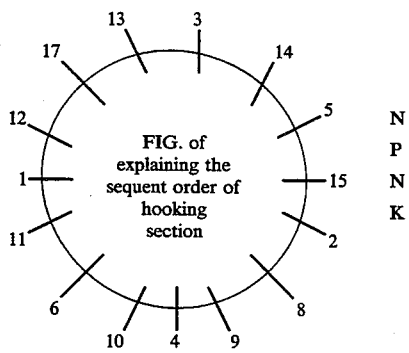

3) List for explaining the load of hooking time. (in case of adopting 15 pieces of hooking sections)

| I | Hook | I | Order | I | Strength GS | AT |
|---|---|---|---|---|---|---|
| 1 | 1 | 1 | 1 |   | 0 | 0 |
|   |   |   | 1137 |   | 12 | 0 |
|   |   |   | 6155 |   | 12.5 |   |
|   |   |   | 10 | 57 | 12 | 0 |
|   |   |   | 4 | 10.5 | 1 | 13.5 | 1 |
|   |   |   | 9 | 5.7 |   | 10.5 | 1 |
|   |   |   | 8 | 6.0 |   | 9.0 | 1 |
|   |   |   | 2 | 3.5 |   | 4.0 | 1 |
|   |   |   | 15 | 5.0 |   | 8.5 | 1 |
| 1 | 10 |   | 5 | 6.5 | 1 | 12.0 | 1 |
| 1 | 11 |   | 141 | 5.0 | 1 | 10.3 | 1 |
| 1 | 12 |   | 31 | 7.0 | 1 | 12.5 | 1 |
| 1 | 13 |   | 1314 | .71 | 1 |   |   |
|   | 15 |   | 12 | 3.2 | 11 | .81 |   |

The tensile strength of that time will be near to a limitation of the strength which powerless people, such as women and the like, will be able to put forth. And, in order to hold enough of the anti-skid net bodies 21, suitable pieces of the anti-skid net bodies (21) will be used so as to obtain a necessary strength.

Further, with regard to the theoretical functions of this invention with reference to FIGS. 98-104, the following marks are applicable:
(a) shows a virtual circular arc with a radius of a distance between the center in the fixed state of the actional band 12 and the detachable metallic part A.
(a') shows a straight line to connect with each apex of eight divided angles from a virtual circle.
(a'') shows a ridge line of the actional state of the actional ring X in case of fixing it.
$\alpha$ shows an angle consisting of a side of an octagon inscribed with a circle and a tangential line.
($\beta$) shows an angle consisting of straight line to connect a side of a sixteen angled rhombohedron when an actional band 12 is hooked into eight places with the apexes.
($\Theta$) shows a functional angle of the vector.
$\Theta$-value is in a relationship with an equation of $$\Theta = (\pi/2) - (\alpha + \beta)$$

so that, by means of requiring $\beta$-value and adding $\alpha$-value also in which is known already, $\Theta$-value will be obtained.

As to the relationship between the diameter of the actional ring X and the using position of the detachable metallic part A, it is ideal so as to be able to fix them each other when an load extension ratio of the actional ring X is 105%, that is, it is extended to 5% more. The present inventor has tested it extended 5%. At the time of the test, the actually measured figure of the load value was 4 Kg f, and a straight line distance (12) between a detachable metallic part A and an adjoined detachable metallic part A being 165 mm. Further, the distance h between the center of both detachable metallic parts A, A and the functional point of the connecting arm Y was 10.9 mm.

Figure 101:
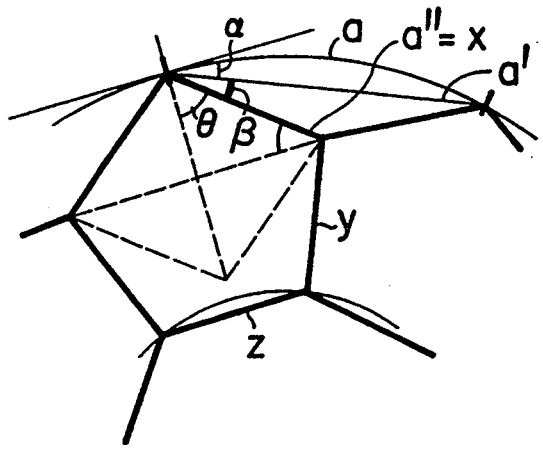
Figure 102:
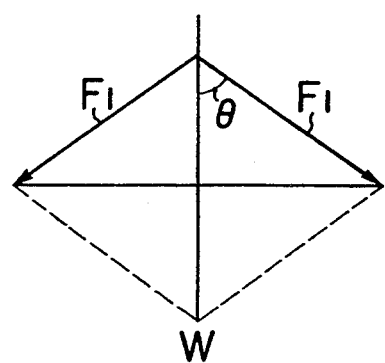
Figure 103:
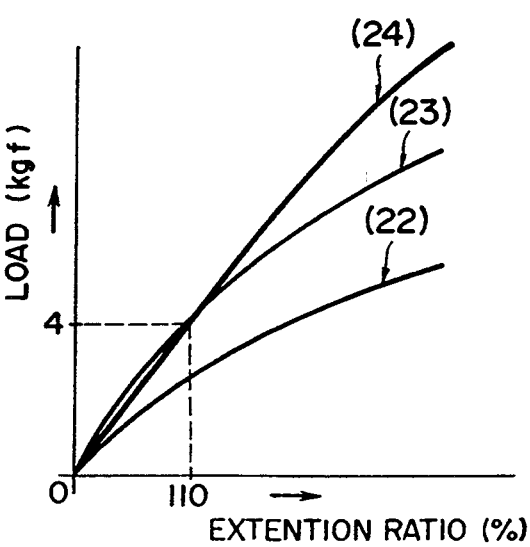

Performing calculations to determine the same, the $\beta$ angle becomes 7.50. (An apex angle inscribed with a circle, that is, an angle made between a tangential line passing to the apex of the circle and a side of the rhombohedron will be 22.50 as shown in FIG. 101).

Accordingly, a vector stress directed line would be 90° against the theoretical tangential line at the time. With a functional angle $\Theta$ of the vector, they are as follows:

$$\alpha = 22/50°, \beta = 7.5$$

$$\Theta = 90° - (\alpha + \beta)$$

$\Theta = 60°$ thus, it is noticed as further the vector stress W will become:

$W = 2 \cos 60° \times F,$ $W = 4$ Kg f, and $\cos 60° = 0.5;$ therefore, substituting those actual figures into the equation;

$4 = 2 \times 0.5 \times FHD,$ thus $FHD = 4/(2 \times 0.5) = 4$ Kg $f$

Theoretically, calculating for conditions in which there is a same diameter of the wire rope, with no connecting arm Y and no core ring Z being used, it is an eight angled rhombohedron; therefore, it becomes:

$\Theta = 90° - 22.5° = 67.5°$ and the equation is $W = 2 \times \cos \Theta \times F_1$ under $\Theta^1 = 67.5$, $\cos \Theta^1 = 0.382$
and $Fi = 4$, so that substituting the above figures into the equation of $W - 2 \times \cos \Theta^1$, one obtains:

$W = 2 \times 0.382 \times 4 = 3.05$ Kg $f.$

According to the above model calculations, it is known that if a mere eight angled rhombohedron type of model is used, it is powerless because of 3.05 Kg f against 4 Kg f of this invention; therefore, it will be able to prove theoretically that the anti-skid net bodies 21 will rise from the tire easily in that degree.

If it be so, in order to obtain 4 Kg f without using the connecting arm Y and the core ring Z so as to be able to 4 Kg f by the eight angled rhombohedron, the following equation is adoptable:

$W = 2 \times \cos \Theta^1 \times F$ as actual figures: $W = 4$, $\cos \Theta^1 = 0.382$,
thus, substituting those figures into the above equation, $4 = 2 \times 0.382 \times FHD$ $F_1 = 4/(2 \times 0.382) = 5.32$ Kg $f.$ It is understandable that, therefore, it will be necessary to enlarge the diameter of the wire rope for obtaining the above strength. As an another way to prove the above, it is possible to practice in controlling of the modulus of a rubber expansion; however, to increase the modulus of the expansion makes it become difficult only to hook, so that it will be not the best way for an improving direction. If those calculations arc graphed, FIG. 103 can be developed, In FIG. 103, graph 24 shows this invention, graph 23 shows results for an enlarged diameter and graph 22 shows results for an equal diameter.

In this graph, it is proved that this intentional practice does not need a strength in the initial extension, and contrarily shows a reactional strength during use.

Further, in way of additional explanation, it should be readily understood that this invented practice comes to have a h-value of the extension strength against the thing without the connection arm Y and the core ring Z.

Additionally, it will be explained about the test data of this invention. For example, it was theoretically calculated for a total stress relationship in case of arranging the detachable metallic parts A into eight places of this invented practice with load of 7.95 Kg per each detachable metallic part A.

These extension ratios and diameters of the parts used in this case were:

| Parts | Extension Ratio | Diameter |
| --- | --- | --- |
| Actional ring X: | 19.2% | 9.5 mm |
| Connecting arm Y: | 8.1% | 8 mm |
| Core ring Z: | 5.0% | 10 mm |

Figure 104:
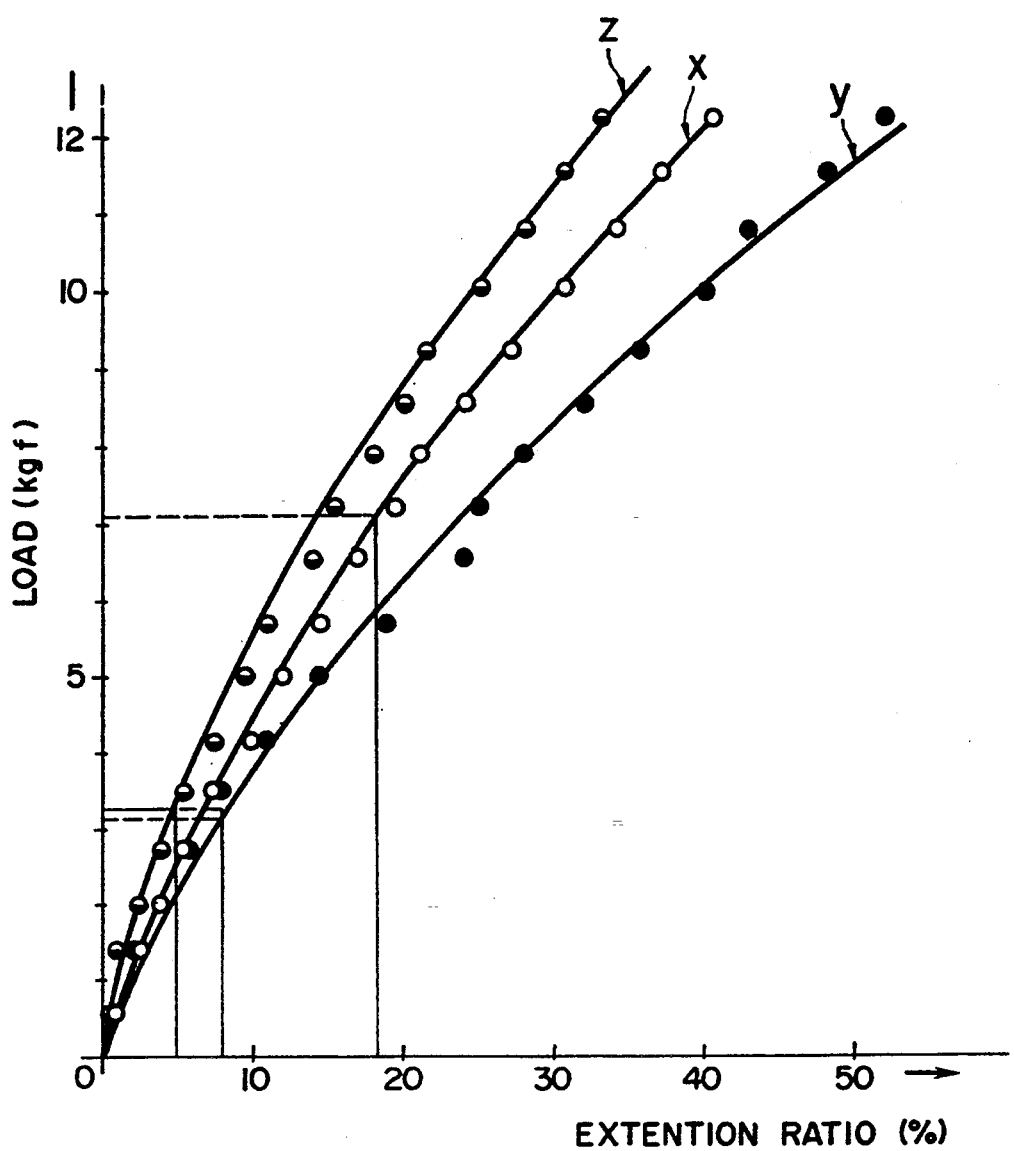
Figure 105:
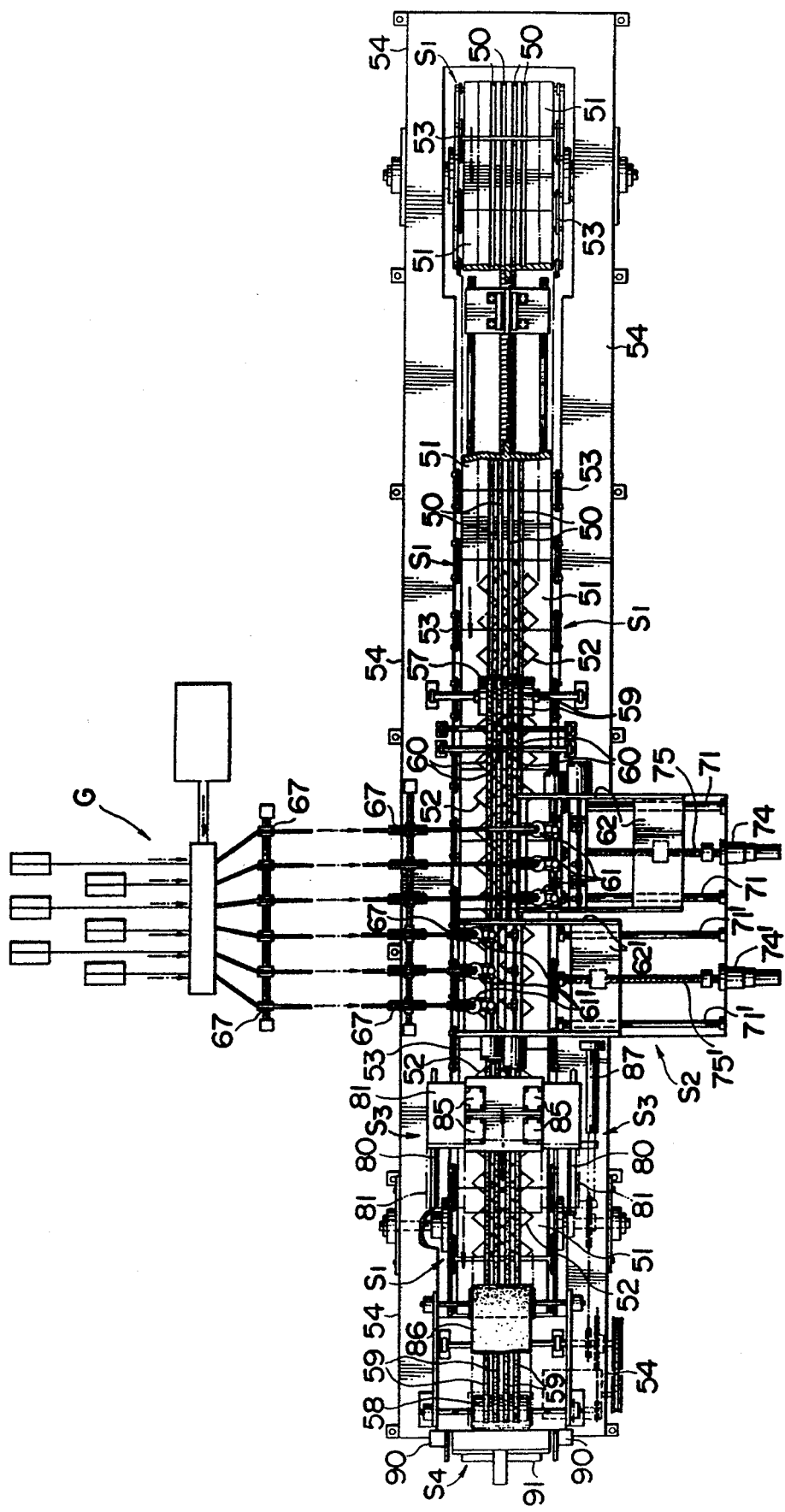
FIG. 105 is a front view, in partial section, for showing the sub-molding apparatus.

FIG. 104 shows the relationship between the load and the extension ratio of the parts. It is referred to as SS-curved line as follows. Referring to the figures shown in FIG. 104, and calculating the loads of each section, they are as follows:

Actional ring X: 7.4 Kg
Connecting arm Y: 3.0 Kg
Core ring Z: 3.3 Kg

The strength of extending the core ring Z is 3.3 Kg and the core ring is suspended by eight pieces of the connecting arms Y, so that the strength $W_1$ to be loaded upon one piece of the connecting arm Y may be calculated in accordance with following equation:

$W_1 = 2 \times W \times \sin [2/n)/2]$

In this case, $n = 8$, $W = 3.3$ Kg f, so that substituting those figures into the above equation:

$$\begin{aligned} W_1 &= 2 \times 3.3 \times \sin 22.5° \\ &= 2 \times 3.3 \times 0.38 \\ &= 2.53 \text{ Kg f} \end{aligned}$$

However, a strength to be able to extend the actional ring X with $a'' - a'$

According to actual measurements, value may add onto the connecting arm Y; they were:

$a'' = 165$ mm, $h = 12.68$ mm therefore, from the following equation:

$$\begin{aligned} \tan \beta &= h/(a'/2) \\ \tan \beta &= 12.68/82.5, \text{ thus} \\ \beta &= 8.74° \end{aligned}$$

Next, $a''/2$ is measured as 83.5 mm Accordingly, the extension ratio of the actional ring X is:

$[(83.5 - 82.5)/82.5] \times 100 = 1\%$

Thus, according to a SS-curved line, the strength of extending 1% will be 500 Kg. Against the connecting arm, the actional ring X keeps a balance in 2F cos $(90 - \alpha) = W$. The load of the connecting arm Y in the direction of the actional ring X is $F = 500$ Kg; therefore, substituting 500 Kg into the above equation, it results in 0.15 Kg. Therefore, the strength to load on the connecting arm Y is: $0.15 = 2.53 = 2.68$ Kg f, and this calculated figure is close to former actual figure. Differences may be considered to arise from delicate elements of characteristics and shape of the rubber material. Further, the load W of the actional ring X may be calculated by following equations:

$$W = F \times \cos \Theta \times 2$$
$$O = 90° - (22.5° + 8.7°)$$
$$= 58.50$$
$$\cos = 0.518, \text{ so that is calculated as } 7.67 \text{ Kg}$$

cos=0.518, so that is calculated as 7.67 Kg
It is clear that the above figure nearly assumes the figure of an actual load, and showing it in a drawing, it is known that the character is shown by the curved lines of FIG. 25 mark (3). There is no doubt that those characters fit to a thing of around 15 hooking sections.

What the above clarifies is that, because the connection arm Y was arranged with the outside of actional ring or the setting band, otherwise by means of arranging the connecting arm Y and the core ring Z, it does not need as much strength when it is fixed, nevertheless, it still shows a strong elasticity against the load during use.

Explaining the method of manufacture of this invention again, non-vulcanized anti-skid net bodies 21' are knitted in use of the cord material 1 firstly, then a preliminary molding process is performed to form in hook of the cross section b of the anti-skid net bodies 21' temporarily, and then a vulcanizingly finish-molding process is performed to complete the non-vulcanized anti-skid net bodies 21' formed preliminarily under hot-press forming. It should be noted that it is good to perform the preliminary molding process by a below mentioned hand works, otherwise it is also good to perform automatically with a preliminary molding apparatus as shown in the explanation of No. 12 sectional invention.

Figure 109:
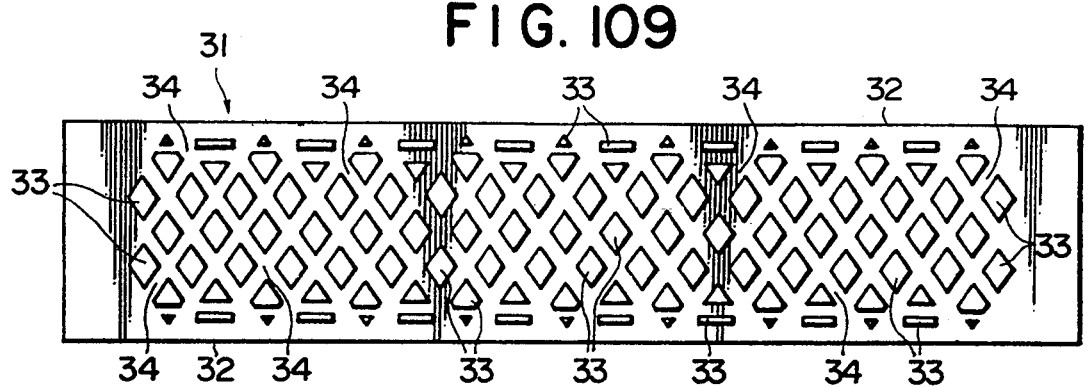
FIGS. 109–112 are top plan views for showing the channel of inserting the thickly coated cords with cores into the sub-molding apparatus.

The preliminary molding die 31, which is shown in FIG. 109, consists of a surface plate made by a wooden board or the like in which blocks 33 for shaping multiple net-space sections are placed in juxtaposition on the surface plate 32. The net grooves 34 are scooped with same net patterns of the objective anti-skid net bodies in between each block 33. This functions as a guide groove instrument for knitting the anti-skid net bodies accurately.

Figure 113:
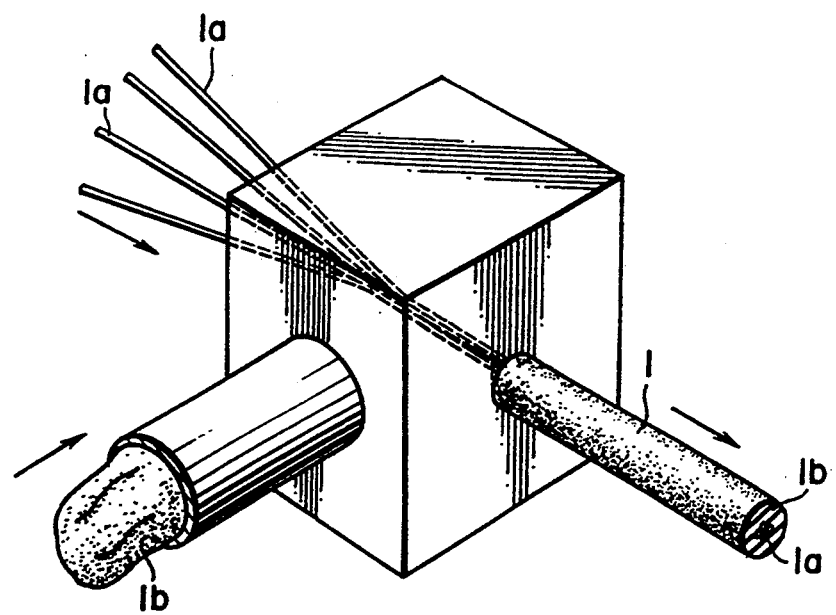
FIG. 113 is a perspective view for showing the sending out section of the molding apparatus to send out the cords.
Figure 114:
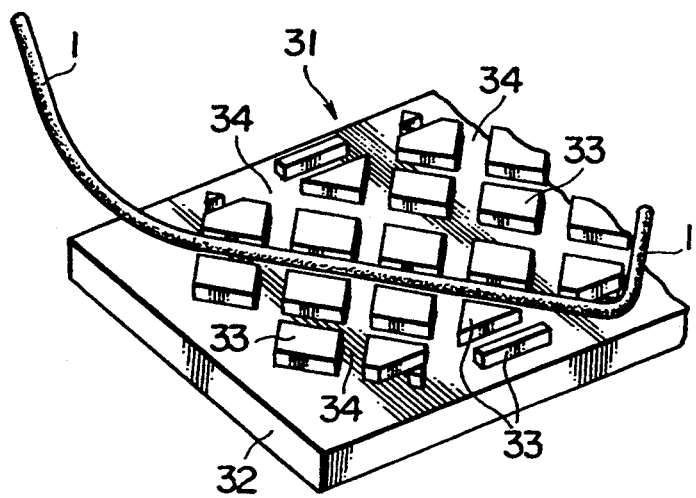
FIG. 114 is a perspective view for showing the inserted state of the cords into the sub-molding die.
Figure 121:
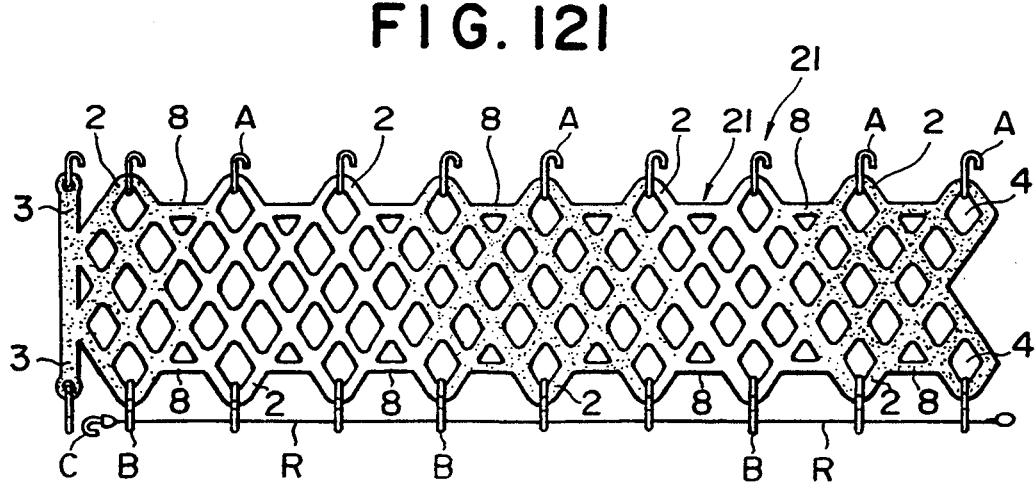
FIG. 121 is a front view for showing the anti-skid attachment net bodies.

The term "anti-skid net bodies 21" means a thing of the net shape patterns as shown in FIG. 121 in this case, and also as shown in FIG. 113, means the cord 1 molded extrudingly with coating of the non-vulcanized rubber 1b around several core materials 1a' consisting of a wire, a synthetic fiber and a glass-fiber to cross with an inclined shape, and then knitted into a rhomb shaped net so as to form the hooking section 2 with a constant interval in both sides as shown in the drawings, and additionally to make plug-in FIG. 114 of the cord 1 along the inside of net shaped grooves 34 of the previously mentioned preliminary molding die 31, and knits them within the net shaped grooves 34.

Figure 7:
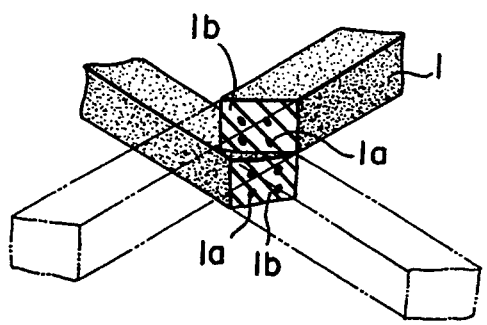
FIG. 7 is a sectional view for showing the principal part of the crossing section before the manufacture in which is practiced in this invention.
Figure 8:
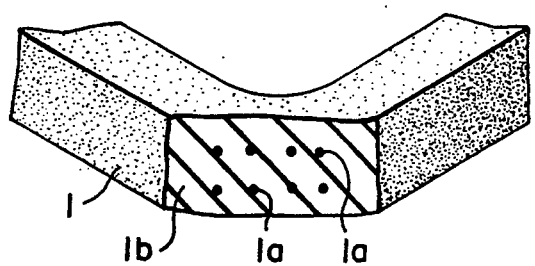
FIG. 8 is a sectional view for showing the crossing section practiced in this invention.
Figure 9:
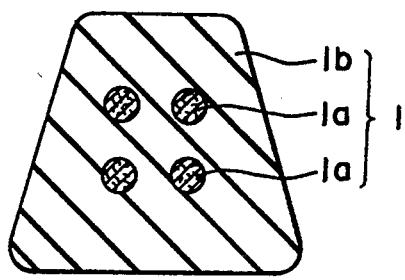
FIG. 9 is an enlarged sectional view for showing the wire rope material to be used for the practiced goods of this invention.
Figure 10:
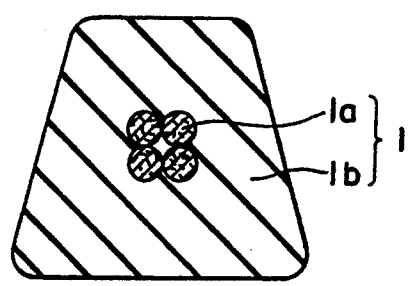
FIG. 10 is an enlarged sectional view for showing the wire rope materials in conventional goods.
Figure 11:
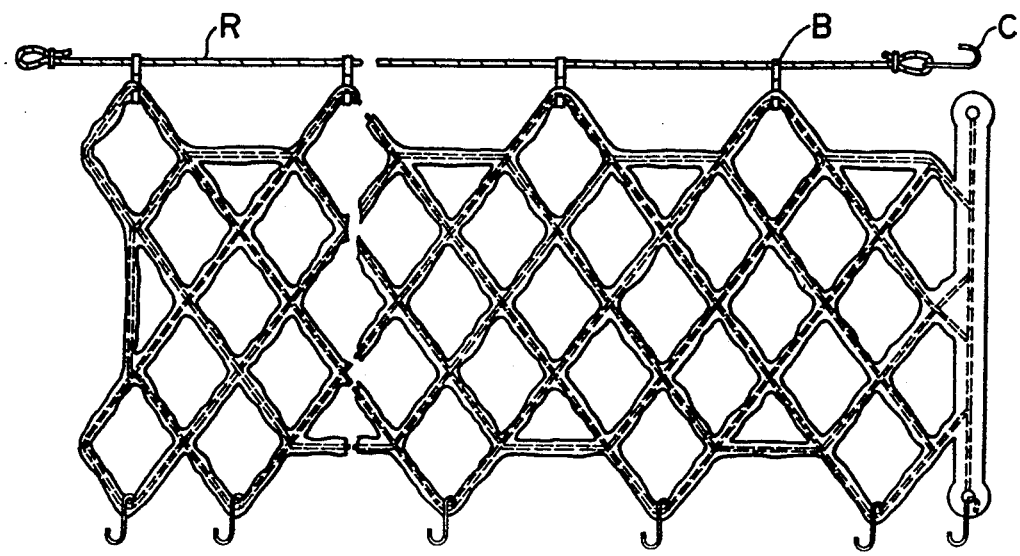
FIG. 11 is a top plan view for showing a conventional type of anti-skid attachment.
Figure 110:
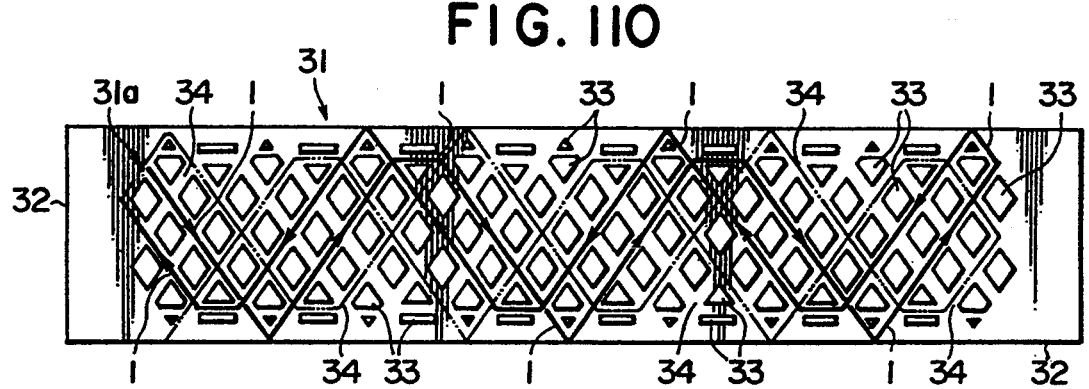
Figure 111:
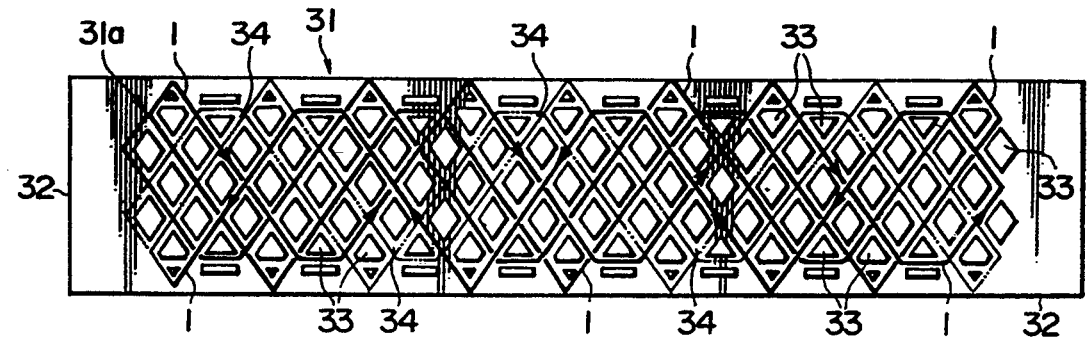
Figure 112:
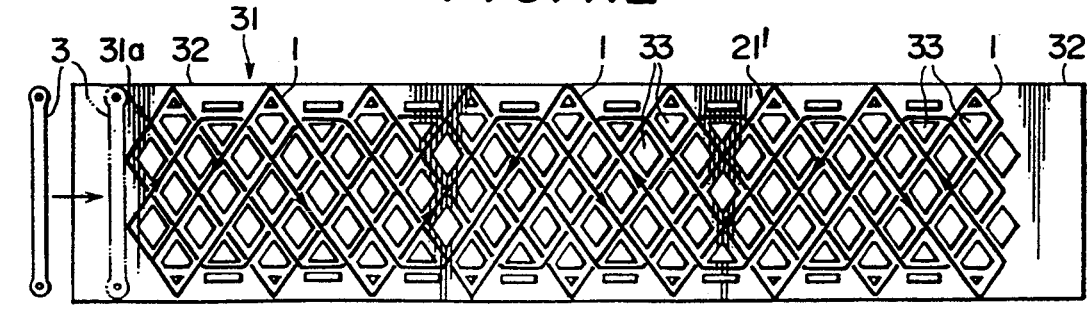

With regard to the knitting work, referring to FIGS. 110 and 112, the end of the previously mentioned cords 1 are first hooked with the one side most end of the take-off point 31a of the net shaped grooves 34 of the preliminary molding die 31. While the cord 1 is going to be plugged into the net shaped grooves (34) along a channel as shown in FIG. 110 in a doglegged way, the other end of the cord 1 is turned up in the opposite side end section against the take-off point 31a, and then the other end of the cord 1 is brought into the side of the take-Off point 31a while they are knitting with a doglegged way along to the one line shifted net shaped grooves 34. Continuously, as shown in FIG. 7 and FIG. 112, the above cord 1 is plugged into the net shaped grooves 34 by shifting of one line along the channel shown in the drawings, and after three times around both ways, the cord 1 is knitted over upon the whole of the net shaped grooves 34, and then, to finish, the non-vulcanized anti-skid net bodies 21' are knitted within grooves 34. Further, the one side end of the above stated non-vulcanized anti-skid net bodies 21' are laid on top of another molded connecting band 3, and the cord 1 of the non-vulcanized anti-skid net bodies 21' are put therein twistingly. See FIG. 112.

Next, each cross section of the non-vulcanized anti-skid net bodies 21' in which are knitted within the net shaped grooves (34) of the preliminary molding die (34) are fixed temporarily by means of the hot press.

Figure 115:
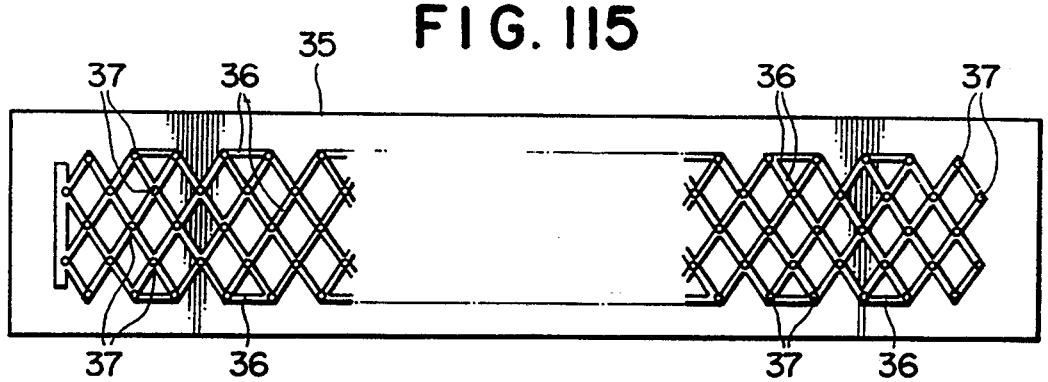
FIG. 115 is a front view for showing the press die.
Figure 116:
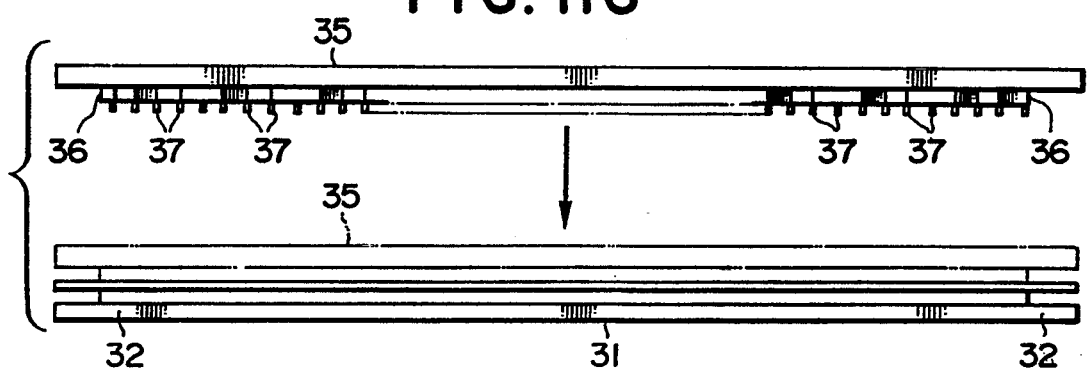
FIG. 116 is a front view for showing the relationship between the sub-molding die and the press die.
Figure 117:
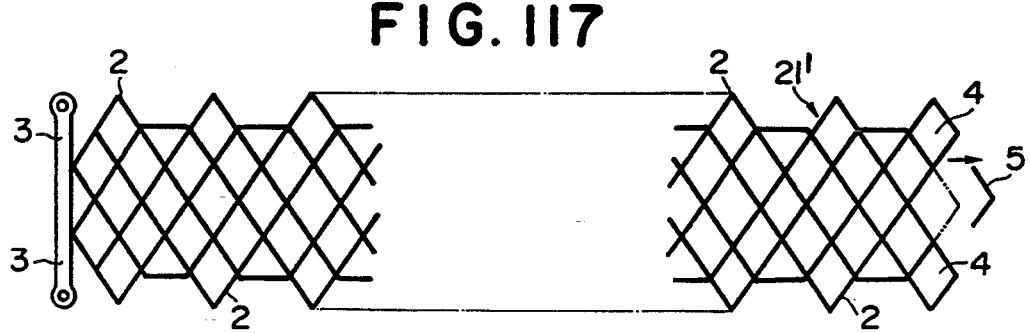
FIG. 117 is a front view for showing the anti-skid attachment net bodies after sub-molding.

The mark 35 of FIG. 115 is for showing a temporary assembly plate 35 to be arranged projectedly "net shape projected stripes 36" for plugging into "net shaped grooves 34" of "preliminary molding die 31" over the whole surface, and further to be arranged projectedly "press-pin 37" in each crossed section. When "the each crossed sections of non-vulcanized anti-skid net bodies (21')" is fixed temporarily, the net shape projected stripe 36 of the above temporary assembly plate 35 plugs into the net shaped groove 34 of the preliminary molding die 31 (FIG. 116), and acts to press by the stated both molding die 31 by means of a press machine in a suitable time. By these treatments, those beds of non-vulcanized rubber 1b of both cords 1 crossed in each crossed sections are adhered to each other by adhesion based on temporary fixing, and "the non-vulcanized anti-skid net bodies (21')" are maintained in this form so as to be not disconnected. The unloaded non-vulcanized anti-skid net bodies 21' from the preliminary molding die 31 will be treated so that an excess part of the net shape material 5 of the connecting section 4 is cut away. See FIG. 117.

As mentioned above, the preliminarily molded non-vulcanized anti-skid net bodies 21' enter into a vulcanizingly finishing process. This process is described below.

Figure 118:
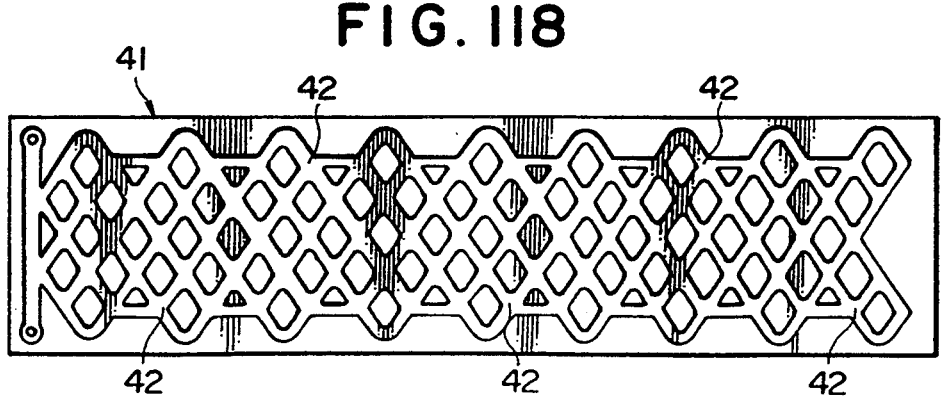
FIG. 118 is a front view of the vulcanizing press die.

The vulcanizing press die 41 shown in FIG. 118 is a metal mold for molding finishedly the preliminarily molded anti-skid net bodies 21' to a predetermined shape. On one side, the net shaped molding grooves 42 for molding the anti-skid net bodies (21) are formed scoopedly in accuracy.

Figure 119:
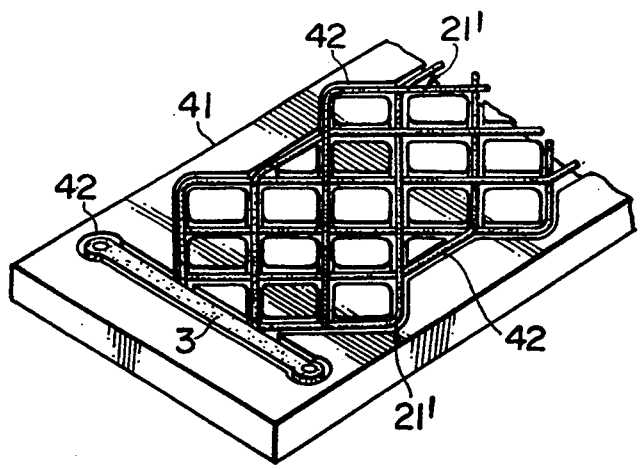
FIG. 119 is a perspective view for showing the edge section of the vulcanizing press die in the inserted state of the anti-skid attachment bodies after finish the sub-molding.
Figure 120:
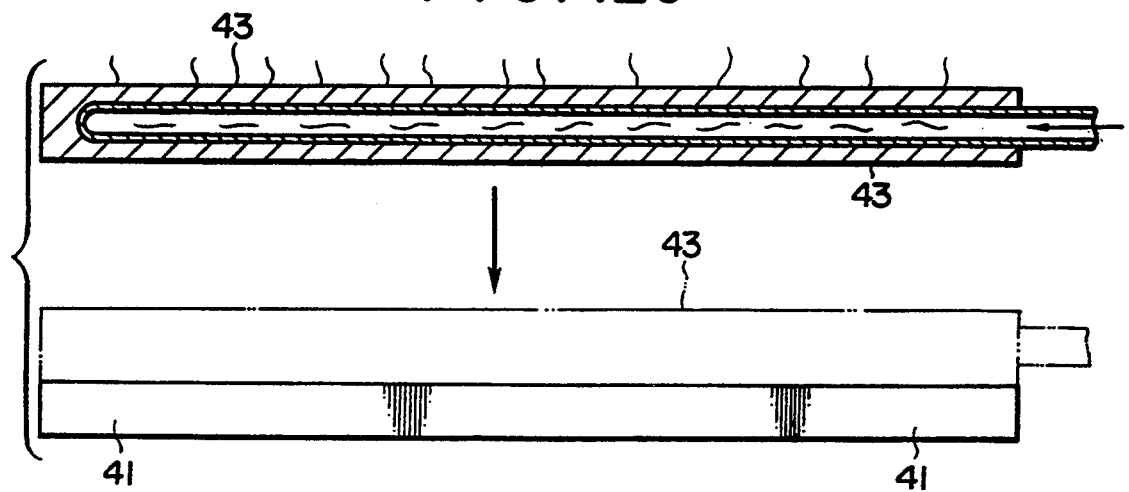
FIG. 120 is a front view, in partial section, for showing the state of pressing down a hot-press section onto the vulcanizing press die.

As shown in FIG. 119, the vulcanizingly finish molding is done to press a steam heated hot-press board 43 onto a vulcanizing press mold 41 after plugging the preliminarily molded non-vulcanized anti-skid net bodies 21' into the net shaped grooves 42 of the above vulcanizing press mold 41, the non-vulcanized anti-skid net bodies 21' are pressed for around eleven minutes at a temperature of about 145° C. Finally, they are molded up finishingly while vulcanizing the non-vulcanized anti-skid net bodies 21' in the state of preliminary mold.

As shown in FIG. 121, the unloaded anti-skid net bodies 21 from the vulcanizing press mold 41 are fixed, after cutting off of the excess edges, by the detachable metallic parts A and the fixing metallic parts B with each hooking sections 2, 2', and further the inside wire rope (R) are fixed along to the inside hooking section 2 through the wire rope fixing metallic parts B for completion.

As described previously, the knitting works of the non-vulcanized net bodies 21' within the net shaped grooves of the preliminary molding board will be good by a hand work as mentioned above, or also done well automatically by the preliminary molding apparatus; therefore, the explanation of knitting works by the preliminary molding apparatus will be described in the explanation of the preliminary molding apparatus contents of the No. 12 sectional invention.

Those portions of the invention to which FIGS. 105–137 are relevant are explained below.

The preliminary molding apparatus S is to mold the non-vulcanized anti-skid net bodies 21' as was explained in the patterns of the No. 11 sectional invention preliminarily. This comprises a molding board belt conveyor $S_1$ into which is scooped the net shape grooves 52 for knitting the anti-skid net bodies; an extruding section $S_2$ to insert cords 1 into the above net shaped grooves 52 for knitting them; a temporary stopper section $S_2$ to press each crossed section of the non-vulcanized anti-skid net bodies 21' unloaded from the molding board belt-conveyor S.

The molding board belt-conveyor S, comprises a large number of molding plates 51 connected to each other by the connecting metallic parts 53 flexibly and also endlessly, these molding plates 51 fixed between both supporting drums 55, 55' which are arranged at both ends of frames 54 so as to allow reversible rotation by means of driving motor 56.

Net shaped grooves 52 are formed scoopedly for knitting the non-vulcanized anti-skid net bodies 21' on the surfaces of each of the above molding plates 51 and the four stripes of grooves 50 for unloading from the belt-conveyor, which are laid onto the belt-conveyor moving direction parallel along a non-hooking space section of the net shape crossed section of the net shaped groves 52 so as to be formed continuously those both grooves of the net shaped grooves 52 for knitting of the non-vulcanized anti-skid net bodies 21' and the four stripes grooves 50 for unloading from the belt-conveyor upon the whole length of the conveying surfaces of the mold board belt-conveyor $S_1$, composed of jointing with the molding plate 51.

Four pieces of a steel made endless type belt-conveyor 59 for unloading the material are arranged between the supporting roller 57 arranged on the conveying surfaces of the above molding board belt-conveyor $S_1$, and the driving roller 58 of a back side end of the frames 54. This belt-conveyor 59 causes pressing contact for unloading from the mold by means of a pushing rollers 60 onto the bottom of previously mentioned each four stripes grooves 50 for unloading from the belt-conveyor so as to move said belt-conveyor 59 together with the molding plate 51 on the conveying surfaces of the molding board belt-conveyor $S_1$, by means of the rotation of the driving roller 58 synchronized with the supporting drums 55'.

The extruding section S1 which is arranged on the conveying surfaces of the above molding board belt-conveyor $S_2$ provides six pieces of the extruding heads 61 to extrude the cord 1 molded by the aforesaid cord molding apparatus G.

As shown in FIG. 108, each of the extruding heads 61, 61' are arranged vertically upon the support tables 62, 62'. Also arranged is an extruding channel 63 passing through the upper and lower parts in the inside. The end of the extruding head 64 rotates freely and connects to motor 65 by belt 66. Thereby, head 64 rotates reversibly with a predetermined timing.

The cord 1 which is molded by the cord molding apparatus G is introduced until each extruding head 61, 61' by means of some number of guiding reels 67, and inserts the cord 1 into the upper inlet port of the extruding channel 63, and the material 1 is extruded to the surface of the molding plate 61 from the lower end of the extruding port 69 by means of the rotation of the extruding rollers 68, 68 which is arranged within the end of the head 64. The extruding rollers 68, 68 are driven by the motor 70 with a predetermined timing and speed so as to rotate and stop.

The extruding heads 61, 61' of the above composition are divided into two pairs of three, and those heads 61, 61' are supported by sliding levers 71, 71', and they are arranged with a plug-in-shape of pairing three pieces per each in which are slidable freely upon those of spline shafts 72, 72' which are arranged on the support table 62, which is moved reciprocatingly toward a crossing direction of conveying direction of the molding plate belt-conveyor S11 Further, those extruding heads 61, 61' are supported on shafts 72, 72' tighteningly with a tightening screw 73 which leaves a wider space of two pieces suited to the net shaped grooves 52 per each.

Figure 122:
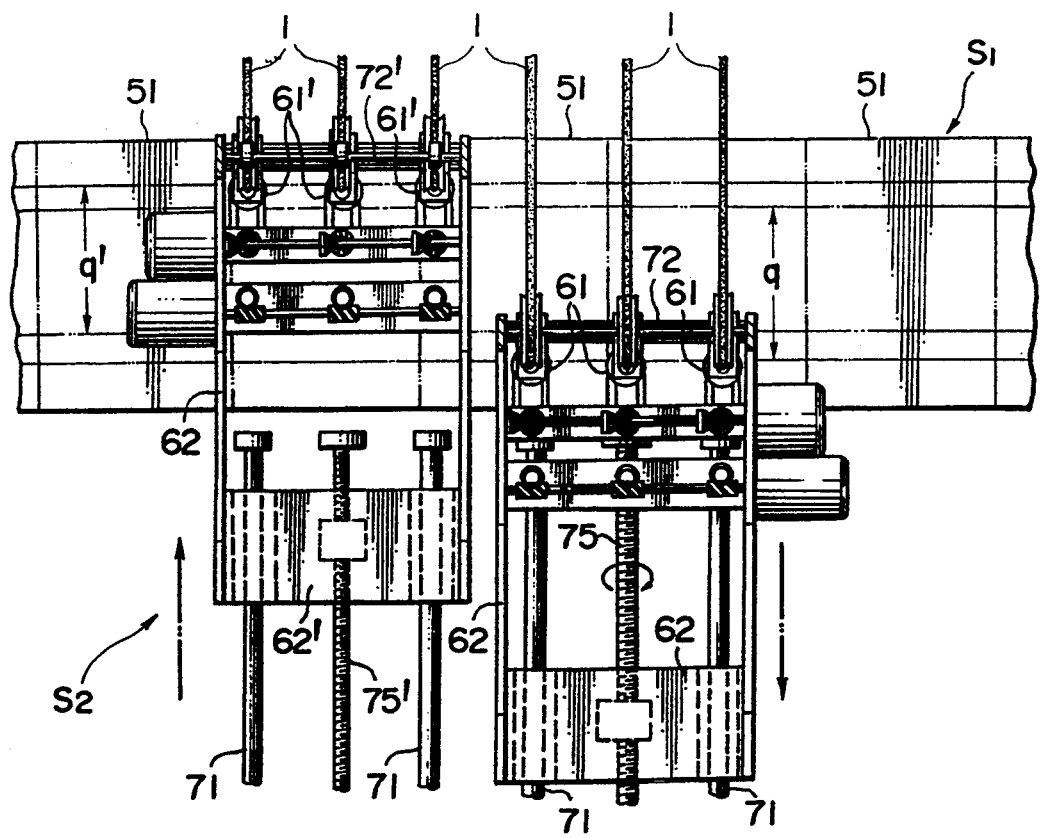
FIGS. 122 and 123 are top plan views for showing the support basement of reciprocating motion with respect to each other.
Figure 123:
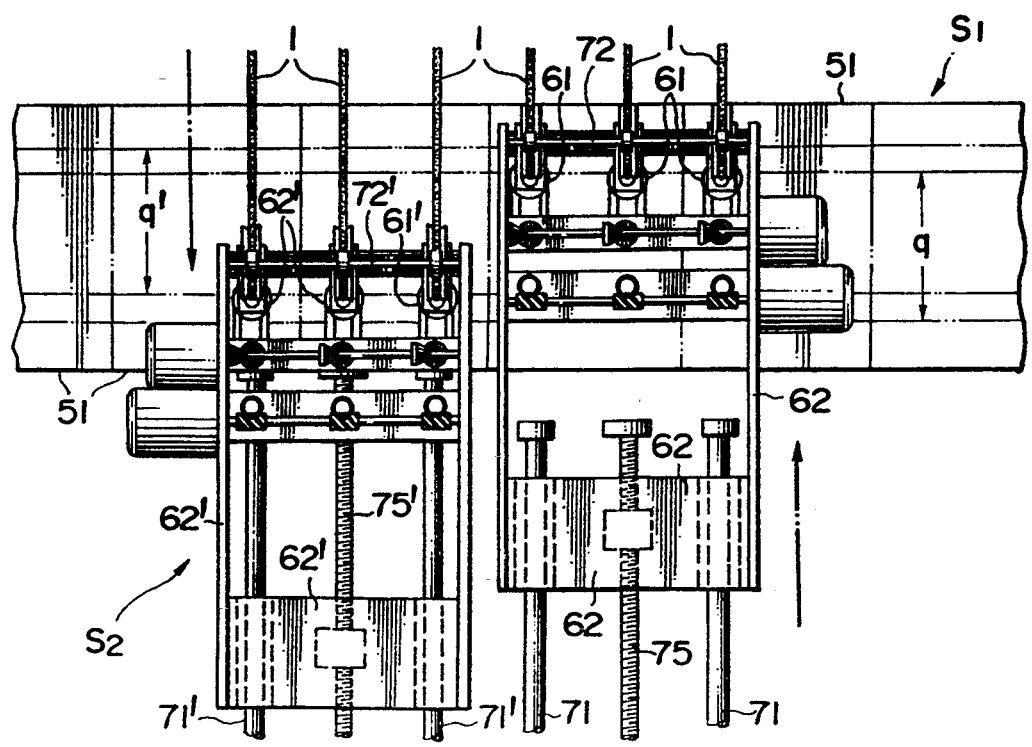

Further, the above-mentioned two units of the support tables 62 and 62' which will be tightened screwingly with a screw shaft 75 in which are rotated reversingly by extruding motors 74, 74' for rotating a screwingly jointed section 76 which was arranged in the bottom of tables 62, 62'. The extruding heads 61, 61' in which are arranged with said both support tables 62, 62' respectively are formed so as to situate at the one side end and also the other side end of the net shaped grooves 52. By means of rotating the above both extruding motors 74, 74' in an opposite direction together at the same time, the extruding heads 61, 61' in which are arranged on the both support tables 62, 62' in the above state will be operated reciprocatingly with respect to each other with a same span stroke q, q between the net shaped grooves 52 on the conveying surfaces of the molding plate belt conveyor $S_1$, and the side edge section 8 of the other side. FIGS. 122–123 illustrate this point.

The above mentioned conveying movement of the molding plate belt conveyor $S_1$, and the reciprocating movement of both support tables 62, 62' will be synchronized as described below. Those movements make the cord 1 which are extruded from each extruding head 61, 61' be inserted into the net shaped grooves 52 of the molding plate belt-conveyor $S_1$, along predetermined channels. It will be explained as to the inserting channel of the cords 1 in the knitting time.

Figure 124:
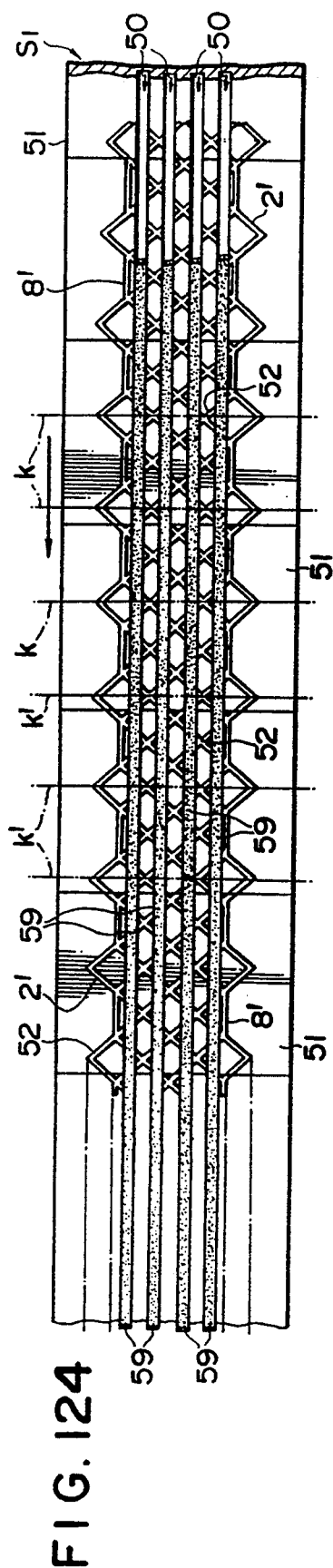
FIGS. 124–128 are top plan views for showing a belt conveyor type of molding die and the channels of the net shape rows.

FIG. 124 is a drawing for showing the conveying surfaces of the molding plate belt-conveyor S11 Each extruding head 61, 61' is operated reciprocatingly with the above mentioned stroke q, q along to a moving line K, K' as shown in FIG. 124. Each of the cords which are extruded from the extruding heads 61, 61' of the support table 62 will be inserted with a dogleg, at the same time, by means of inserting the cord 1 extruded from the extruding heads 61, 61' of the support table 62' into and along the channel of the net shaped grooves 49 shown in FIG. 126. The non-vulcanized net bodies 21' will be knitted continuously toward the conveying direction of the belt-conveyor with making to insert crossingly those three pieces bundled cords 1 extruded from both extruding heads 61, 61' into all of the net shaped grooves 52 as shown in FIG. 127. See also FIG. 128.

Figure 125:
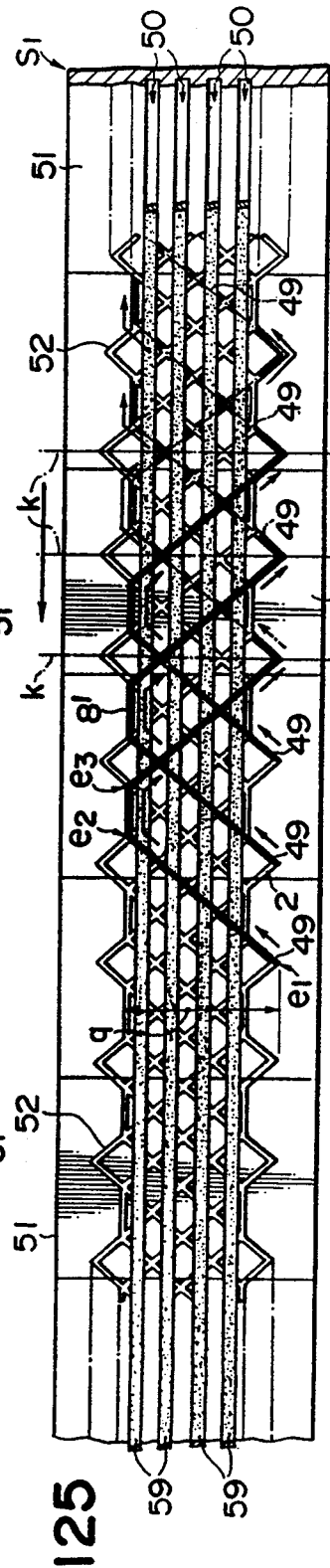
Figure 126:
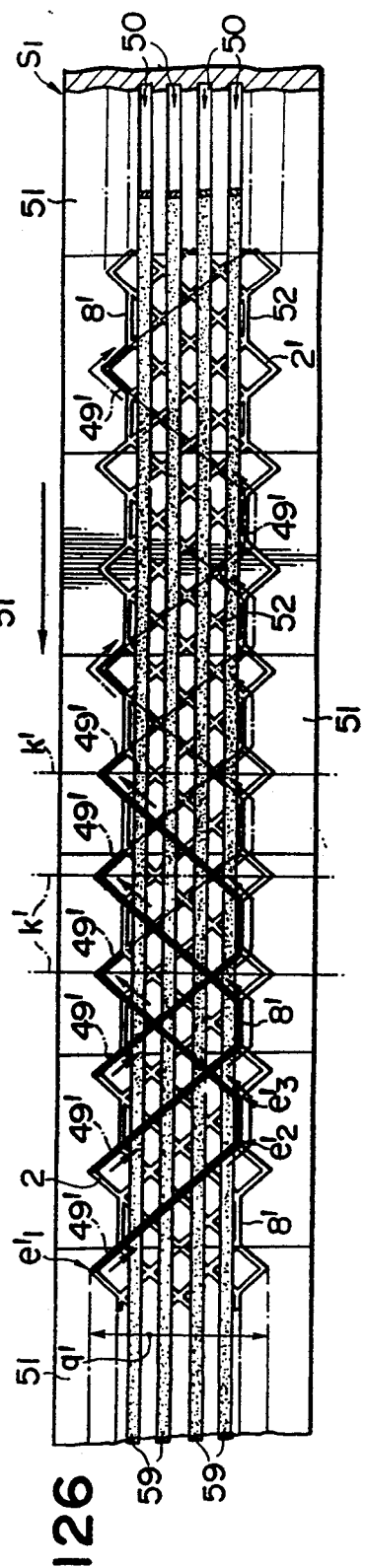
Figure 127:
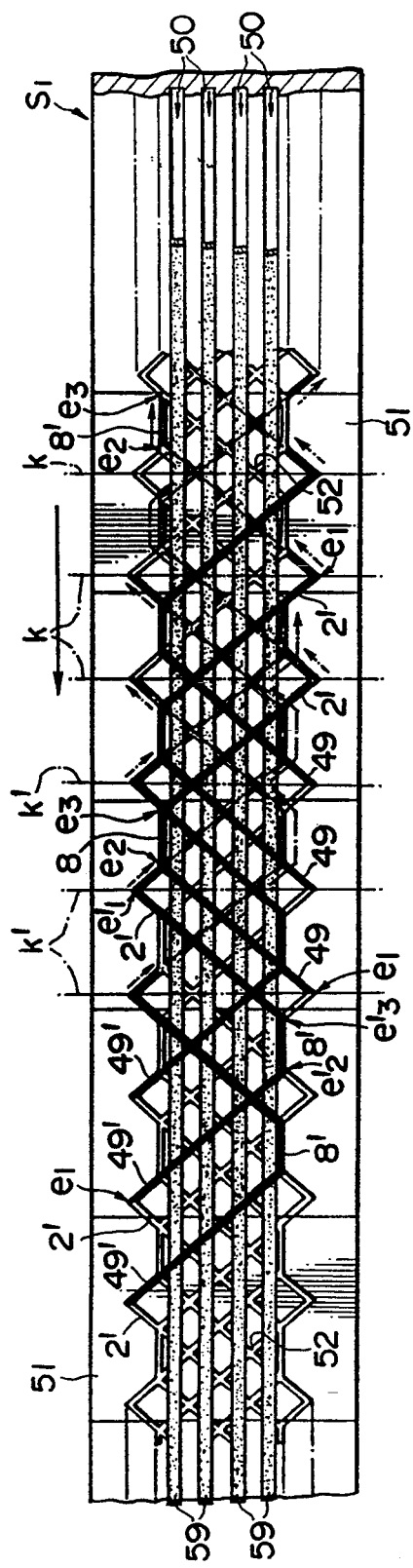
Figure 128:
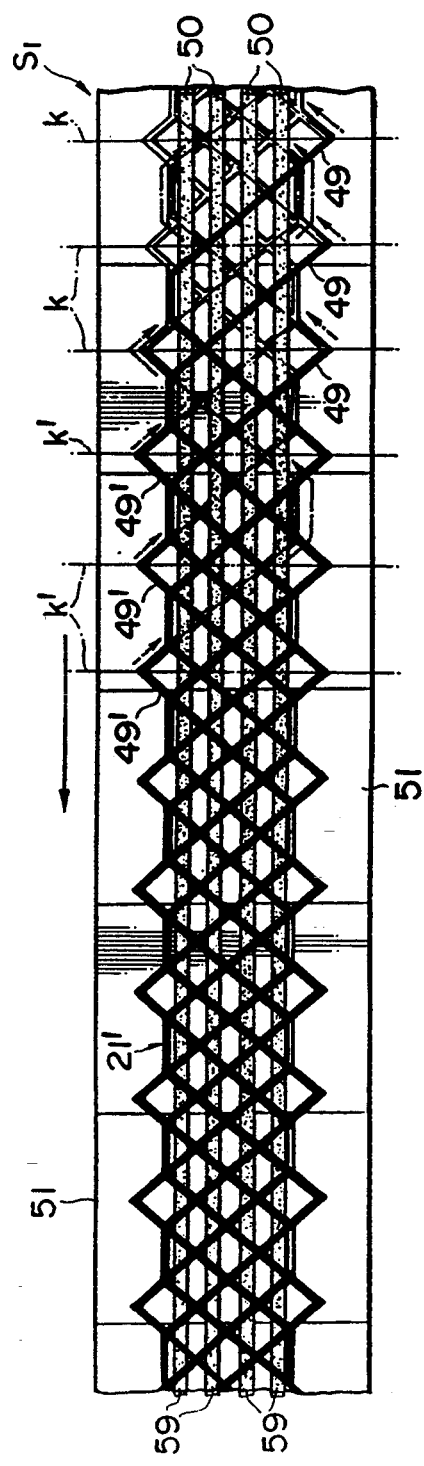

Next, it will be explained about a relationship between the molding plate belt-conveyor S1 for causing movement along the channel of the above-mentioned elements and the support tables 62, 62':

Both of the extruding heads 61 and also 61' are usually operated in opposite directions respectively, and in case of processing the non-vulcanized net bodies 21', owing to those channels of the net shaped grooves 49, 49' of making to insert the cords 1 being arranged symmetrically as shown in FIG. 125 and FIG. 126, the quantity of the conveying movement and the timing of starting the conveying movement or stopping the movement will be similar, so that both of the heads 61, 61' will be actioned symmetrically with respect to each other.

Further, during the knitting process, the molding plate belt-conveyor $S_1$, will be activated intermittently so as to be controlled to move conveyingly while it repeats a stopping motion with a predetermined time when each of the bent sections $e_1$, $e_2$, $e_3$, $e_1'$, $e_2'$, $e_3'$ of both sides of the channel of the net shaped groves 49 shown in FIG. 125 and FIG. 126 have come to an upper position of moving line K, K' of the extruding heads 61, 61'.

The molding plate belt-conveyor $S_1$, moves conveyingly as mentioned above; with the above movement, the channel 49, 49' of the net shaped grooves 52 passes through toward the side end of the straw cutter $S_2$ under the moving line K, K' of the extruding heads 61, 61'.

The molding plate belt-conveyor $S_1$, moves conveyingly as mentioned above; with the above movement, the channel 49, 49' of the net shaped grooves 52 passes through toward the side end of the straw cutter $S_2$ under the moving line K, K' of each extruding head 61, 61'. Against this conveying movement, in both of the support tables 62, 62', those of the extruding heads 61, 61' arranged in said support tables 62, 62' will be operated synchronizingly so as to move usually to a just upper position of a crossed point between the moving lines K, K' of those extruding heads 61, 61' and the channel 49, 49' of the net shaped grooves tracing by those extruding heads 61, 61'.

That is, this crossed point between the moving lines K, K' of the extruding heads 61, 61' and those channels 49, 49' of the net shaped grooves with a dogleg shape will be moved reciprocatingly upon an upper position of said each moving line K, K', and moved reciprocatingly with respect to each other on each moving line K, K' so as to trace the above crossed point.

Following this, each sectional function of the molding plate belt conveyor $S_1$, and the extruding sections $S_2$ in case of inserting the cord 1 along to the channels 49, 49' of the net shaped grooves in the above will be explained as follows;

When the knitting starts, the extruding heads 61, 61' are allowed to situate anywhere; however, as shown in FIG. 125 and FIG. 126, the knitting process will be started from the bent sections $e_1$, $e_2$ toward a hooking sectional grooves 2' in the net shaped grooves 52 as the starting point.

With the movement of the molding plate belt-conveyor S1, the support table 62 moves synchronizingly as mentioned previously, and inserts the cord 1 extruded from each extruding heads 61, 61' along the channels 49, 49' of the net shaped grooves as shown in FIG. 127.

The molding plate belt-conveyor $S_1$, and the support tables 62, 62' are operated with a predetermined speed ratio from the starting point to the bent sections $e_2$, $e_2'$ of the hooking section $2^1$. From the bent sections $e_2$, $e_2'$ to the bent sections $e_3$, $e_3'$, only the molding plate belt-conveyor $S_1$, is moved, and from the bent sections $e_3$, $e_3'$ to the bent sections $e_1$, $e_1'$ of the hooking section 2' of three hooking sections forward from the aforesaid starting point, the molding plate belt-conveyor $S_1$, is moved. Still further, the support tables 62, 62' are moved toward an opposite direction from the aforesaid direction; in this way based on repetition of the above mentioned actions, the non-vulcanized net bodies 21 are knitted continuously.

Further, those of the molding plate belt-conveyor $S_1$, and the support tables 62, 62' will be stopped at predetermined times when they reach the bent sections of $e_1$, $e_2$, $e_3$, $e,'$, $e_2'$, $e_3'$ of the hooking section 2' and the side edge section 8'. At this time, each extruding head (61) (61') turns and turns the head 61, 61' toward a same direction with the direction of the channel 49, 49' of the net shaped grooves for moving in the next, and owing to those movements, it will prevent a twist of the cord 1 which are fed insertingly into the net shaped grooves 52 from each extruding head 61, 61'.

As mentioned above, the non-vulcanized net bodies 21' which are knitted within the net shaped grooves 52 of the molding plate belt-conveyor $S_1$, will be gradually moved toward the end section of the molding plate belt conveyor $S_1$.

Between the extruding section $S_2$ and the terminal of the molding plate belt-conveyor S1 is disposed a temporary hooking section $S_3$ which hooks temporarily by pressing each crossing section of the non-vulcanized net bodies (21') knitted within the net shaped grooves (52).

The temporarily hooking section $S_3$ is composed of spanning a traverse plate 81 between a supporting rails 80, 80 arranged in both sides of the molding plate belt-conveyor $S_1$, and plugs both ends of said plate 81 into the rails 80, 80 supported to slide freely, and arranges a thrust plate 84 in which a large number of thrust pins 83 (thrust sectional material) are projected with the under surface of a central position of the traverse plate 81. It will be composed so as to move the traverse plate 84 reciprocatingly on the moving surface of the molding plate belt-conveyor $S_1$ by means of a telescopic movement of a hydraulic cylinder 87.

The above thrust pins 83 are projected in a position of each crossing section of the non-vulcanized anti-skid net bodies 21' in the under surface of the thrust plate 84, and the thrust plate 84 is held with going up and down freely by means a thrust cylinder fixed with the traverse plate 81, and when the thrust plate 84 is descended down by the hydraulic cylinder 85, 85, it makes each thrust pin 83 in which is projected in the under surface of the thrust plate 84 so as to press the each crossing sections of the non-vulcanized net bodies 21' knitted within the net shaped grooves 52.

Figure 129:
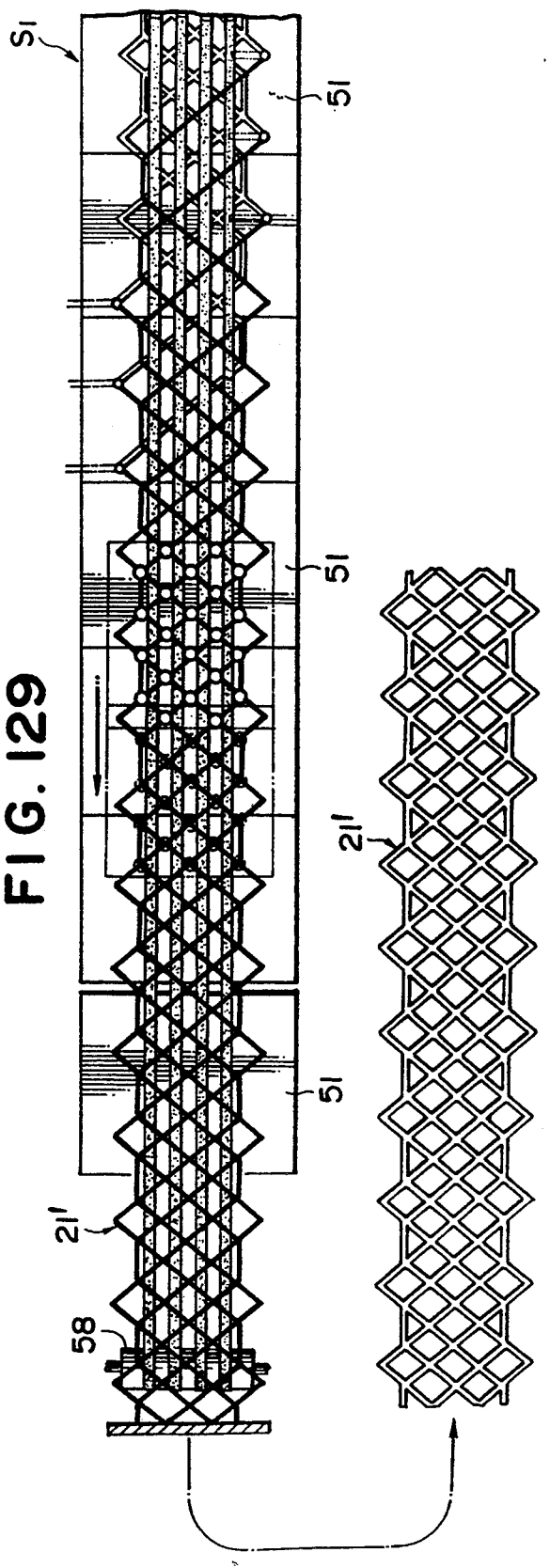
FIG. 129 is a top plan view for showing the nettingly molded section of the anti-skid attachment bodies.

The thrust plate 84 is lowered while the molding plate belt-conveyor $S_1$ is stopped, and descends down the plate 8 in the position of the back side of the support rails 80, 80, and presses each crossing sections of the non-vulcanized anti-skid net bodies 21' by the thrust pins 83. After that, the traverse plate 81 moves to the front side of the support rails 80, 80 as shown in FIG. 129, and after descending down the thrust plate 84 again, turns back the traverse plate 81 to an original position. After this, each time the non-vulcanized anti-skid net bodies 21' are moved a length of the range of the temporarily hooking f in the above, the above mentioned movement will be repeated.

The non-vulcanized anti-skid net bodies 21' in which each crossing section is hooked temporarily is kept to form so as to be not disjointed while it is left from the molding plate, and it will be left from the molding plate, and it will be left from the molding plate 51 by means of an exfoliation belt 59 when it is moved until the tail end of the molding plate belt-conveyor S11

As mentioned above, the exfoliation belt 59 is pushed against the bottom of the grooves of the exfoliation belt 59 which is grooved hollowingly on the molding plate 51, and the exfoliation belt 59 will be moved together with the molding plate belt-conveyor $S_1$, and the non-vulcanized anti-skid net bodies 21' knitted within the molding plate belt conveyor S1 is knitting on the exfoliation belt 59. Accordingly, the non-vulcanized anti-skid net bodies 21' moved to the end section of the molding plate belt-conveyor $S_1$, are left from the molding plate 51 which is to be bent downward by a supporting drum 55' of the tail end side, and they run on each exfoliation belt 59 which are stretched toward the driving roller 58 so as to extend on the moving surface of the molding plate belt-conveyor ($S_1$), and, further, they are moved toward the straw cutter $S_4$ in the tail end of the frame (54).

The non-vulcanized anti-skid net bodies 21' on the exfoliation belt 59 are moved until the tail end of the exfoliation belt 59 while it is thrust by a sending belt (86) rotating automatically on the surface, and it is cut off by the straw cutter $S_4$ with a predetermined length.

The straw cutter $S_4$ is composed to be supported with an universal movements toward up and down between the stays 90, 90 arranged in the tail end of the frame, and an electrical heater 91 is disposed with the side so as to be able to heat up the whole of said cutter $S_4$ with a predetermined temperature, and in case of cutting work, pushes the edge of the blade against the cutting position of the non-vulcanized anti-skid net bodies 21' which is movingly thrusted backward with a predetermined length from the straw cutter $S_4$, and cuts off it thrustingly while making the materials of the non-vulcanized anti-skid net-bodies 21' to soften by means of the heat of said blade $S_4$, and finishes the cutting off of the non-vulcanized anti-skid net bodies 21' With a predetermined length. See FIG. 107.

The preliminary molding in which was described in the No. 11 sectional invention will be good to be molded automatically by means of the preliminary molding apparatus S as mentioned above; in this way, the non-vulcanized anti-skid net bodies 21' being cut off with a prescribed length in the above is fixed with the one end of the connecting band 3, and after cutting off excess net parts, it is shifted to the process of the vulcanization as mentioned in the above.

The above mentioned preliminary molding apparatus S is set up so as to make the non-vulcanized anti-skid net bodies 21' with the net shape patterns shown in FIG. 129 to be for the preliminary molding, however, it will be able to mold preliminarily the anti-skid net bodies with an optional net shape patterns according to change those of the patterns of the net shaped grooves 52 of the molding plate belt-conveyor $S_1$, the number of the extruding heads 61, 61' to be used and an arrangement of the thrusting pins 83 of the temporary hooking section $S_3$.

Figure 130:
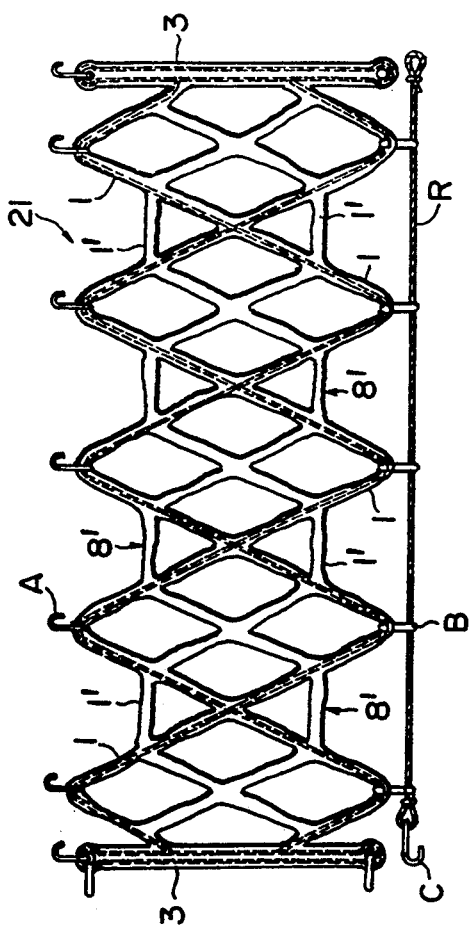
FIG. 130 is a front view for showing the anti-skid attachment consisting of cords including core materials and materials without core materials.

For example, those shown in FIG. 130 of the anti-skid net and a coreless linear materials 21 are knitted with four pieces of the cord 1, 1 and 1', 1', and in case of knitting the anti-skid net bodies 21', replaces the molding plate 51 of the molding plate belt-conveyor $S_1$, to another thing having a net shaped grooves 52 of the patterns of the above anti-skid net bodies 21, and further, the above cords 1 and the coreless cords 1' are extruded out by the use of totally four pieces of the extruding head 61, 61' combined with each two pieces of the heads (61) (61') from among these extruding heads 61, 61' arranged by each three pieces per both support tables 62 and 62'.

Figure 131:
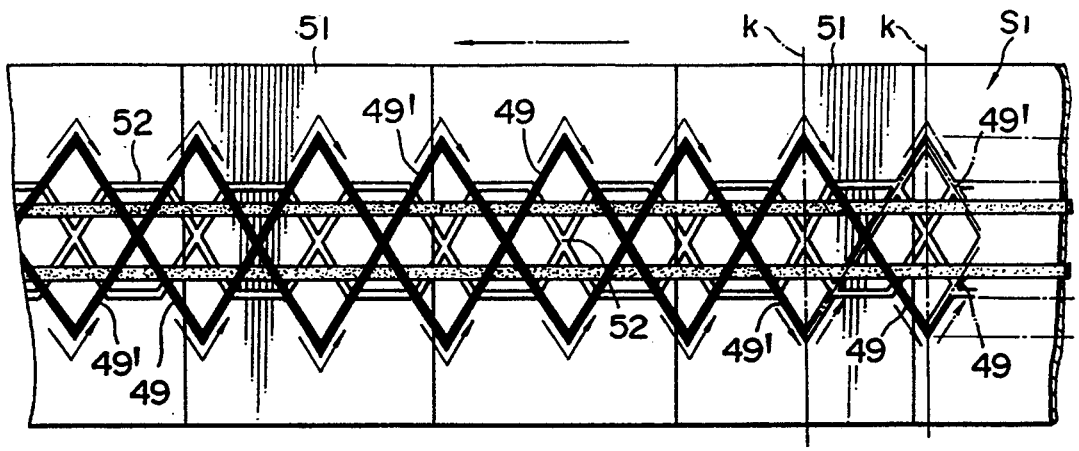
FIGS. 131–133 are top views for showing the belt conveyor type of molding die for the anti-skid attachment and the net shape grooves channels.
Figure 132:
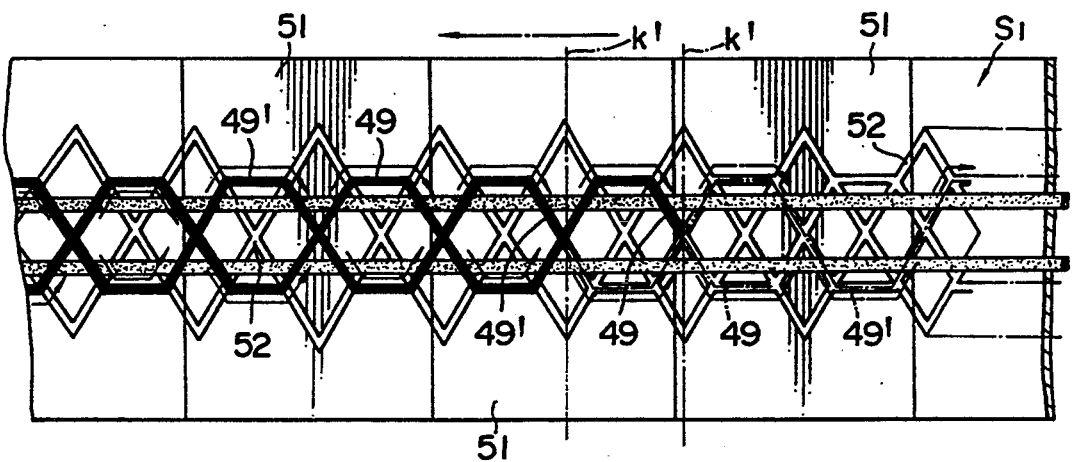
Figure 133:
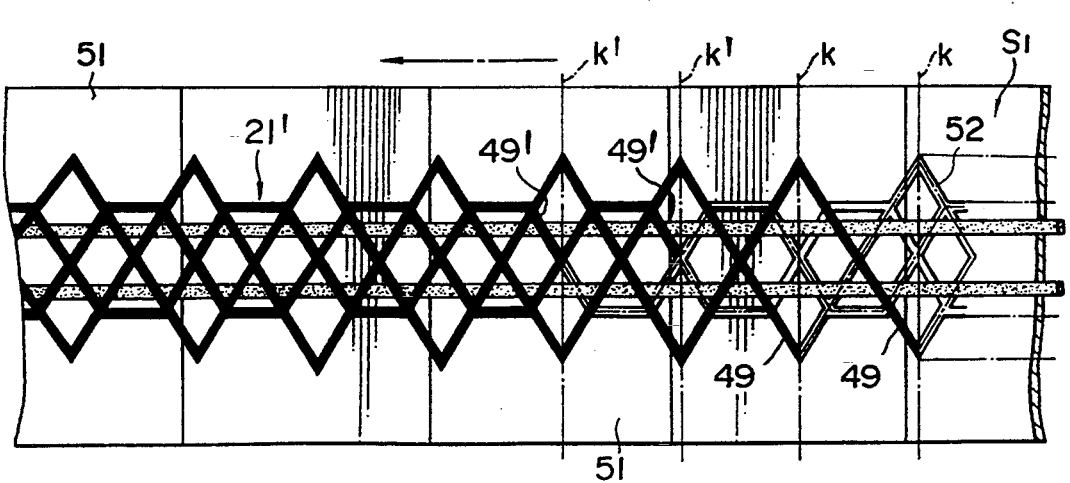

In the knitting time, the coreless cords 1, 1 are inserted onto the net shaped grooves 52 of said channel 49, 49' while moving the extruding heads 61, 61 of the support table 62 along to the channel 49, 49' of the net shaped grooves as shown in FIG. 131, at the same time, the cords 1', 1' are also inserted into the net shaped grooves 52 of the channel 49, 49' while moving the extruding heads 61', 61' of the support table 62' along to the channel 49, 49' of the net shaped grooves as shown in FIG. 132, and knits the non-vulcanized anti-skid net bodies 21' with the net shape pattern as shown in FIG. 133 within the whole of the net shaped grooves 52.

Further, the anti-skid net bodies 211 knitted within the net shaped grooves 52 will be hooked temporarily with thrusting of each crossing section by the temporary hooking section S arranged the thrusting pins 83 put together with a position of each crossing section of said bodies 21'.

Further, the above mentioned non-vulcanized anti--skid net bodies 21' are adopted with the cords 1 without a core material in which forms the side edge section 8' of said bodies 21', so that in accordance with the above, the structure will be simplified by means of omitting the core materials of the cords 1 along the side edge section 8' where an extensive strength is comparatively not required.

In case of the aforesaid non-vulcanized anti-skid net bodies 21', it will be able to knit the non-vulcanized anti-skid net bodies 21' without containing a core materials within a partial sectional materials if uses some pieces of the coreless cords 1 within six pieces of the cords 1 to be used.

Further, the preliminary molding apparatus will allow knitting the non-vulcanized anti-skid net bodies 21' by even use of one unit of the extruding head only.

Figure 134:
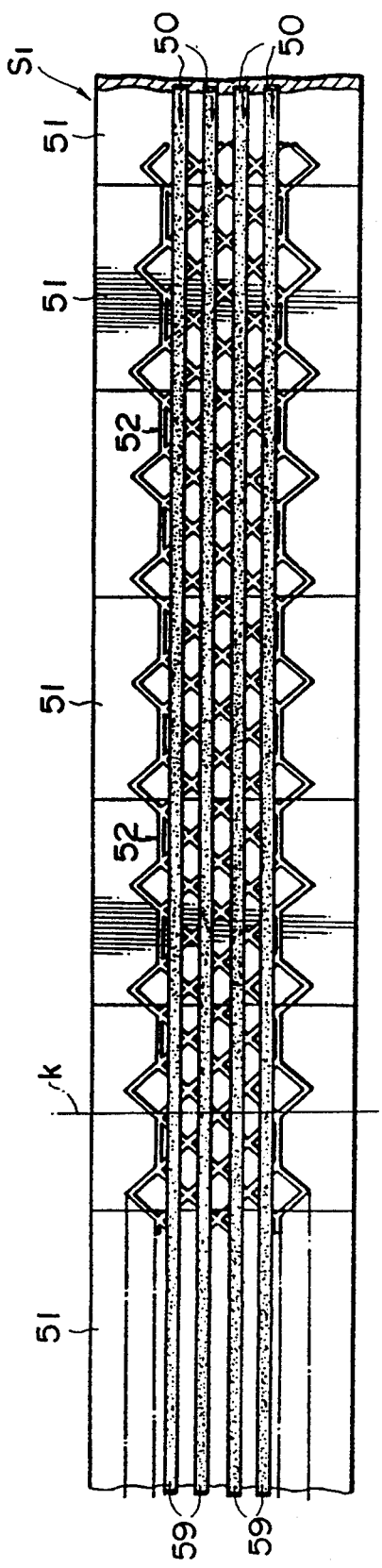
Figure 135:
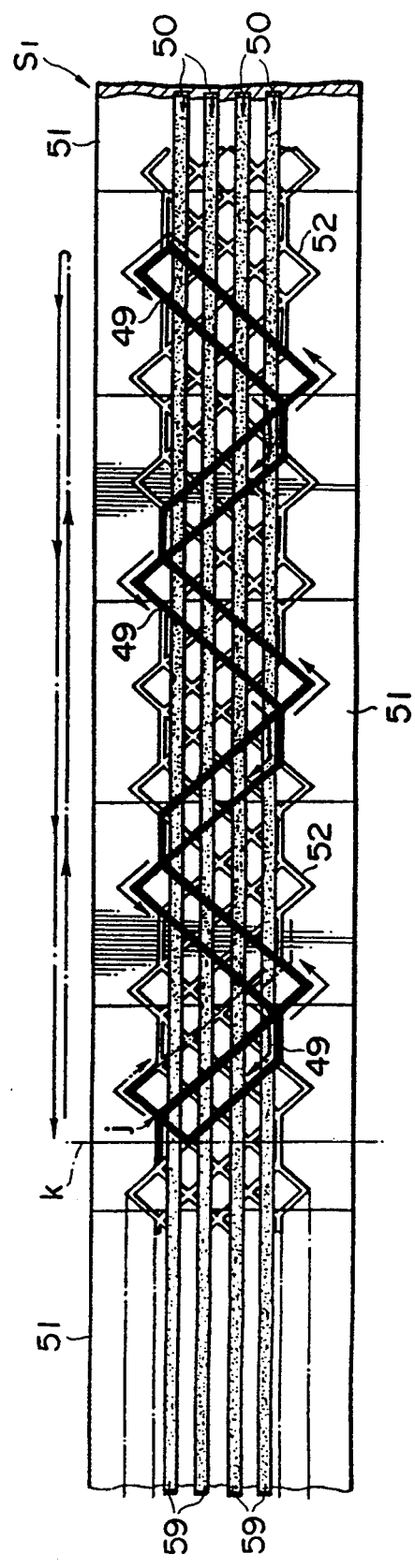

In this case, either one of six pieces of the extruding heads 61, 61', for example, using the extruding head 61 of the support table 62, and inserts a piece of the cord 1 into along to the channel 49 of the net shaped grooves from the starting point j of the net shaped grooves 52 as shown with the drawing drawn with a single stroke in those of between FIG. 134 and FIG. 137.

In the knitting time, when the extruding head 61 has moved to the front end of the channel 49 of the net shaped grooves, otherwise to the tail end of it as shown in the drawings, the moving direction of the molding plate belt-conveyor S1 to the reverse or the correct direction, and while making it to move reciprocatingly on the moving surface of the molding plate belt-conveyor S1 in the center line of the moving line K of the extruding head 61, and inserts the cord 1 into the net shaped grooves 52 of the channel 49, and finishes knitting a sheet of the non-vulcanized anti-skid net bodies 21'.

When finished knitting the non-vulcanized anti-skid net bodies 21', the tail end of cord 1 is cut off, and next, each crossing sections is hooked temporarily by the temporary hooking sections $S_3$ mentioned before.

In case of knitting it by a piece of the cord 1, it is not necessary to cut off the non-vulcanized anti-skid net bodies 21' by the straw cutter $S_4$ because of it being knitted with a prescribed length within the molding plate belt-conveyor S11.

Obviously, numerous modifications and variations of this invention are possible in light of the above teachings. It is therefore to be understood that within the scope of the appended claims, the invention may be practiced otherwise than as specifically described.

We claim:

1. A method for making an anti-skid apparatus for an automobile tire comprising the steps of:
    a) coating a plurality of core materials with rubber to form a plurality of cords by extruding rubber over the plurality of core materials;
    b) placing cords in crossing grooves of a preliminary molding plate and placing other cords on top of the cords at crossing sections to form a non-vulcanized net body;
    c) pressing the crossing sections of the non-vulcanized net body in the preliminary molding plate so as to cause the cords to be adhered to each other at the crossing sections; and
    d) removing the non-vulcanized net body from the preliminary molding plate and placing the non-vulcanized net body in a press mold and vulcanizing the non-vulcanized net body to form a vulcanized anti-skid net body after the crossing sections have been pressed.

2. A method as recited in claim 1, wherein the step of pressing the crossing sections temporarily fixes the respective cords to each other at respective crossing sections.

3. A method as recited in claim 1, further comprising affixing a means to the vulcanized anti-skid net body to detachably secure the vulcanized anti-skid net body to an automobile tire.

* * * * *